United States Patent
Sekar et al.

(10) Patent No.: US 11,980,323 B2
(45) Date of Patent: May 14, 2024

(54) ENHANCED AUTOMATED FOOD MAKING APPARATUS

(71) Applicant: DoorDash, Inc., San Francisco, CA (US)

(72) Inventors: Deepak Chandra Sekar, San Jose, CA (US); Kathirgugan Kathirasen, Puchong (MY); Brian Richardson, Los Gatos, CA (US); Sanath Bhat, Redwood City, CA (US); Levi Lalla, Redwood City, CA (US)

(73) Assignee: DOORDASH, INC., San Francisco, CA (US)

(*) Notice: Subject to any disclaimer, the term of this patent is extended or adjusted under 35 U.S.C. 154(b) by 0 days.

(21) Appl. No.: 17/382,907

(22) Filed: Jul. 22, 2021

(65) Prior Publication Data

US 2021/0345833 A1 Nov. 11, 2021

Related U.S. Application Data

(60) Division of application No. 15/945,483, filed on Apr. 4, 2018, now Pat. No. 11,284,748, which is a (Continued)

(51) Int. Cl.
*A47J 44/00* (2006.01)
*A47J 36/00* (2006.01)
*B25J 9/02* (2006.01)

(52) U.S. Cl.
CPC ............... *A47J 44/00* (2013.01); *A47J 36/00* (2013.01); *B25J 9/026* (2013.01); *Y10S 901/16* (2013.01)

(58) Field of Classification Search
CPC ............ A47J 36/00; A47J 44/00; B25J 9/026
See application file for complete search history.

(56) References Cited

U.S. PATENT DOCUMENTS 3,277,356 A * 10/1966 Kraft ................ F04B 49/06
318/470
4,058,120 A 11/1977 Caparrelli et al.
(Continued)

FOREIGN PATENT DOCUMENTS

CA 2555644 C 9/2005
CN 1179384 A 4/1998
(Continued)

OTHER PUBLICATIONS

Price, Foodini is a 3D printer for everything from burgers to gnocchi, Engadget, Mar. 27, 2014, available at http://www.engadget.com/2014/03/27/foodini/. [Cited in Parent].
(Continued)

*Primary Examiner* — Thien S Tran
(74) *Attorney, Agent, or Firm* — Venable LLP; Michele V. Frank

(57) ABSTRACT

A method for operating an automated food making apparatus having a motor, actuator arm, and an apparatus. The apparatus may be a paddle with flexible fins. The method rotates the paddle with a pin-shaft mechanism to dispense an ingredient placed in a canister, controls the motor automatically based on weight sensor readings, and locates a position of the actuator arm with position sensors. The same motor dispenses ingredients from a plurality of canisters. The method may have a plurality of paddle rotation and weight measurement steps until a target weight is reached. The plurality of paddle rotation steps may be unidirectional or bidirectional paddle rotation. The paddle may be rotated according to one or more paddle rotation algorithms, an error recovery algorithm, or different algorithms based on the amounts of ingredients remaining in the canister. The paddle may be rocked until the target weight is achieved.

15 Claims, 50 Drawing Sheets

Related U.S. Application Data continuation-in-part of application No. 15/449,548, filed on Mar. 3, 2017, now Pat. No. 10,813,503, which is a continuation-in-part of application No. 14/847,959, filed on Sep. 8, 2015, now abandoned.

(60) Provisional application No. 62/481,217, filed on Apr. 4, 2017, provisional application No. 62/304,277, filed on Mar. 6, 2016, provisional application No. 62/047,785, filed on Sep. 9, 2014, provisional application No. 62/056,368, filed on Sep. 26, 2014, provisional application No. 62/094,595, filed on Dec. 19, 2014, provisional application No. 62/150,303, filed on Apr. 21, 2015, provisional application No. 62/185,524, filed on Jun. 26, 2015, provisional application No. 62/201,105, filed on Aug. 4, 2015.

(56) References Cited

U.S. PATENT DOCUMENTS

| | | | |
|---|---|---|---|
| 4,503,502 A | 3/1985 | Chapin | |
| 4,715,517 A | 12/1987 | Potter et al. | |
| 4,748,902 A | 6/1988 | Maurantonio | |
| 4,751,878 A | 6/1988 | Lopes | |
| 4,875,607 A | 10/1989 | Torita et al. | |
| 5,955,118 A | 9/1999 | Powell | |
| 6,029,828 A | 2/2000 | Robbins et al. | |
| 6,131,766 A * | 10/2000 | King | B67D 7/0216 222/326 |
| 6,332,100 B1 | 12/2001 | Sahai et al. | |
| 6,533,105 B1 | 3/2003 | Dutschke | |
| 6,725,889 B2 | 4/2004 | Perez Vales | |
| 7,174,830 B1 | 2/2007 | Dong | |
| 7,267,833 B2 | 9/2007 | Shon et al. | |
| 7,278,553 B2 | 10/2007 | Py et al. | |
| 9,259,114 B2 | 2/2016 | Nevarez et al. | |
| 9,820,615 B2 | 11/2017 | Jin et al. | |
| 10,064,521 B1 * | 9/2018 | Gawali | B65D 83/00 |
| 2002/0139811 A1 | 10/2002 | Tramontina et al. | |
| 2003/0234264 A1 | 12/2003 | Landau | |
| 2004/0129740 A1 | 7/2004 | Barker, III et al. | |
| 2004/0159244 A1 | 8/2004 | Leason | |
| 2005/0193901 A1 | 9/2005 | Buehler | |
| 2005/0194403 A1 | 9/2005 | Mink et al. | |
| 2006/0011141 A1 | 1/2006 | Bird et al. | |
| 2006/0138118 A1 | 6/2006 | Chan | |
| 2007/0084520 A1 * | 4/2007 | Driessen | B01F 35/881 141/2 |
| 2007/0119688 A1 | 5/2007 | Brandt | |
| 2008/0282904 A1 | 11/2008 | Liu | |
| 2009/0277516 A1 | 11/2009 | Winkler et al. | |
| 2009/0297678 A1 | 12/2009 | Liu | |
| 2010/0095895 A1 | 4/2010 | Laliberta | |
| 2010/0108717 A1 * | 5/2010 | Szymanski | B65D 35/34 222/100 |
| 2010/0126285 A1 | 5/2010 | Caroll | |
| 2010/0276442 A1 | 11/2010 | Querfurth et al. | |
| 2011/0027914 A1 | 2/2011 | Bunce et al. | |
| 2011/0108546 A1 | 5/2011 | Cho et al. | |
| 2012/0288973 A1 | 11/2012 | Matsunaga | |
| 2013/0112683 A1 | 5/2013 | Hegedis et al. | |
| 2013/0192527 A1 | 8/2013 | Reid | |
| 2014/0131384 A1 | 5/2014 | Martinez | |
| 2014/0230660 A1 | 8/2014 | He | |
| 2015/0075391 A1 | 3/2015 | Vardakostas et al. | |
| 2015/0129611 A1 * | 5/2015 | Vulpitta | A23G 9/22 222/214 |
| 2015/0164131 A1 * | 6/2015 | Vardakostas | A23P 20/20 99/450.4 |
| 2015/0208871 A1 | 7/2015 | Chang | |
| 2015/0321893 A1 | 11/2015 | Corbelli et al. | |
| 2016/0067866 A1 | 3/2016 | Sekar et al. | |
| 2017/0015541 A1 * | 1/2017 | Vulpitta | A23G 9/28 |
| 2017/0172351 A1 | 6/2017 | Kathirasen et al. | |
| 2017/0189930 A1 * | 7/2017 | Turner | H02P 7/285 |
| 2017/0290345 A1 | 10/2017 | Garden et al. | |
| 2021/0000300 A1 | 1/2021 | Kathirasen et al. | |
| 2021/0000301 A1 | 1/2021 | Kathirasen et al. | |
| 2021/0321826 A1 | 10/2021 | Bhat et al. | |
| 2021/0345833 A1 | 11/2021 | Sekar et al. | |

FOREIGN PATENT DOCUMENTS

| | | |
|---|---|---|
| CN | 1250356 A | 4/2000 |
| CN | 1413340 A | 4/2003 |
| CN | 1678194 A | 10/2005 |
| CN | 1739477 A | 3/2006 |
| CN | 2812591 Y | 9/2006 |
| CN | 102164504 A | 8/2011 |
| CN | 104310298 A | 1/2015 |
| CN | 104427918 A | 3/2015 |
| CN | 204625150 U | 9/2015 |
| EP | 0455477 A2 | 11/1991 |
| EP | 1191865 B1 | 9/2003 |
| EP | 2413749 B1 | 8/2013 |
| GB | 588616 A | 5/1947 |
| JP | 4136297 B2 | 8/2008 |
| JP | 2009-508775 A | 3/2009 |
| JP | 2009-161204 A | 7/2009 |
| RU | 2002119575 A | 2/2004 |
| WO | 98/36668 A2 | 8/1998 |
| WO | 99/53808 A2 | 10/1999 |
| WO | 2006053507 A1 | 5/2006 |
| WO | 2007/039347 A2 | 4/2007 |
| WO | 2011/060337 A2 | 5/2011 |
| WO | 2014/086816 A1 | 6/2014 |
| WO | 2015/161713 A1 | 10/2015 |
| WO | 2016/029294 A1 | 3/2016 |
| WO | 2016/040361 A1 | 3/2016 |

OTHER PUBLICATIONS

Cheshire, Say hello to EveryCook, your robotic chef, Wired, Mar. 2014, available at http://www.wired.co.uk/magazine/archive/2014/03/start/computerised-cuisinier. [Cited in Parent].

Rigg, Cooki's the robot chef that only knows how to stir, Engadget, Jan. 8, 2015, available at http://www.engadget.com/2015/01/08/cooki-robot-chef/. [Cited in Parent].

WebstaurantStore Dry Food Dispenser—Triple Canister, Nov. 18, 2015, retrieved Jul. 14, 2017 from http://web.archive.org/web/20151118013427/http://www.webstaurantstore.com/dry-food-dispenser-triple-canister/407CRD3.html. [Cited in Parent].

International Search Report and Written Opinion dated Dec. 4, 2015, directed to International Patent Application PCT/US2015/049003; 13 pages.

International Search Report and Written Opinion dated Sep. 1, 2017, directed to International Patent Application No. PCT/US2017/020785; 15 pages.

Extended European Search Report dated Aug. 3, 2018 in European Patent Application No. 15840037.4 [Cited in Parent].

International Search Report and Written Opinion dated Sep. 18, 2018, directed to International Patent Application PCT/US2018/026065; 11 pages.

Non-Final Rejection dated Sep. 16, 2019, directed to U.S. Appl. No. 15/449,548; 16 pages.

Final Rejection dated May 21, 2020, directed to U.S. Appl. No. 15/449,548; 19 pages.

Notice of Allowance dated Jun. 17, 2020, directed to U.S. Appl. No. 15/449,548; 9 pages.

Notification of the First Office Action dated Feb. 2, 2021, directed to related Chinese Application No. 20180028412.2; 17 pages.

First Examination Report dated Jun. 15, 2021, directed to related Indian Application No. 201917039732; 6 pages.

Extended European Search Report dated Jul. 14, 2021, directed to EP Application No. 18761194.2; 6 pages.

Office Action and Search Report directed to Russian Application No. 2019130974, dated Aug. 6, 2021; 15 pages.

Notification of the Second Action dated Oct. 26, 2021, directed to related Chinese Application No. 201880028412.2; 10 pages.

(56) References Cited

OTHER PUBLICATIONS

Notice of Reasons for Rejection dated Jan. 18, 2022, directed to JP Application No. 2019-569666; 17 pages.
Notification of Grant Patent Right for Invention dated Jan. 25, 2022, directed to related Chinese Application No. 201880028412.2; 6 pages.
Official Action dated Apr. 7, 2022, directed to RU Application No. 2019130974; 15 pages.
Non-Final Rejection dated Apr. 27, 2022, directed to U.S. Appl. No. 16/933,130; 13 pages.
Notice of Reasons for Rejection dated Aug. 22, 2022, directed to JP Application No. 2019-569666; 6 pages.
Non-Final Rejection dated Sep. 13, 2022, directed to U.S. Appl. No. 16/934,447; 9 pages.
Notice of Allowance and Fee(s) Due dated Sep. 21, 2022, directed to U.S. Appl. No. 16/933,130; 8 pages.
Corrected Notice of Allowability dated Nov. 16, 2022, directed to U.S. Appl. No. 16/933,130; 2 pages.
Decision to Grant a Patent dated Jan. 6, 2023, directed to JP Application No. 2019-569666; 6 pages.
Notice of Allowance and Fee(s) Due dated Feb. 1, 2023, directed to U.S. Appl. No. 16/933,130; 8 pages.
Final Office Action dated Feb. 10, 2023, directed to U.S. Appl. No. 16/934,447; 11 pages.
Office Action Action dated Feb. 28, 2023, directed to MX Application No. MX/a/2019/010528; 5 pages.
Non-Final Office Action dated Mar. 20, 2023, directed to U.S. Appl. No. 16/933,130; 14 pages.
Non-Final Office Action dated Apr. 20, 2023, directed to U.S. Appl. No. 17/359,191; 15 pages.
Notice of Allowance and Fee(s) Due dated Apr. 21, 2023, directed to U.S. Appl. No. 16/934,447; 9 pages.
Final Office Action dated Aug. 4, 2023, directed to U.S. Appl. No. 16/933,130; 13 pages.
Notice of Allowance dated Oct. 12, 2023, directed to U.S. Appl. No. 17/359,191; 8 pages.
Notice of Allowance dated Oct. 23, 2023, directed to U.S. Appl. No. 16/933,130; 9 pages.
Communication under Rule 71(3) EPC dated Feb. 26, 2024, directed to EP Patent Application No. 18761194.2; 8 pages.
Notification of the First Office Action dated Feb. 29, 2024, directed to CN Patent Application No. 202210366024.3; 18 pages.

\* cited by examiner

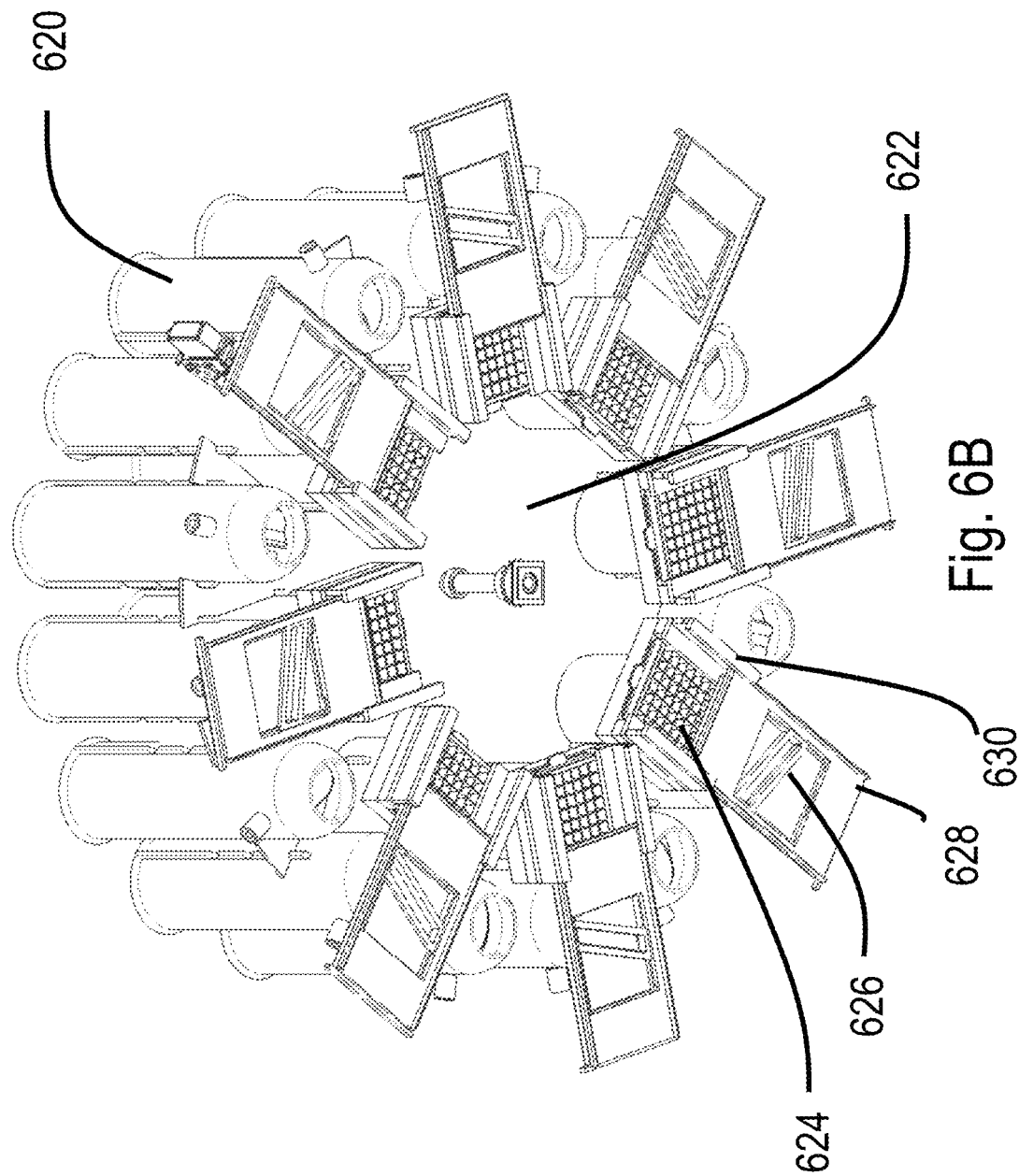

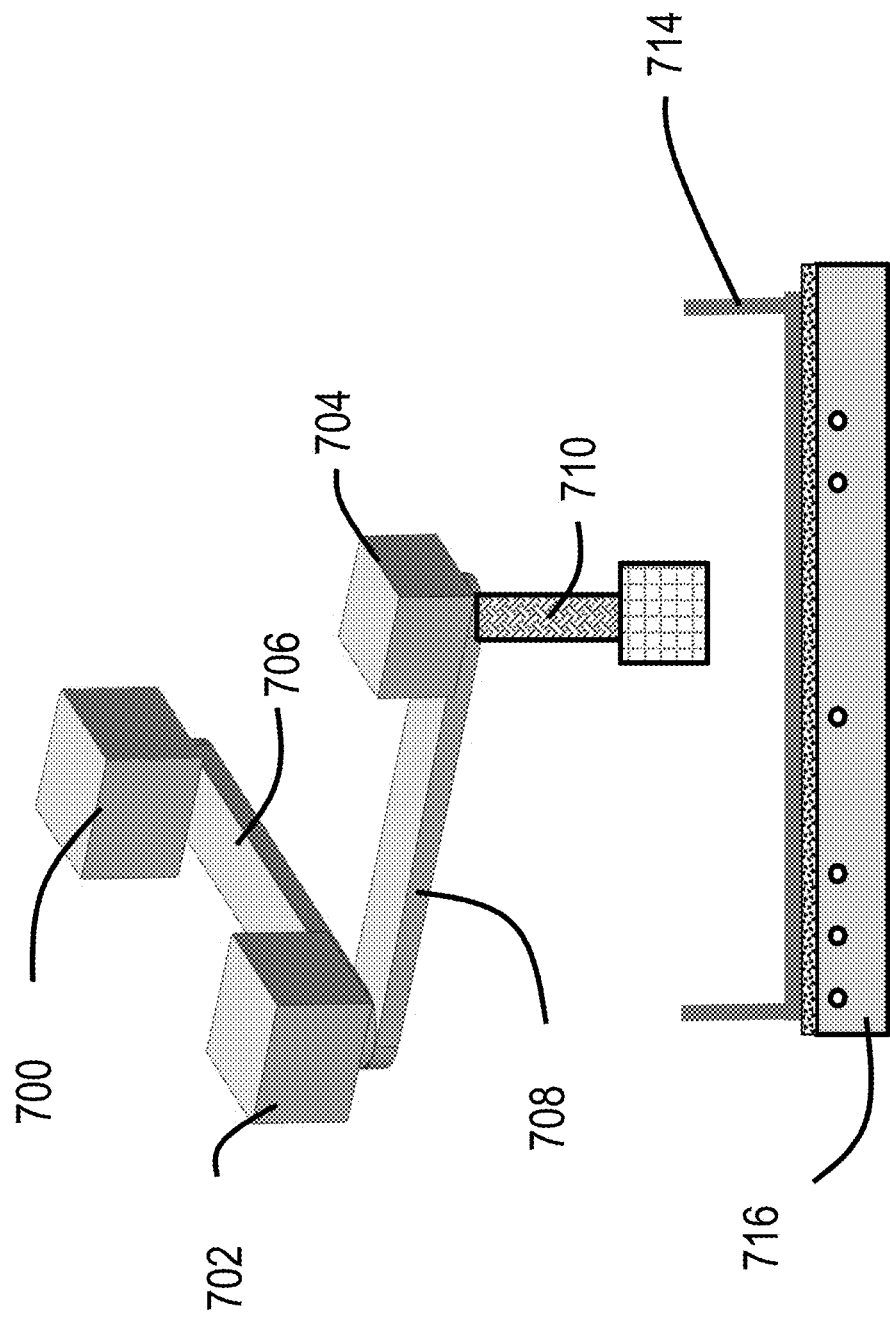

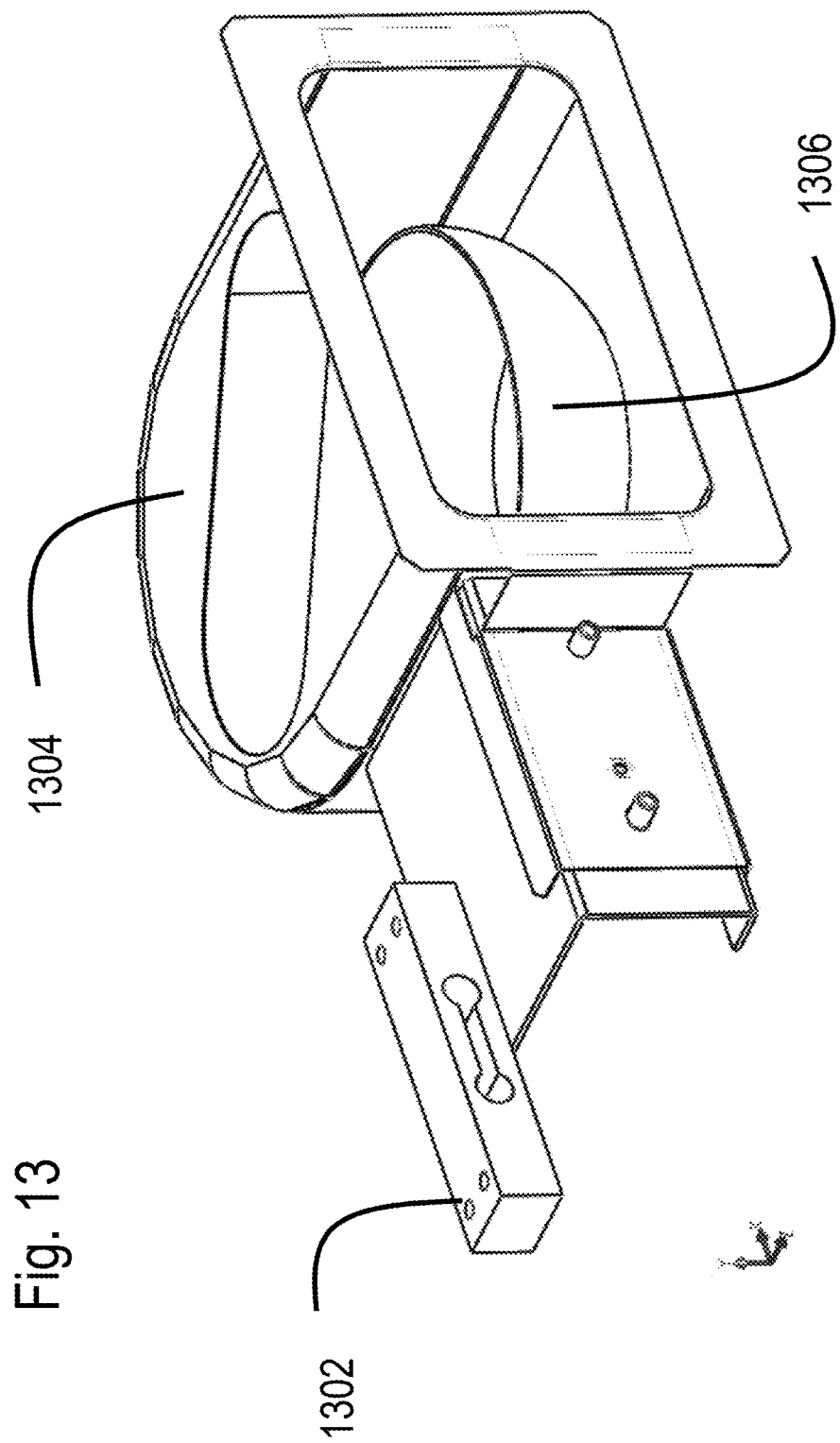

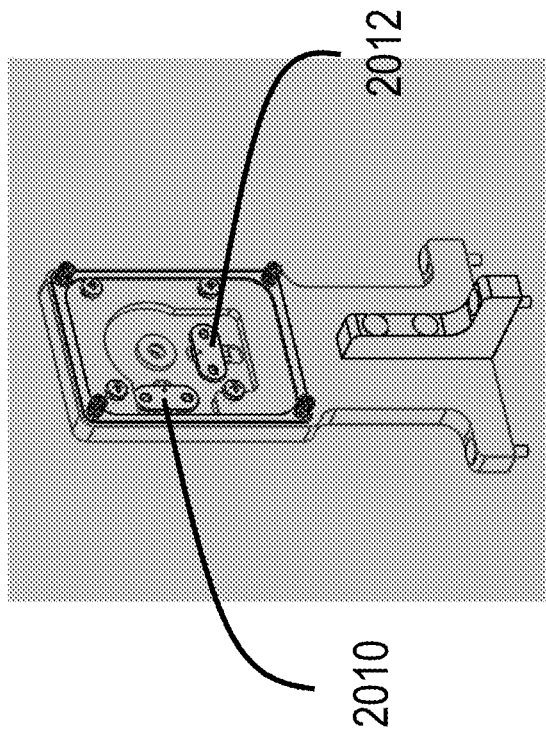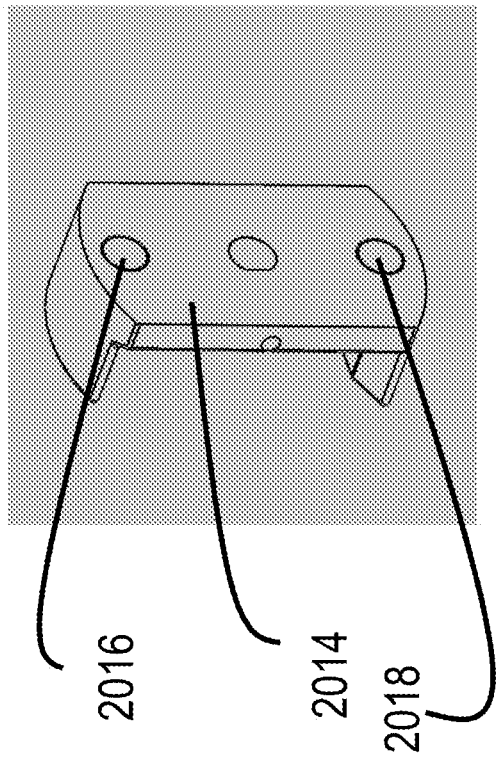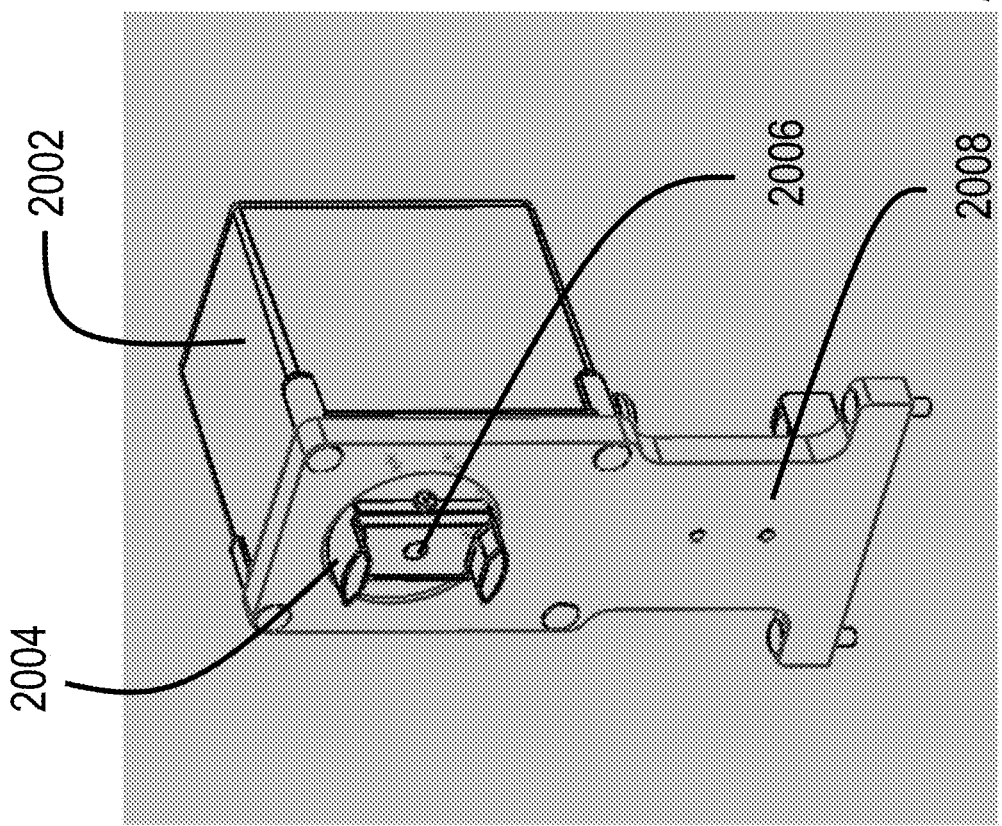

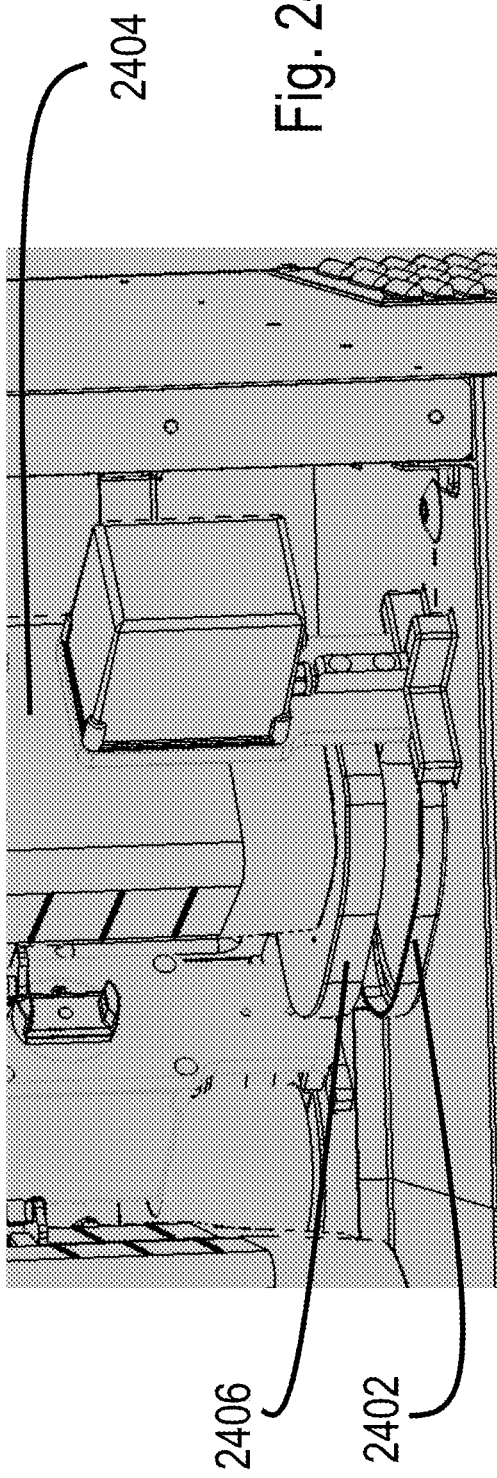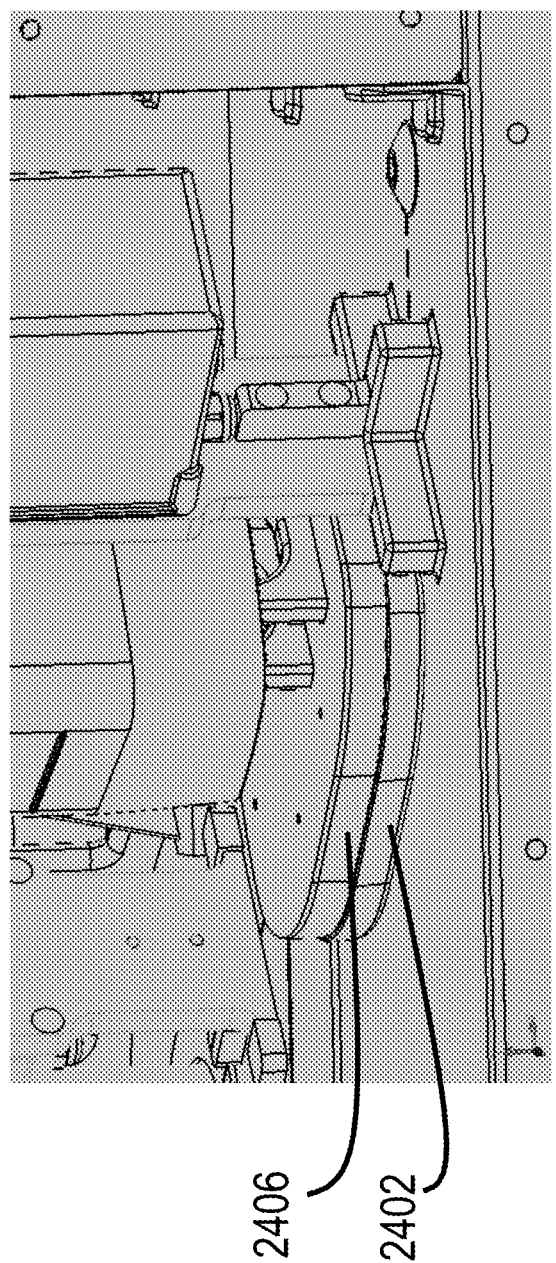

Threshold based speed change

Dispensing based on ingredient level in the canisters.
Note: Numbers shown as examples Liquid Pullback Error recovery from dispensing not happening due to jamming or food getting stuck Error recovery from dispensing not happening due to jamming or food getting stuck Fallback container Rocking Motion

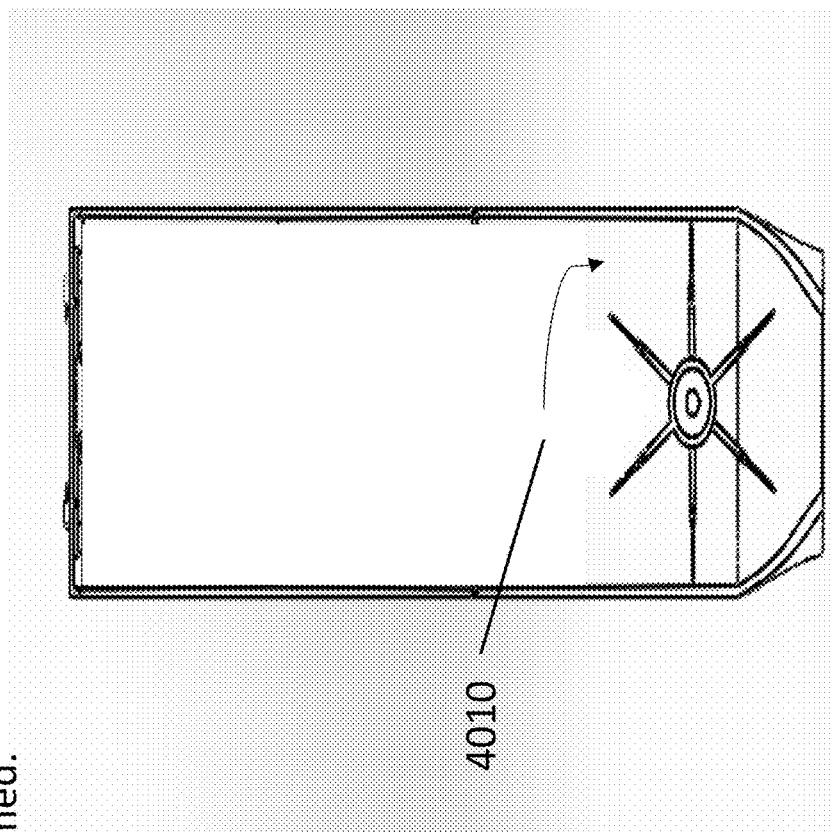
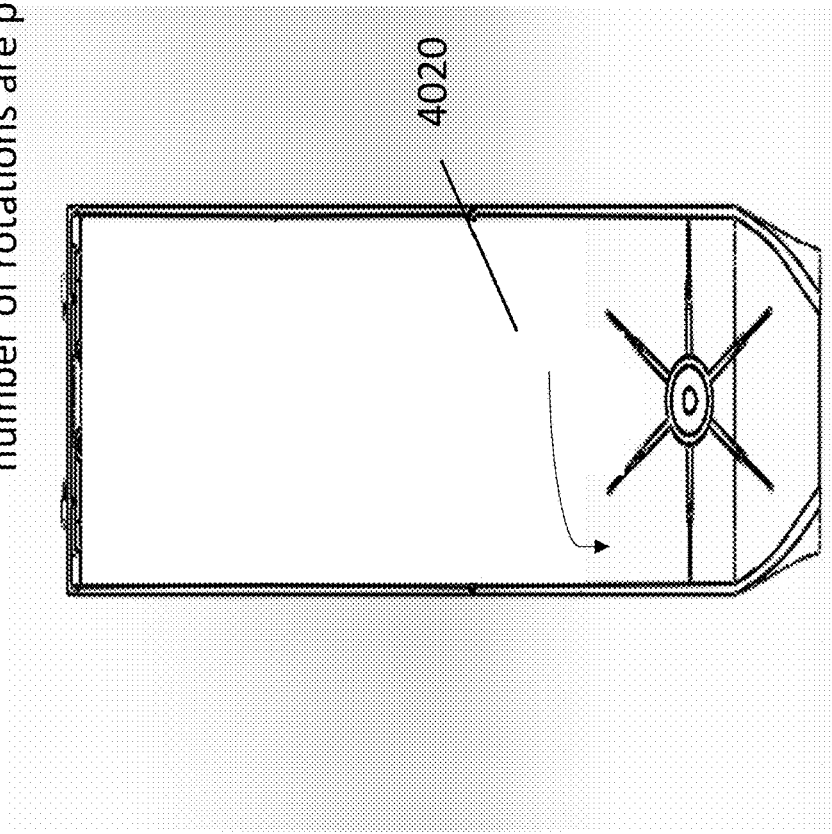
Fig. 40
Bidirectional motion. Direction of rotation can change after a certain number of rotations are performed.

Bidirectional motion. Direction of rotation can change after each salad is made

Quantized weight dispense algorithm

Predictive Zero Mechanism Undershoot

Predictive Dispensing Undershoot

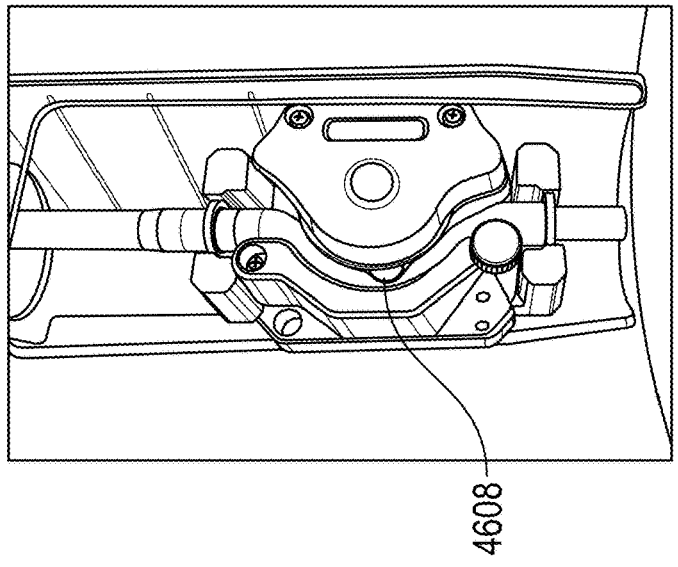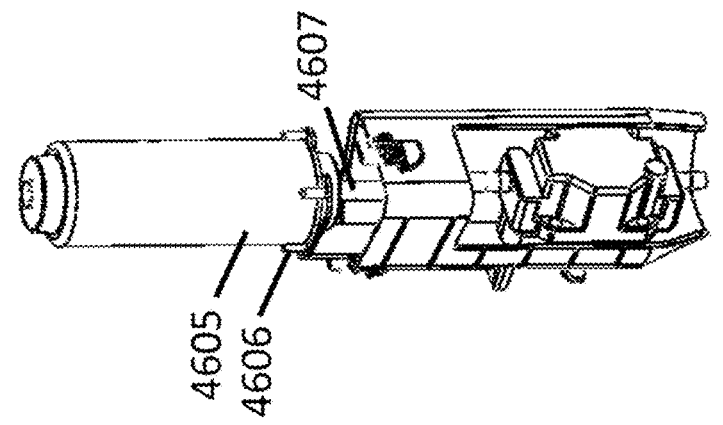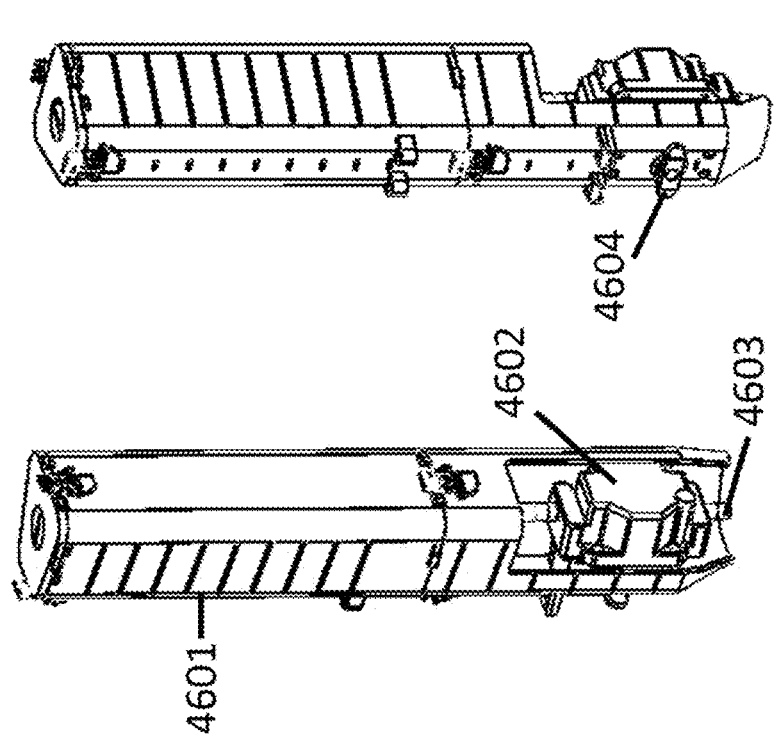

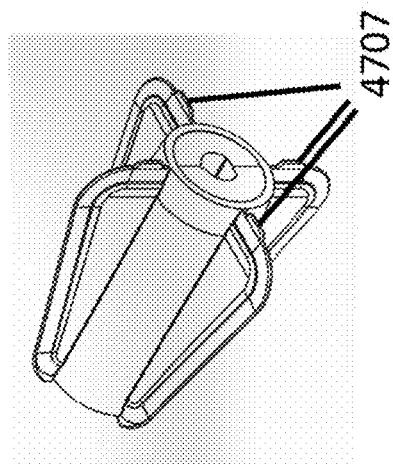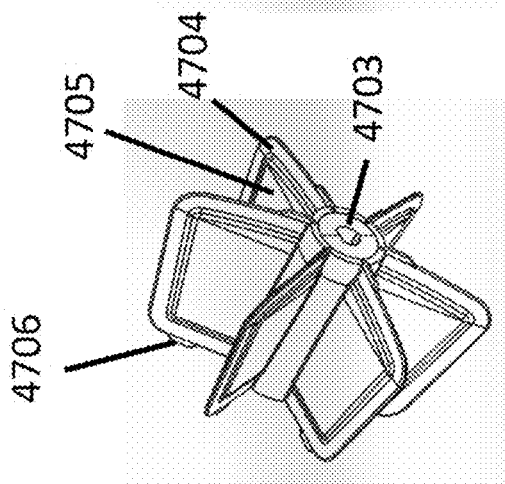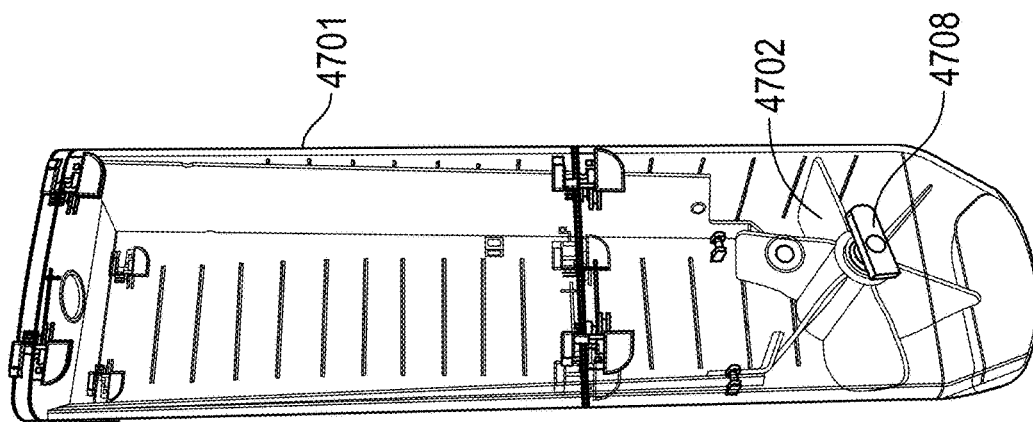

Shufflers

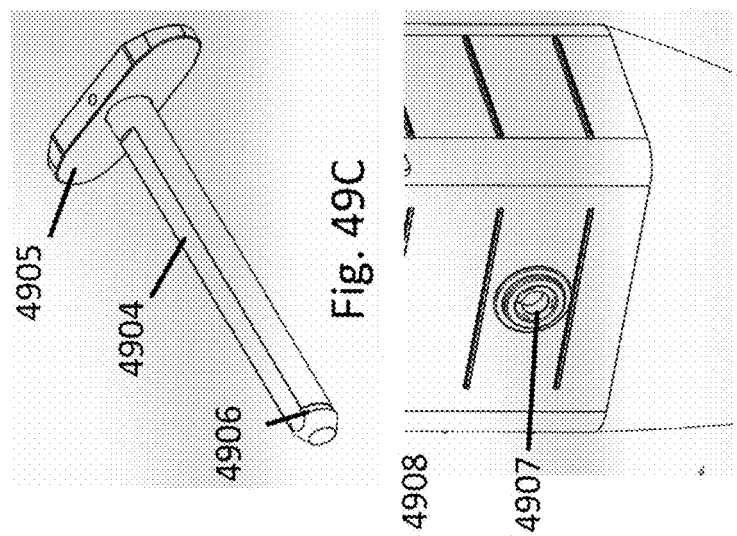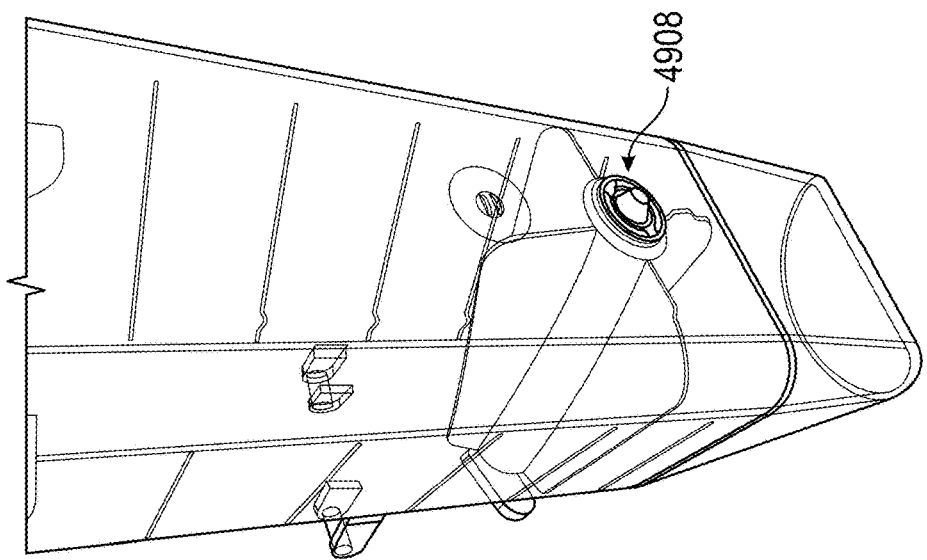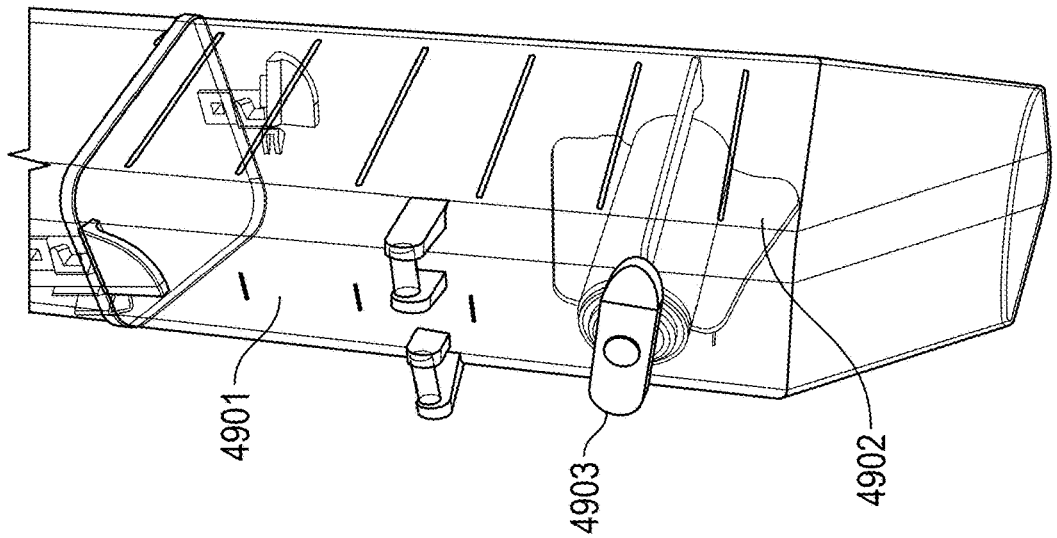

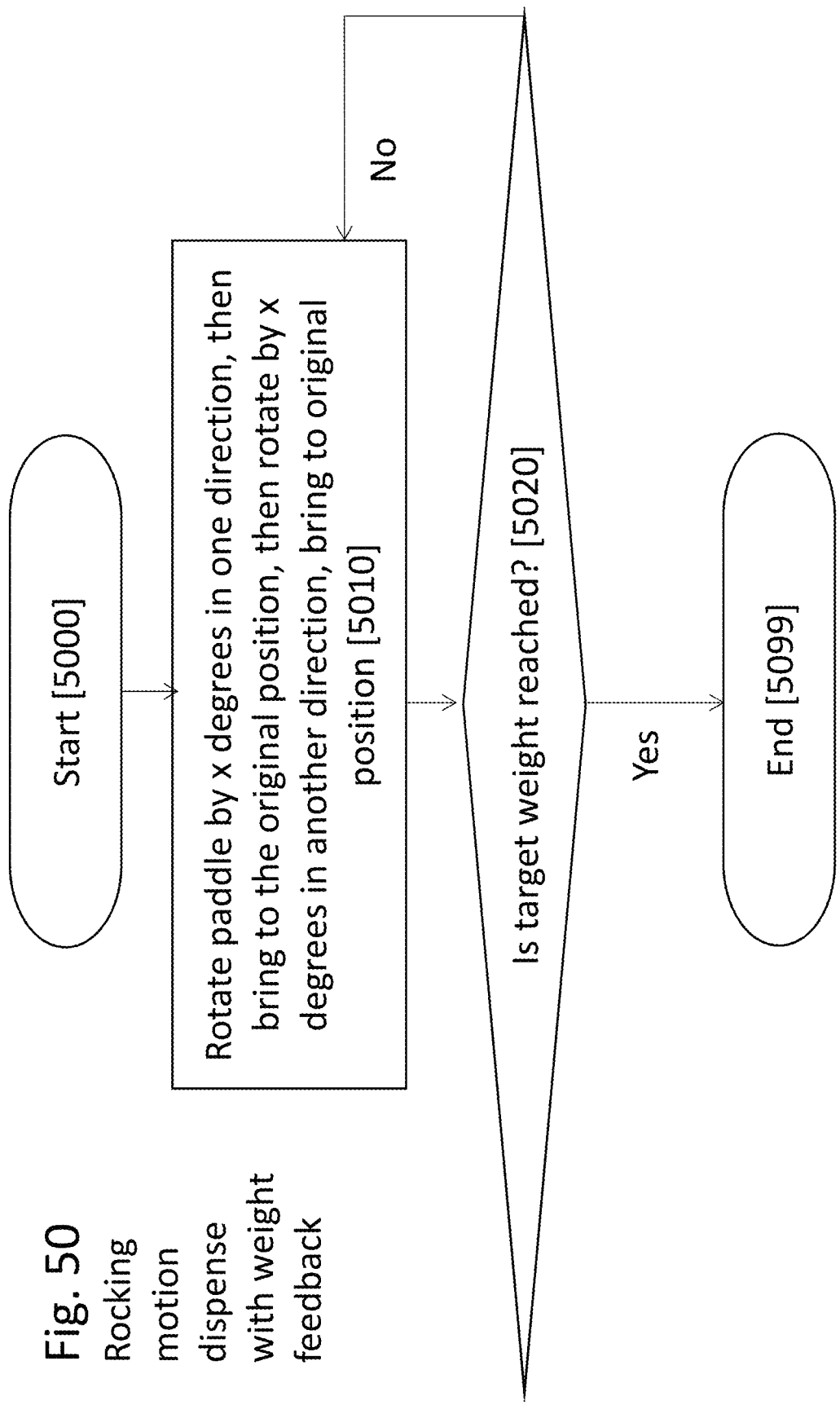
Fig. 50 Rocking motion dispense with weight feedback

ENHANCED AUTOMATED FOOD MAKING APPARATUS

CROSS-REFERENCE TO RELATED APPLICATIONS

This application is a divisional of U.S. Nonprovisional Patent Application No. 15/945,483, filed on Apr. 8, 2018, which claims the benefit of U.S. Provisional Patent Application No. 62/481,217, filed on Apr. 4, 2017, and is also a continuation in part of U.S. Non-provisional Patent Application No. 15/449,548, filed on Mar. 3, 2017, which claims the benefit of U.S. Provisional Patent Application No. 62/304,277, filed on Mar. 6, 2016, and is also a continuation in part of U.S. Nonprovisional Patent Application No. 14/847,959, filed on Sep. 8, 2015, which claims the benefit of U.S. Provisional Patent Application No. 62/047,785, filed on Sep. 9, 2014, U.S. Provisional Patent Application No. 62/056,368, filed on Sep. 26, 2014, U.S. Provisional Patent Application No. 62/094,595, filed on Dec. 19, 2014, U.S. Provisional Patent Application No. 62/150,303, filed on Apr. 21, 2015, U.S. Provisional Patent Application No. 62/185,524, filed on Jun. 26, 2015, and U.S. Provisional Patent Application No. 62/201,105, filed on Aug. 4, 2015. The contents of the foregoing applications are incorporated herein by reference.

BACKGROUND OF THE INVENTION

1. Field of the Invention

This application relates to the general field of electronically-aided apparatuses, systems, methods and techniques to conduct the food making process in a home or a business.

2. Discussion of Background Art

Over the years, a number of innovations have come in to help with the cooking process. Food processors are now available to chop vegetables and meat. Induction cooktops allow a faster cooking process. Microwave ovens allow efficient reheating. However, despite these innovations, many of us spend an hour a day, or sometimes even more, cooking food for ourselves and our families. Cooking also requires a significant learning curve before one can do it in a tasty manner. As well, commercial food enterprises, such as restaurants, must currently allocate a significant amount of their costs on the human cooking endeavor. Ways to reduce the "human time" needed for cooking as well as the learning curve associated with cooking could be quite useful. As well, direct and indirect economic benefits may accrue for a business by transferring some of the human time costs to a machine, apparatus, robot, and such.

U.S. Patent Application Publication No. 2013/0112683 from Hegedis, Davenport and Hoare apparently describes a cooking apparatus where a heating element works with a user interface and temperature sensors and provides prompts to the user during cooking. However, this requires user input to provide all the ingredients needed for cooking and requires the user to stand near the cooktop for large periods of time to respond to the prompts provided by the cooking apparatus. There is no mixing function available automatically, so the user needs to stand near the cooktop for large periods of time as well.

U.S. Patent Application Publication No. 2011/0108546 from Cho and Chen apparently describes an intelligent heating mechanism which adaptively provides power to an induction cooktop based on temperature sensor data as well as a user-defined temperature profile. However, this requires the user to provide all the ingredients needed for cooking manually and requires the user to stand near the cooktop to mix the food items periodically.

Foodini, a prototype and soon-to-be-released product from Natural Machines, apparently 3D prints food items by heating food pastes and dispensing them on to a stage. However, this requires food to be in paste form before being dispensed, which could be cumbersome and costly.

Everycook, a prototype made in Europe, apparently promises to cut and mix food items and cook them with a recipe. However, the user still needs to be present near the Everycook cooking apparatus and dump additional food items every so often.

Sereneti Kitchen, a prototype in the US, apparently wants to automate the cooking process but does not conduct any chopping of the ingredients and utilizes pre-chopped food instead. Neither does it put measured quantities of ingredients into the cooking vessel.

What is needed are apparatuses and methods that allow food preparation with minimal human intervention.

BRIEF DESCRIPTION OF THE DRAWINGS

Various embodiments of the invention will be understood and appreciated more fully from the following detailed description, taken in conjunction with the drawings in which:

FIG. 6B illustrates an embodiment of this invention, which is an apparatus for dicing ingredients;

FIG. 7 illustrates an embodiment of this invention, which uses a series of links to move a stirrer to various positions;

FIG. 13 illustrates an embodiment of this invention that shows a mass sensor system;

FIGS. 20A-20C illustrate an embodiment of this invention, which show how magnets and Hall sensors may be structured for dispensing material from ingredient containers;

FIGS. 24A-24B illustrate an embodiment of this invention, which show how thermal insulation is provided between the chamber where ingredients are kept and other portions of the apparatus;

FIG. 40 illustrates an embodiment of this invention, which shows a Bidirectional Motion algorithm;

FIG. 46A-D illustrate an embodiment of this invention, which show a liquid dispensing mechanism FIG. 47A-C illustrate an embodiment of this invention, which show tabbed paddles FIG. 49A-D illustrate an embodiment of this invention, which show an apparatus which snaps a pin shaft mechanism and a paddle onto a canister FIG. 50 illustrates an embodiment of this invention, which describe a rocking motion dispense algorithm with weight feedback.

DETAILED DESCRIPTION

Embodiments of the present invention are now described with reference to at least the above figures. Persons of ordinary skill in the art will appreciate that the description and figures illustrate rather than limit the invention and that in general the figures are not drawn to scale for clarity of presentation. Such skilled persons will also realize that many more embodiments are possible by applying the inventive principles contained herein and that such embodiments fall within the scope of the invention which is not to be limited except by any appended claims.

Figure 1:
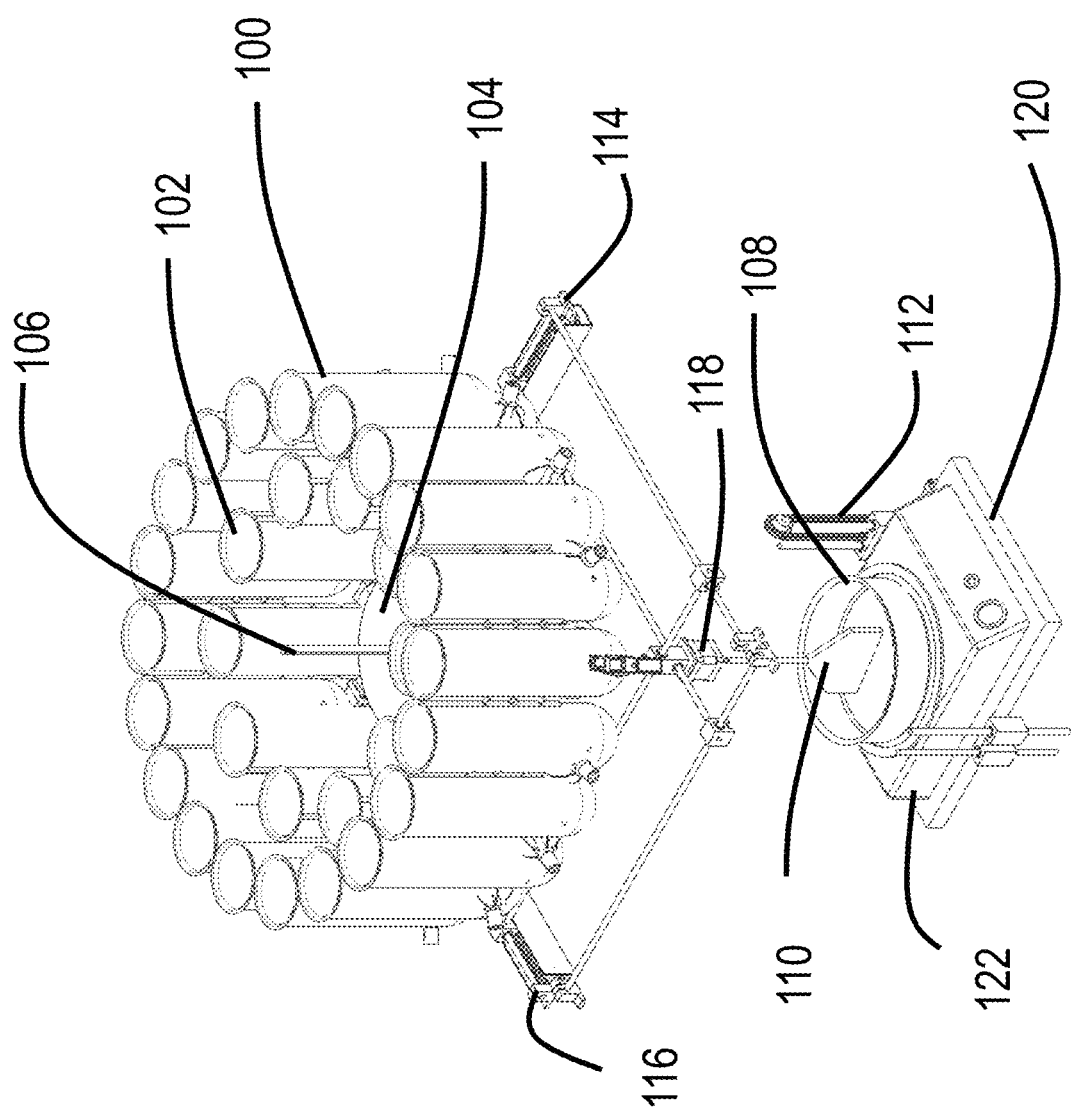
FIG. 1 depicts an embodiment of this present invention, which may include a carousel atop the cooking pot.

FIG. 1 describes an embodiment of this present invention, which may be a robotic cooking apparatus or food preparation machine/apparatus. A robotic cooking apparatus may include outer container 100, inner container 102, carousel 104, shaft 106, pan 108, stirrer 110, robot arm 112, X rail 114, Y rail 116, motor 118, plate 120, and heater 122. Food may be stored in ingredient dispenser containers such as outer container 100 and inner container 102. The terms tube and canister may also be used to refer to containers at various sections of this patent application. Ingredient dispenser containers outer container 100 and inner container 102 may be mounted on to a carousel 104 which may be attached to a rotating shaft 106. The shaft 106 may be rotated with the help of a motor. Several mechanisms may be used for rotating containers placed in a circular configuration, which may be placed on a circular board/platform. In FIG. 1, two circular rows of ingredient dispensers are depicted, with outer container 100 on the outer circular row and inner container 102 on the inner circular row. A number of circular rows may be designed and utilized, and may range from at least 1 to 10. The carousel 104 may be placed atop the pan 108 where cooking may happen. Pan 108 may be called pot, cooking pot, cooking pan, or cooking vessel herein. The carousel 104 may include openings (not shown), including substantially circular and other shapes, for dispensing food from ingredient containers outer container 100 and inner container 102, and other containers. These circular openings may be structured such that when food falls through these circular openings, they fall into the pan 108. A heater, such as, for example, an induction heater 122, may be used to cook a dish. It may include a stirrer 110 which may be moved in X and Y dimensions (with respect to pan 108) using robot mechanisms which may include round shafts or rails such as X rail 114 and Y rail 116. Stirrer 110 may also be designed to move in the Z dimension and various angles/combinations of X, Y and Z. A motor 118 may be used for rotating the stirrer 110. Several variations of these embodiments are possible. For example, the stirrer 110 may be attached to a polar robot mechanism. Polar mechanisms may provide improved resistance to cooking grease related reliability issues since they may be easier to seal. Cooking pan 108 and heater 122 may be moved via moving plate 120 up and down using a robot arm 112. Robot arms shown in FIG. 1 may be built using a number of different mechanisms, such as, for example, chains, belts, lead screws, ball screws and many other materials. A refrigeration system, a Peltier cooling system or other cooling apparatus may be utilized to cool the region above the carousel 104, and efficiency improved by placing components above the carousel 104 in a thermally isolated environment. The opening on the carousel which may allow food to be dispensed into the pan 108 may be open and closed using a robot arm or other actuation mechanism. The plate 120 may include a mass sensor which measures the weight of food in the pan. This may provide information about the status of a certain dispensing step i.e. how much food has been dispensed from ingredient dispensers such as outer container 100 and inner container 102 into the pan 108. The mass sensor may optionally also provide information about status of the cooking process—by measuring how much weight reduction happens during the cooking process. It will be clear to one skilled in the art that several variations of these embodiments may be possible. For example, an induction heater 122 need not be present, and one may dispense ingredients using the robotic cooking apparatus for making salads and other types of food. Sensors (not shown) may be present for estimating if ingredients in containers such as inner container 102 may be spoilt. Carousel 104 may include more than two rows of containers or just one row of containers. The temperature of the environment in which the carousel with containers is placed can be modulated, for example, using a refrigeration system or a heating system.

Figure 2:
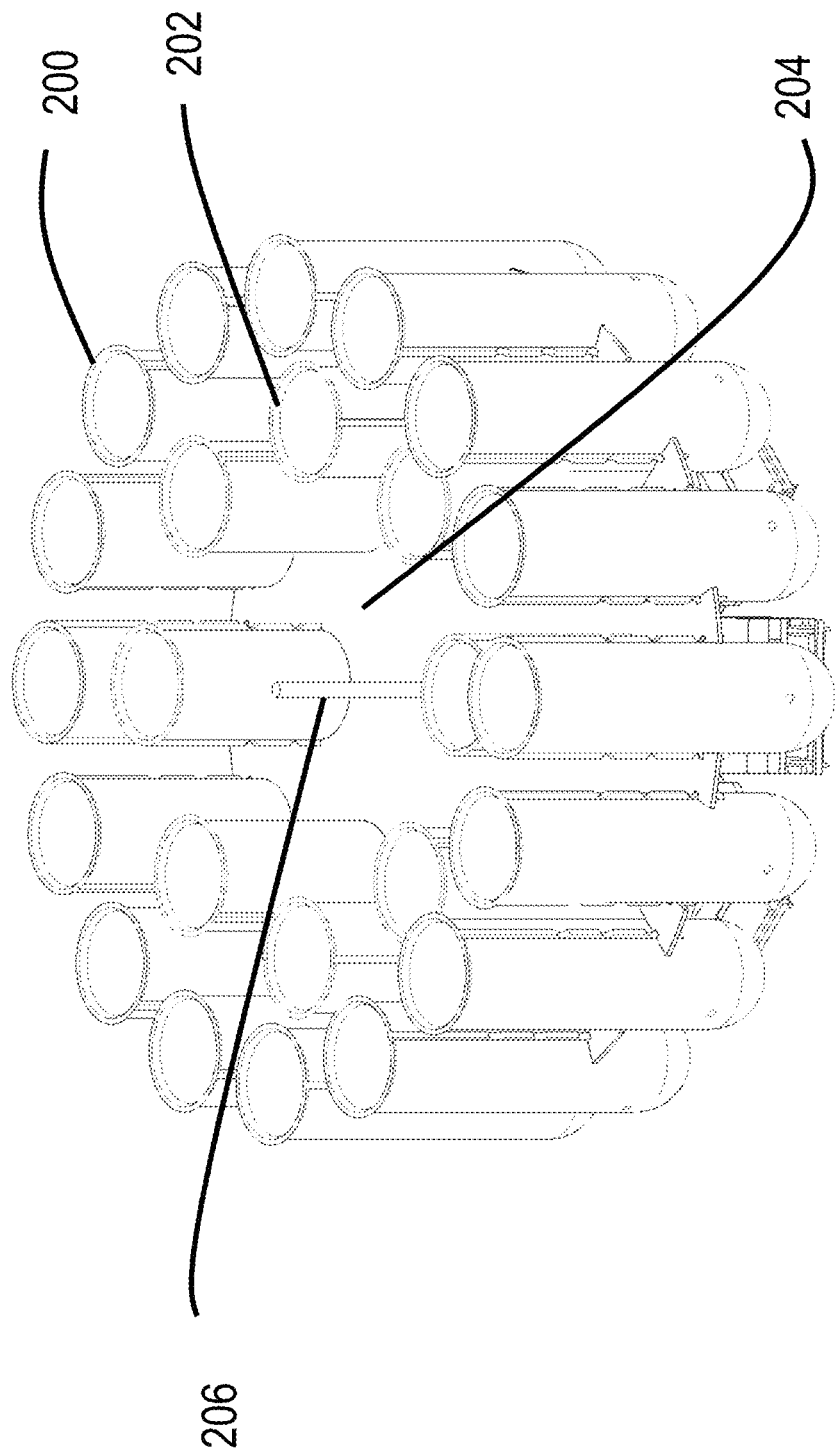
FIG. 2 depicts the carousel mechanism shown in FIG. 1.

FIG. 2 illustrates a close up view of a design of the carousel described in FIG. 1. Outer containers 200 and inner containers 202 may be placed on the carousel 204 which may contain a shaft 206. Placement of outer containers 200 and inner containers 202 on carousel 204 may be designed such that their bottom opening may be positioned substantially directly over opening(s) (not shown) in the thermally isolated carousel environment of FIG. 1. A chute configuration (not shown) may alternatively be employed wherein the containers are not substantially directly over the opening(s). Gravity feed as well as motorized movement of the food ingredients from the containers thru the opening(s) to the pan (or other receptacle) may be utilized.

Figure 3:
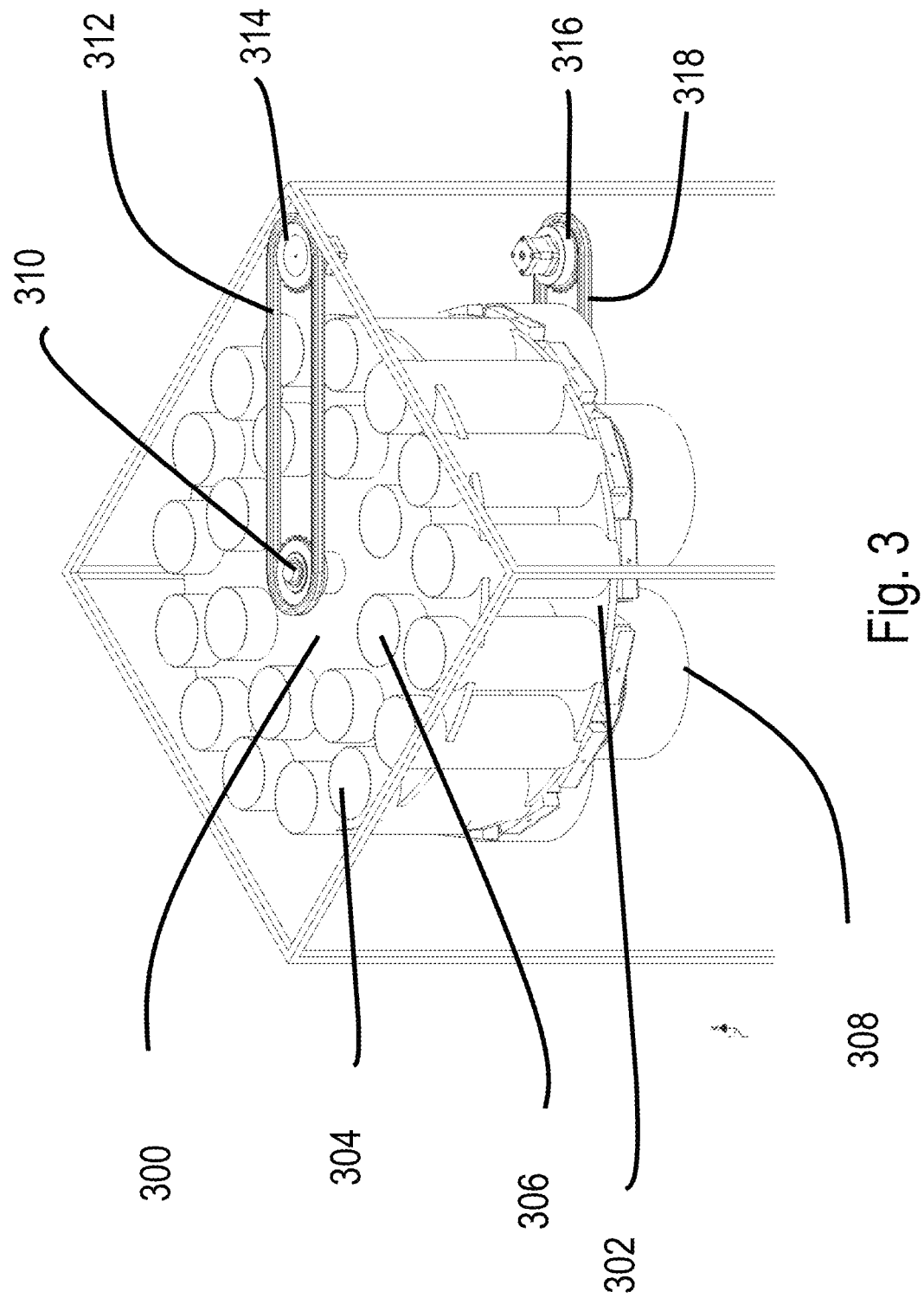
FIG. 3 illustrates an embodiment of this invention, wherein two carousels, one for housing ingredients and one for chopping ingredients, are placed atop a cooking pot.

FIG. 3 illustrates an embodiment of this present invention wherein two carousels, upper carousel 300 and lower carousel 302, may be placed above a cooking pan (not shown). The upper carousel 300 may be connected to containers having ingredients, such as outer ingredient container 304 and inner ingredient container 306. The lower carousel 302 may be connected to choppers such as chopper 308. Some choppers may contain blades to slice ingredients, some choppers may contain blades to dice ingredients, some choppers may contain blades to shred ingredients and some choppers may have other functions. The robotic cooking apparatus can control which ingredient container is placed above which chopper by rotating individual carousels upper carousel 300 and lower carousel 302, such that a certain ingredient, or combination of ingredients, may be chopped. Several mechanisms may exist to rotate carousels upper carousel 300 and lower carousel 302. For example, belts such as upper belt 312 and lower belt 318 may be used, in combination with pulleys upper carousel pulley 310, upper motor pulley 314 and lower motor pulley 316. Direct drive and other gearing mechanisms may also be utilized to rotate upper carousel 300 and lower carousel 302.

Figure 4:
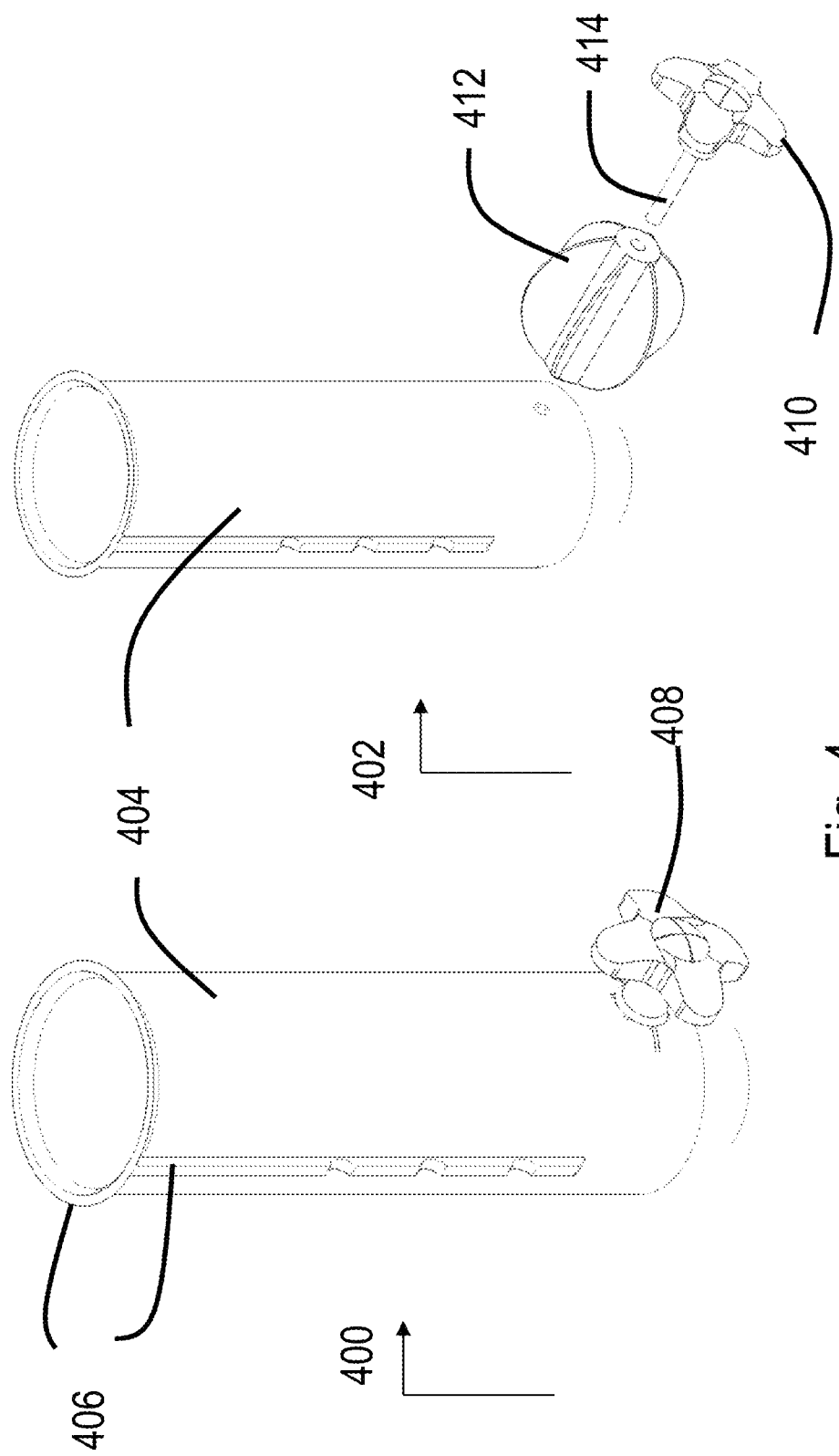
FIG. 4 illustrates an embodiment of this invention wherein a container with a rotating dispenser knob is used in combination with the carousel mechanism of FIG. 1.

FIG. 4 illustrates an embodiment of this invention, wherein the container shown in FIG. 4 may be used in conjunction with the carousel mechanism of FIG. 1 to dispense controlled amounts of ingredients. View 400 shows a side view of the container that may be used in the carousel 104 while second view 402 shows an exploded view of the container that may be used in the carousel 104. The container may include an object such as cylinder 404 for housing the ingredients. Cylinder 404 may have a square or rectangular cross sectional shape, the diameter may increase or decrease in the vertical direction, and the material composition and surface friction coefficient/roughness chosen, depending on design and engineering considerations, for example of the food ingredient type, moisture content, container cleaning/sterilization constraints and so on. Shapes such as container side 406 may be added to make insertion into a carousel mechanism easier by inserting the shapes into slots on a carousel. A shape such as handle 408 may be used to dispense controlled amounts of ingredients. The exploded second view 402 shows more details of the ingredient dispensing mechanism. When the knob 410 is rotated, the shaft 414 may rotate the paddle 412. The rotational motion may allow dispensing of controlled amounts of ingredients. Paddle 412 may be partially constructed of a flexible material, for example, such as silicone. Mass sensors (not shown) may be used in conjunction with this mechanism to determine the amount of ingredient dispensed. In addition, monitoring the rotational angle (theta) traversed by the knob 410 may provide an estimate/measure of the ingredient amount dispensed.

Figure 5:
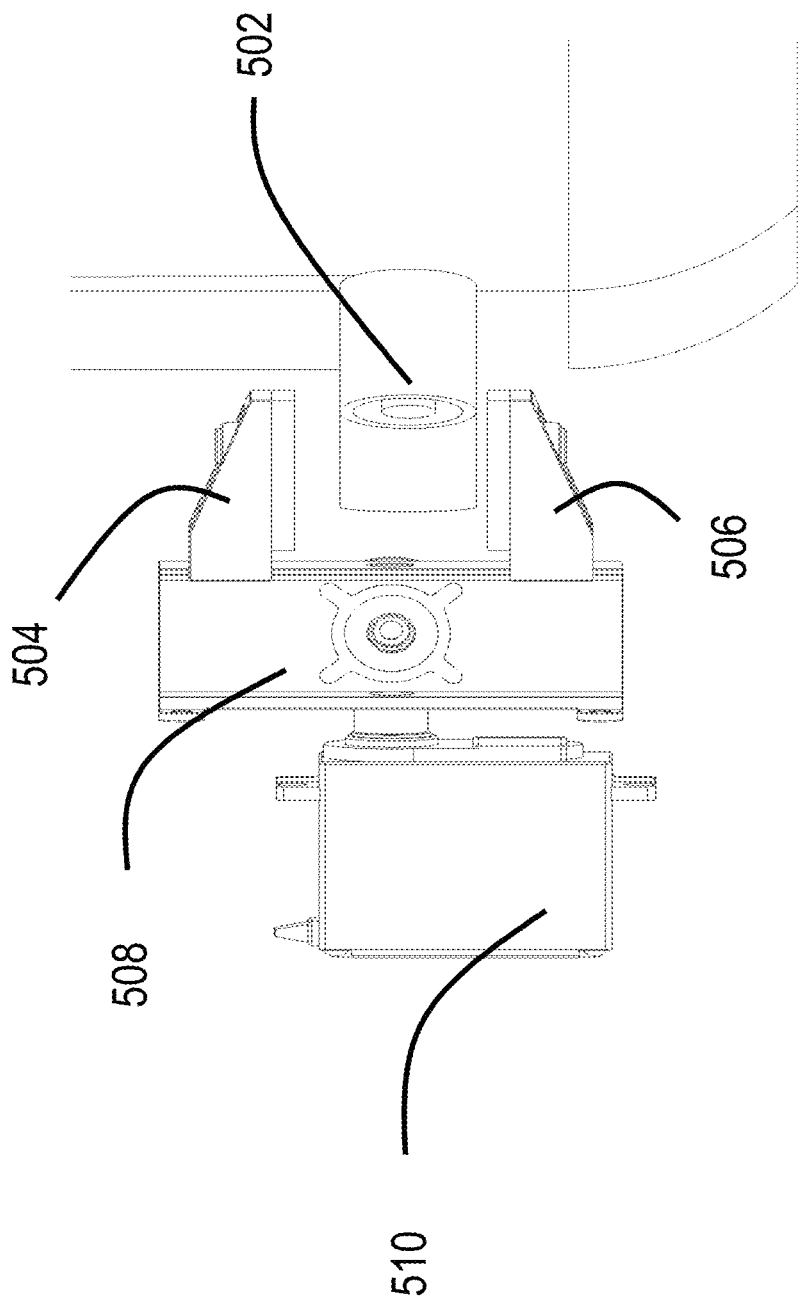
FIG. 5 illustrates an embodiment of this invention, namely an actuation mechanism for ingredient dispenser containers.

FIG. 5 describes an embodiment of this invention, which illustrates an apparatus for actuating the knob 410 of container cylinder 404 in FIG. 4 herein. Knob 402 (or some other projection) of the dispenser container may be present, and may be indicated as projection 502. To rotate the projection 502, a gripper mechanism may be used. Two arms of the gripper upper arm 504 and lower arm 506 may be used to grip and then securely hold the projection 502. Following this, the motor 510 may be used to rotate the gripper by rotating gripper body 508. In case some food items get stuck in container cylinder 404, gripper body 508 may be rotated in the opposite direction. Motor 510 and hence gripper body 508 (and ultimately the paddle 412) may also be run thru an acceleration/deceleration forward/reverse algorithm (for example, creating a vibration) to clear stuck food items. Several other mechanisms are possible to hold and rotate the projection 502, for example, utilizing a robotic arm, or single/quad gripper arms.

Figure 6A:
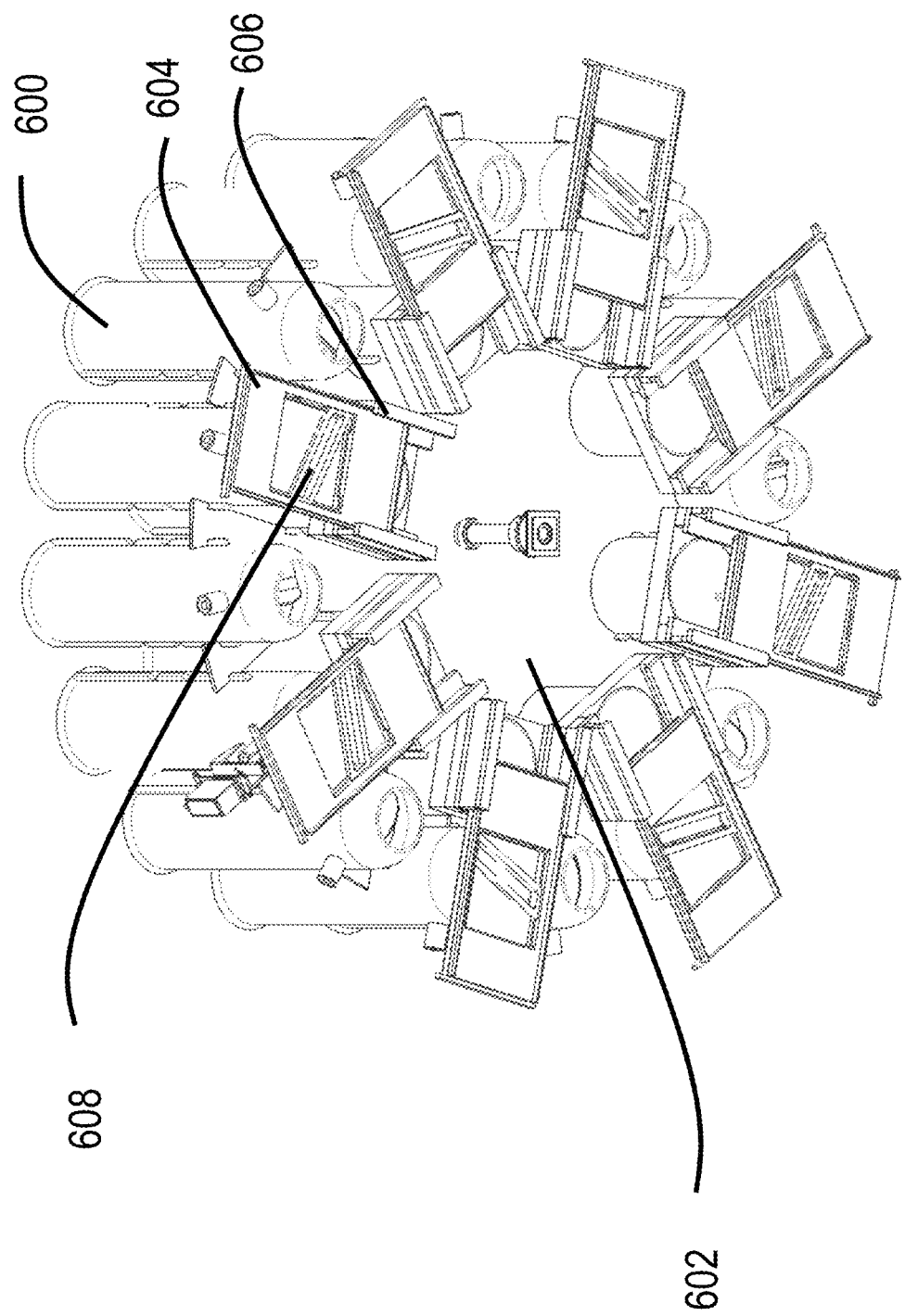
FIG. 6A illustrates an embodiment of this invention, which is an apparatus for chopping ingredients.

FIG. 6A illustrates an embodiment of this invention, which is an apparatus for chopping ingredients in the carousel mechanism that may be depicted with FIG. 1. Exemplary ingredient containers 600 may be placed in carousel 602. Chopping sliders 604 may be placed into sockets 606 at the base of ingredient containers so that they can slide back and forth in the sockets 606. Chopping blades 608 may chop up ingredients in containers when the chopping sliders 604 are moved in a certain direction. Chopping sliders 604 may be pushed and pulled using an actuator mechanism (not shown in the figure).

FIG. 6B describes an embodiment of this invention, which is an apparatus for dicing ingredients in the carousel mechanism that may be depicted with FIG. 1. Exemplary ingredient containers 620 may be placed in carousel 622. Chopping sliders 628 may be placed into sockets 630 at the base of ingredient containers so that they can slide back and forth in the sockets 630. Dicing grids, such as for example, 624 may be placed at the base of ingredient dispensers. Ingredients may be pushed down the ingredient containers using a plunger mechanism, such as for example, the plunger described. The action of ingredients being pushed down the ingredient dispenser into the dicing grid, in combination with the motion of chopping sliders 628, together may cause ingredients to be diced and dispensed. Chopping sliders 628 may also include chopping blades 626 to provide a dual use function.

FIG. 7 illustrates an embodiment of this invention which allows motion of components in a plane based on motion of multiple links first link 706 and second link 708. Motors first link motor 700 and second link motor 702 could be used to rotate links first link 706 and second link 708 and thus move a stirrer 710 to various points in a cooking vessel 714. Stirrer motor 704 may be utilized to provide other motions of stirrer 710, for example, rotation clockwise and counterclockwise, specific stirrer blade orientations in combination with link movement and orientation (for example, to provide a scrapping action on the surface of cooking vessel 714), and so on. The cooking vessel 714 may be located atop a heater 716. With this type of robotic system for handling the stirrer 710, wires and motors may be enclosed and thereby protected from environmental factors, such as, for example, dirt and grease. This type of link based system can be used for moving or providing motion to objects and mechanisms other than stirrers, such as, for example, spice dispensers, liquid dispensers and other objects. Several variations of this link based system may possible. For example, one could have more links than two, motors may be placed at alternative positions, Z motion and combinations of X, Y, and Z motions, and many other options may be possible.

Figure 8:
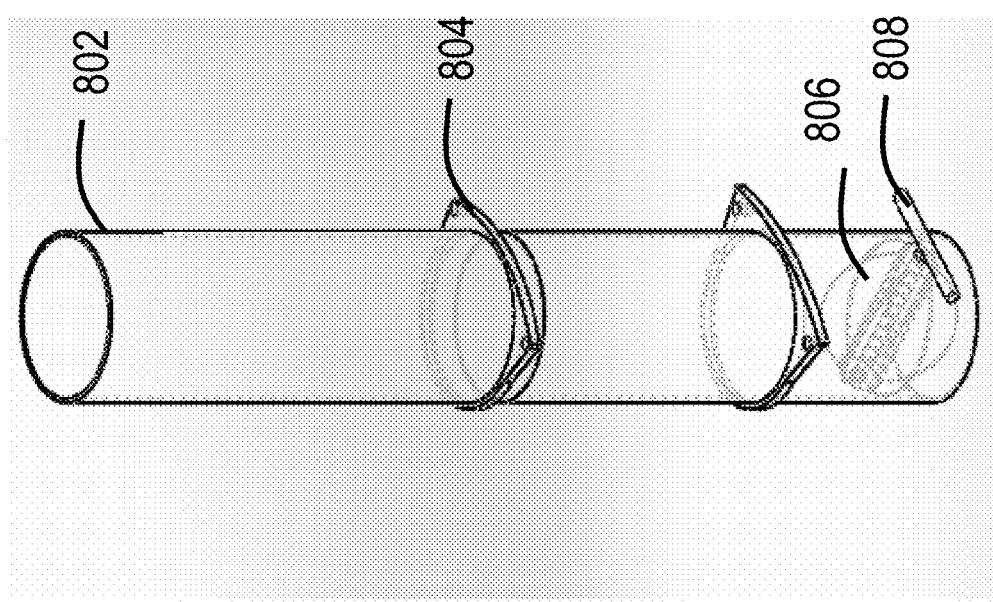
FIG. 8 illustrates an embodiment of this invention, which may dispense solid ingredients.

FIG. 8 illustrates an embodiment of this invention, a solid dispensing apparatus. A paddle 806 (similar to paddle 412 of FIG. 4 herein) may be present within a food containing tube 802 (which is similar to ingredient containers of at least FIGS. 1-4, 6A and 6B herein). The tube 802 may be attached to a carousel using collars 804. The knob 808 (similar to knob 410 of FIG. 4 herein) may be rotated using the help of a motor to rotate the paddle 806 and in combination with gravity, dispense food. The term pin may also be used to describe the knob at various sections of this patent application. To reduce sticking of food in the food containing tube 802, the knob 808 may be rotated in more than one direction during the dispensing process, as described previously in at least FIG. 4 & related specification sections herein. At various points of this patent application, the terms tubes and canisters may be used interchangeably.

Figure 9:
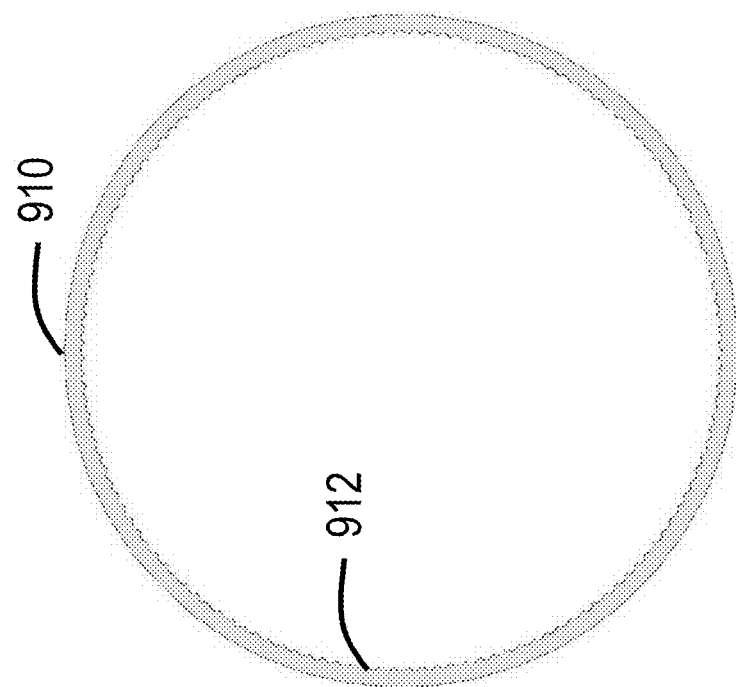
FIG. 9 illustrates an embodiment of this invention, wherein food is prevented from sticking on to the sides of the ingredient container by reducing the surface area of contact between the ingredient container and the food.

FIG. 9 illustrates an embodiment of this invention, which may help reduce sticking of food on the sides of container 802 depicted in FIG. 8. This may be done by having non circular sidewalls 912 on the inside of the container so that surface area of contact between the food item and the inside wall is reduced. The outside wall 910 may be circular. Several variations of these embodiments may be possible. For example, one could have non-circular inner and outer walls and one may use wave-like patterns or other patterns on the inner walls to reduce sticking. The pattern could be tuned or 'matched' to the type and shape of the food ingredient. For example, a vertical wave pattern could be the half or quarter period of the average size ('wave') of the food item.

Figure 10B:
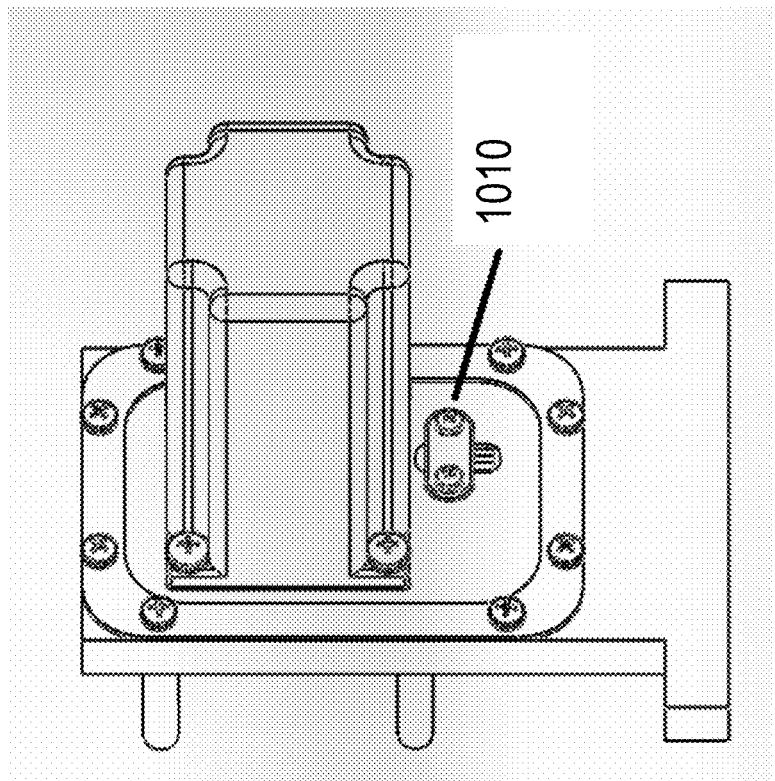
FIG. 10A and FIG. 10B illustrate embodiments of this invention, wherein the mechanism for dispensing and sensing is described.
Figure 10A:
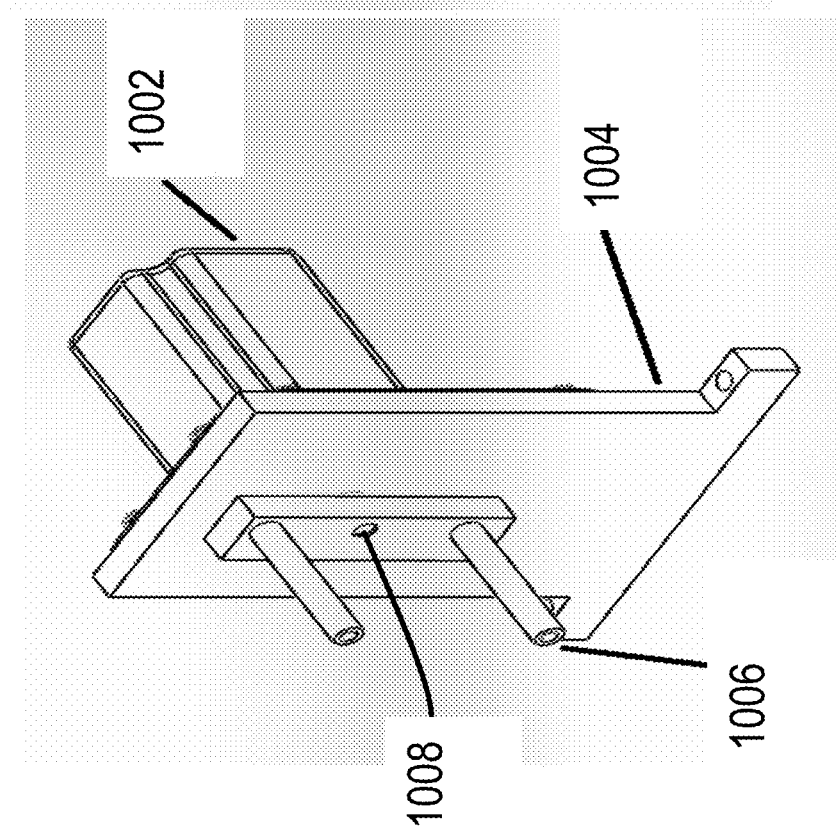

FIG. 10A and FIG. 10B illustrate an embodiment of this invention, a mechanism to rotate the knob 808 shown in FIG. 8. In FIG. 10A, the motor 1002 may be used to rotate a shaft 1008 which may in turn rotate the dispensing mechanism 1006. A magnet may be used as part of the dispensing mechanism 1006. A hall sensor 1010 shown in FIG. 10B may be used to determine the rest position of the knob 808 after the dispense operation is complete.

Figure 11:
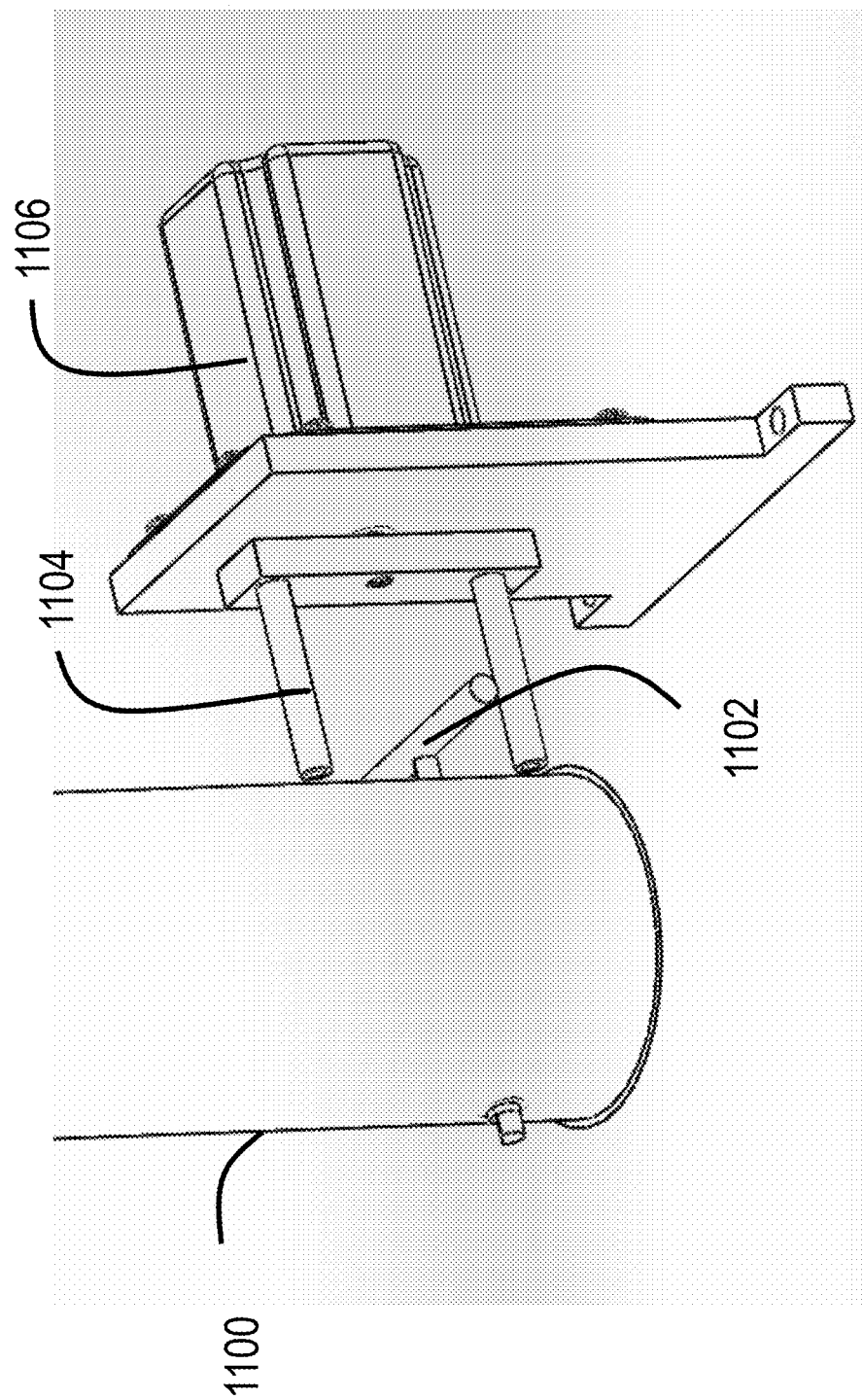
FIG. 11 illustrates an embodiment of this invention, wherein the mechanism for dispensing food is described.

FIG. 11 illustrates an embodiment of this invention, a mechanism to dispense food, which may include ingredient container 1100, ingredient container knob 1102, dispensing knob 1104 and motor 1106. A motor 1106 may be used to rotate the dispensing knob 1104. When dispensing knob 1104 rotates, the ingredient container's knob 1102 may also rotate. This, in turn, may dispense food ingredients from ingredient container 1100. The term "pin" may be used instead of the term "knob" at various sections of this document.

Figures 12A, 12B:
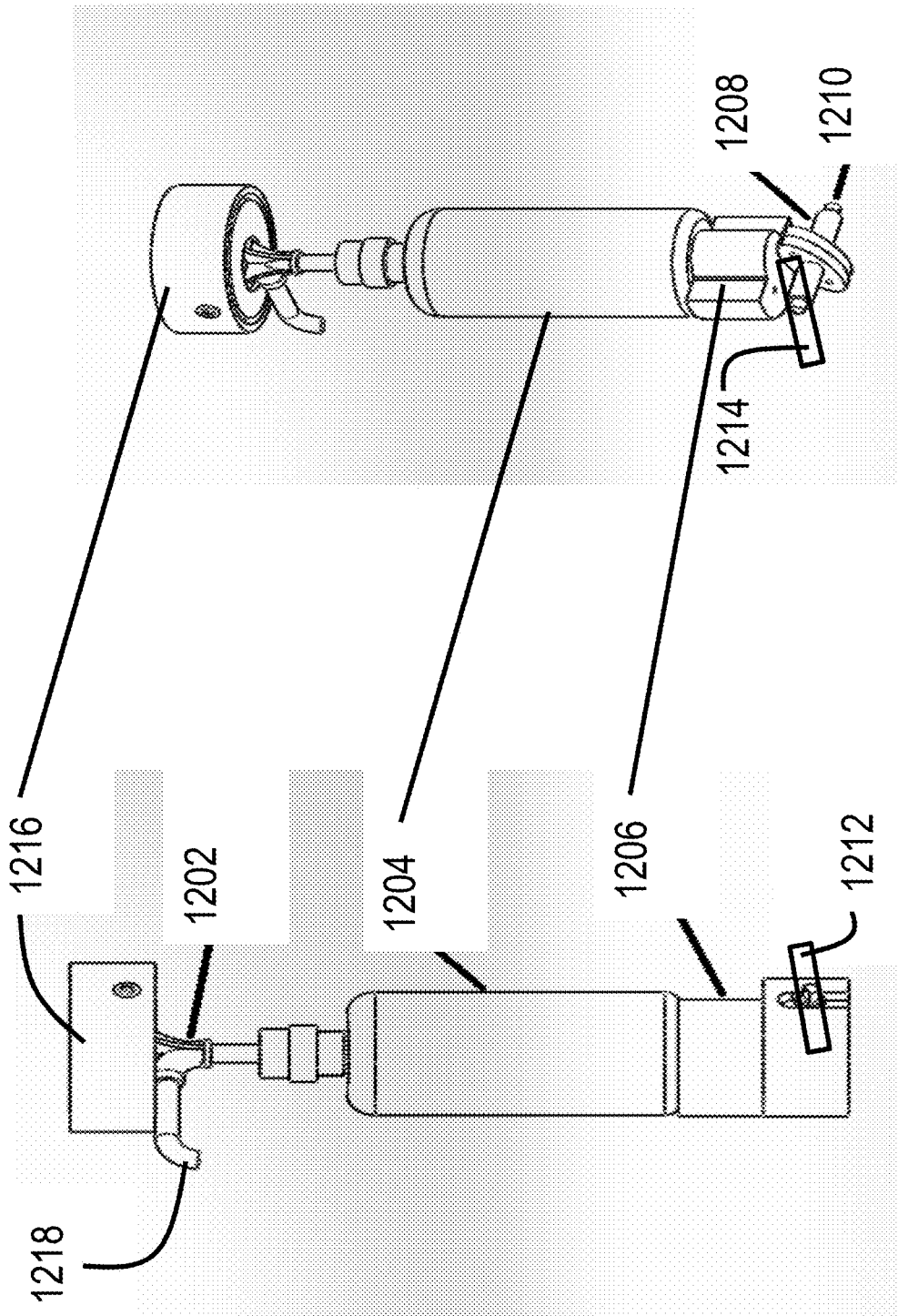
FIG. 12A and FIG. 12B illustrate embodiments of this invention that dispense liquids.

FIG. 12A and FIG. 12B illustrate embodiments of this invention, a liquid dispensing system, which may include pin 1202, ingredient container 1204, spacer 1206, cam mechanism 1208, shaft 1210, ingredient container knob 1212, pin 1214, head 1216 and spout 1218. When the ingredient container knob 1212 may be rotated, the cam mechanism 1208 may be pushed up on the spacer 1206. When the cam mechanism 1208 is pushed up, the spout 1218 may dispense the ingredient from the container 1204 using a pump mechanism. A one way valve may be added to the end of the spout 1218 to reduce dripping of the liquid when dispensing action is not required.

FIG. 13 illustrates an embodiment of this invention, a mass sensor scheme, which may include load cell 1302, mass measuring system 1304 and bowl 1306. A load cell 1302 may be used and attached to a mass measuring system 1304. When food falls into the mass measuring system 1304 through the top opening into the salad bowl 1306, the weight may be measured. Based on whether the desired weight of the ingredient has been dispensed, the motor for dispensing the ingredient may be turned to OFF position. The mass sensor system shown in FIG. 13 is isolated from the food zone where the salad bowl or cooking container or induction heater may be placed. According to an embodiment of this invention, the bowl 1306 may be placed such that it is isolated from wires associated with the load cell 1302.

Figure 14:
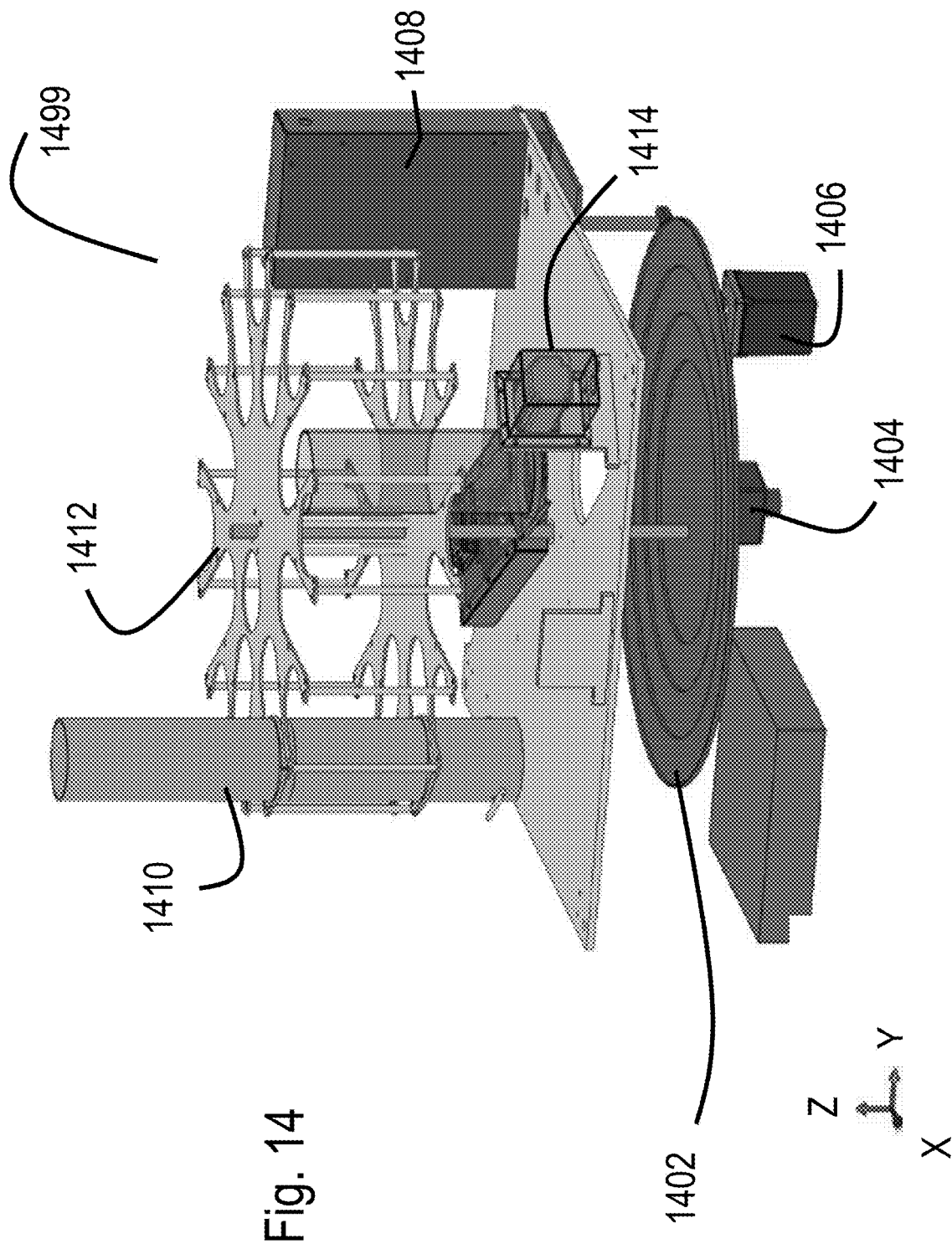
FIG. 14 illustrates an embodiment of this invention that shows a system capable processing various types of food.

FIG. 14 is an illustration of an embodiment of this invention which illustrates a food system 1499, part of a robotic cooking apparatus, capable of helping make pizza, cook food, make burritos, make salads and make several other types of food. Food system 1499 may include plate 1402, second link motor 1404, first link motor 1406, compartment 1408, ingredient containers 1410, carousel 1412 and dispenser motor 1414. Ingredients may be placed in ingredient containers 1410 (one shown for clarity) and may be dispensed using motion of the carousel 1412 and dispensing mechanisms which use dispenser motors such as, for example, dispenser motor 1414. The dispensing mechanisms may be shared among multiple containers to lower cost and weight of the food making machine.

In case of making pizza, the pizza base may be placed on the plate 1402. The plate 1402 may be moved using a multi-link mechanism which in turn may move based on motion of motors second link motor 1404, first link motor 1406 and additional motors placed in compartment 1408. Ingredients may be dropped on the pizza base using technologies described in FIG. 1-FIG. 13 herein. The pizza base may be moved using motion of the plate 1402 to distribute the ingredients over the pizza area.

In case of making burritos, the tortilla may be placed on the plate 1402 and ingredients may be dispensed atop it.

In case of making salads, the salad bowl may be placed on the plate 1402 and ingredients may be dispensed atop it.

In case of making one pot meals, such as, for example, stews and many Indian and Chinese and Thai entrees, an induction heater and the pot may be placed atop the plate 1402 and ingredients may be dispensed into the pot. An additional robot arm may be used to stir the food. The robot arm may be designed as a Cartesian robot system with a stirrer at the end or using a technique similar to the one described in FIG. 7 herein or using some other technique.

Figure 15:
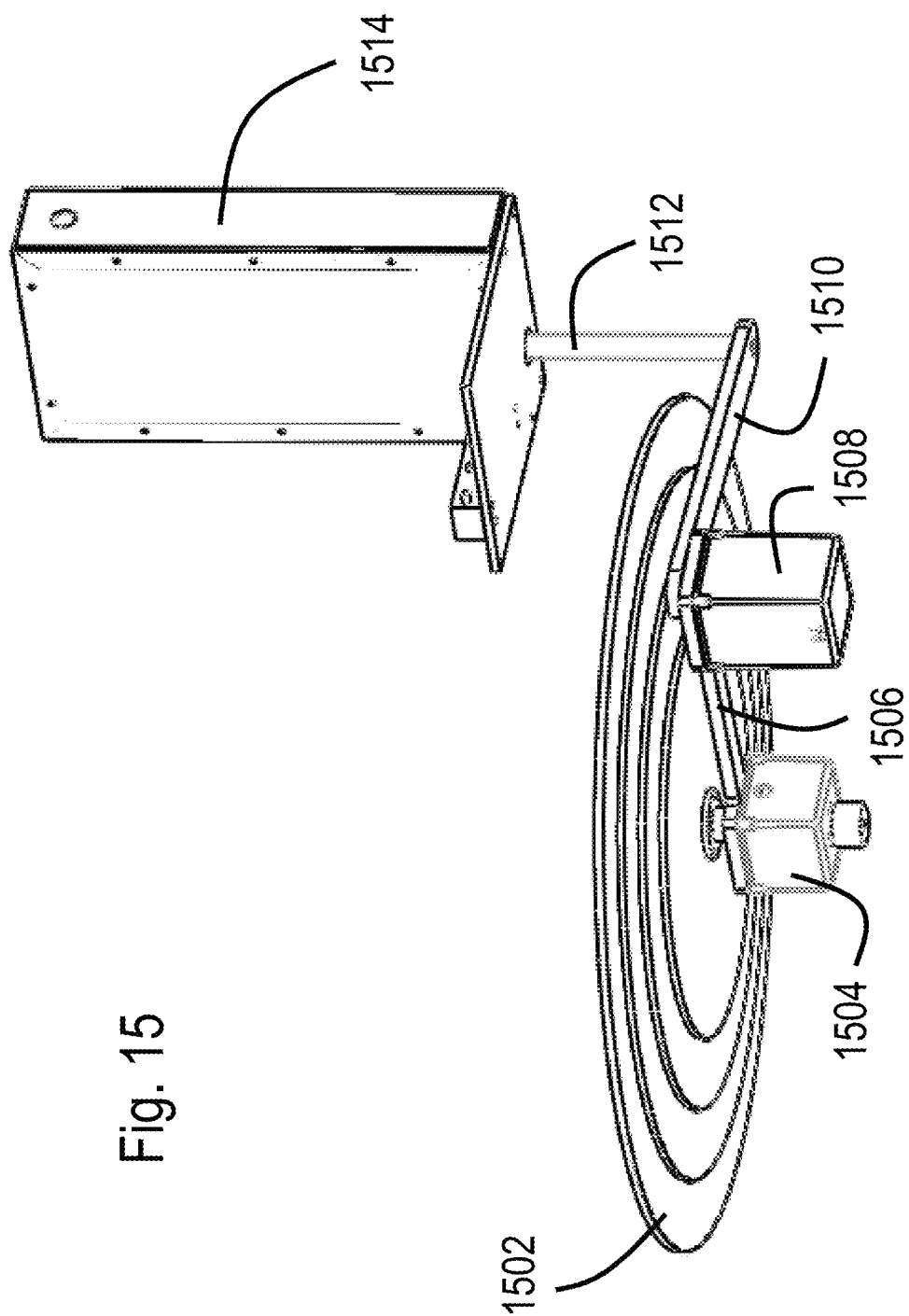
FIG. 15 illustrates an embodiment of this invention that shows the system for placing the salad bowl or pizza base or cooking pot and heater or tortilla (for making burritos) and in general for placing the base that is processed further.

FIG. 15 is an illustration of an embodiment of this invention, which illustrates a closer view of the mechanism for moving the plate 1402 of FIG. 14. The plate 1502 may be moved using motion of links third link 1506, second link 1510 and first link 1512. The motors third link motor 1504 and second link motor 1508 may rotate to move links third link 1506 and second link 1510 and thereby move the plate 1502 in the horizontal plane. The first link 1512 may move up and down via motors placed within compartment 1514. Several other mechanisms may provide movement to the plate 1502 in the X, Y, Z plane and dispense ingredients onto it. For example, placing plate 1502 on a 3D motion table.

Figure 16:
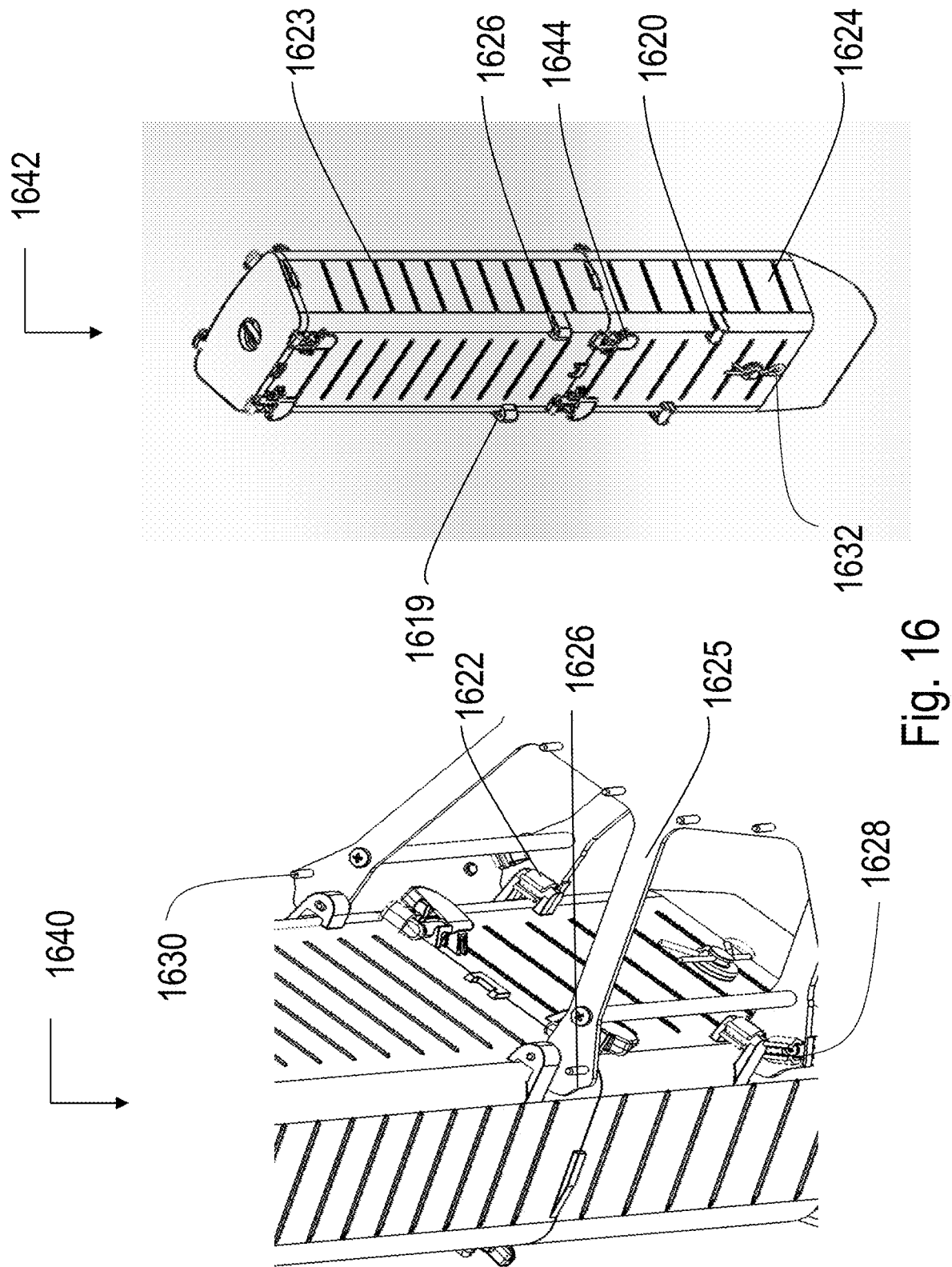
FIG. 16 illustrates an embodiment of this invention that illustrates a modular ingredient container and shows how it may be attached to a carousel.

FIG. 16 is an illustration of an embodiment of this invention that describes a modular ingredient container and shows how it may be attached to a carousel. The modular ingredient container 1642 (and blow-up 1640) may consist of two or more portions (such as, for example, upper portion 1623 and lower portion 1624) that may be attached to each other using a latch mechanism 1644. Using modular ingredient containers is an innovation that provides several benefits: (1) If one wants to increase food capacity of the apparatus, one more modular ingredient container portions can be added to provide extra capacity (2) A big size ingredient container, when split into two smaller ingredient containers, is easier to fit into a dishwasher or sink for cleaning purposes. The modular ingredient containers may be attached to carousel 1625 using various mechanisms. These may include a pin-mechanism, wherein pins such as pin 1630 may be inserted into slots such as left slot 1619 and right slot 1626. Modular ingredient containers may also be attached to carousel 1625 using clip mechanisms, wherein a clip 1628 may be used to attach to a portion of an ingredient container such as location 1620. An example where a portion of an ingredient container is attached to a clip 1622. Several alternative mechanisms may be possible to attach an ingredient container to the carousel. For example, magnets, for example a combination of permanent and electromagnets may be used. Pins, such as for example, cotter pins 1632 may be used to make sure a shaft used in the canister does not slip out.

Figure 17:
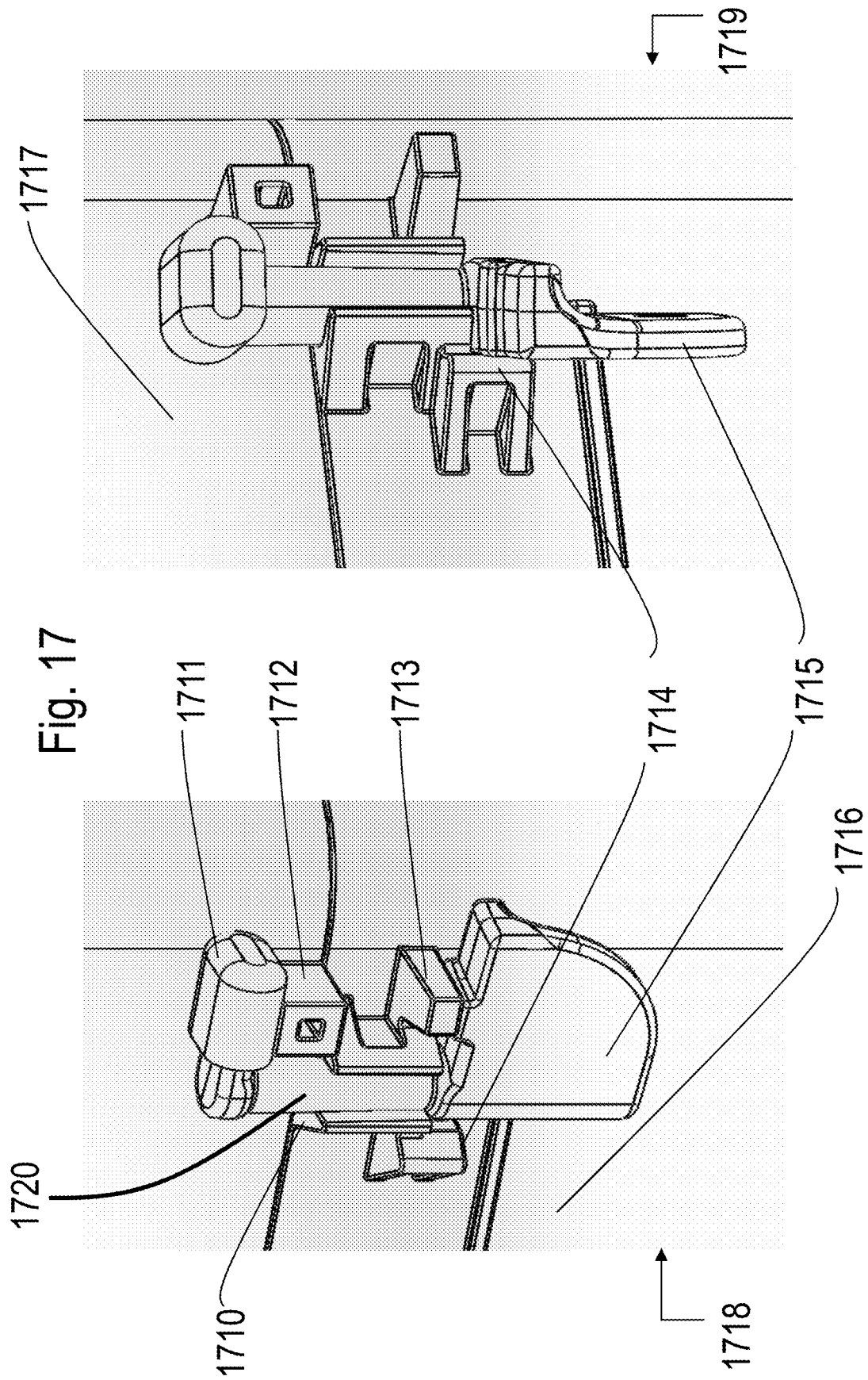
FIG. 17 illustrates an embodiment of this invention, that shows how modular ingredient containers may be attached to each other.

FIG. 17 is an illustration of an embodiment of this invention how different portions of an ingredient container may be attached to each other. Projections such as first projection 1712, second projection 1713, third projection 1710 and fourth projection 1714 may be added to ingredient container portions upper portion 1717 and lower portion 1716 which may need to be attached to each other. A joiner may be added that may consist of parts such as flap 1715, elastic flap 1711 and stem 1720. The elastic flap 1711 may allow for a good fit despite the manufactured tolerance of various parts. It may consist of a flexible material that can deform to allow a good fit. Examples of flexible materials may include silicone rubber, polyurethane and many other materials. The stem 1720, flap 1715 and other parts of the joiner may consist of non-flexible materials so that multiple parts of an ingredient container are closed securely, without leakage of material. Examples of materials for this application may include polycarbonate, PVC and many other materials. The ingredient containers may be open or closed by moving joiners into open or closed positions. FIG. 17 includes locked position 1718 and unlocked position 1719 illustrations. At various sections of this patent application, the term latch may be used in place of the term joiner.

Figure 18:
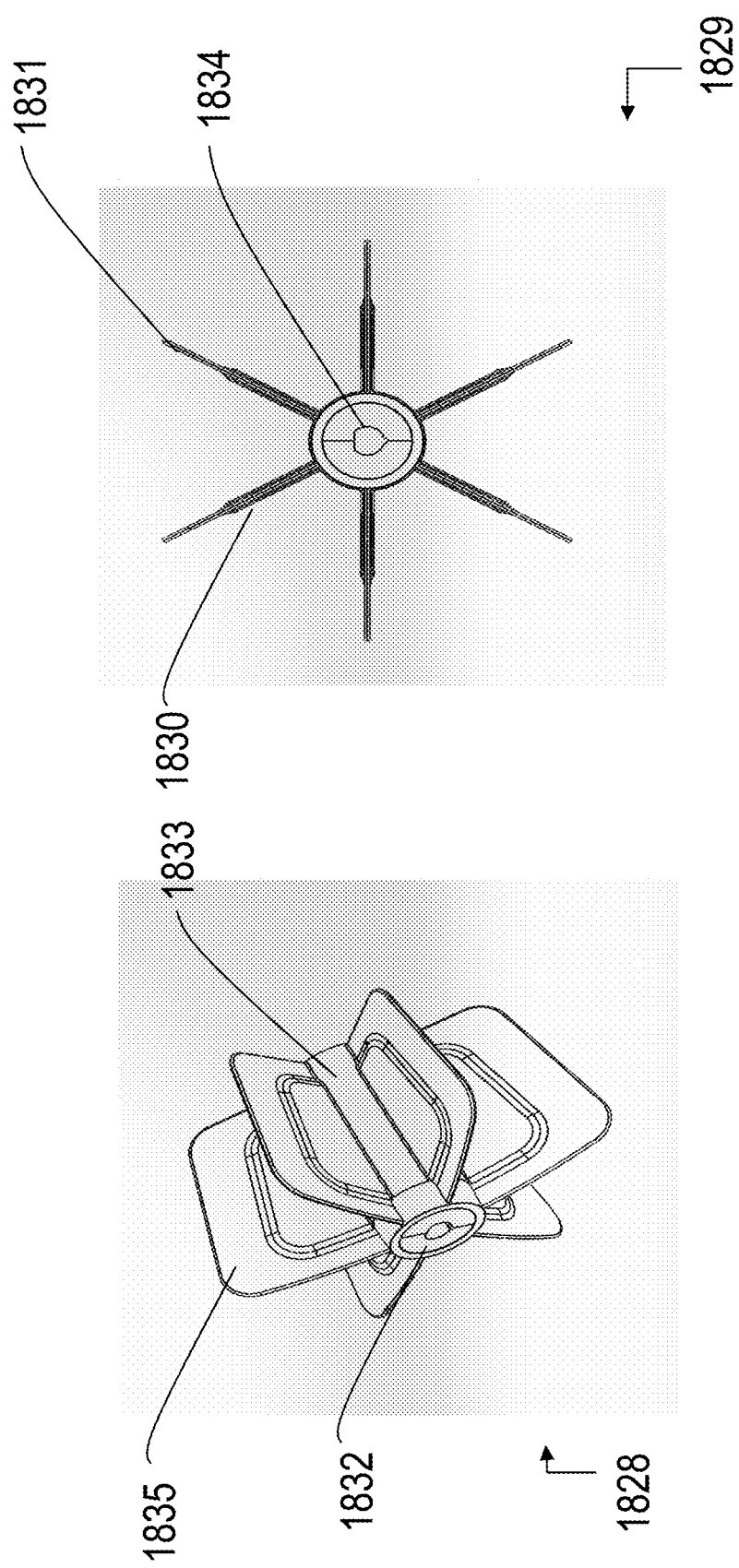
FIG. 18 illustrates an embodiment of this invention, a paddle for dispensing ingredients.

FIG. 18 is an illustration of an embodiment of this invention how paddles may be designed for use in the ingredient containers. The paddles may, for example, be constructed of similar or multiple different materials for core 1834 and external portions first extension 1830 and second extension 1831. According to one embodiment of this invention, the core 1834 may primarily include a non-flexible plastic, such as, for example, polycarbonate, PVC or other suitable non-flexible plastic. The external portions first extension 1830 and second extension 1831 may have flexible materials, such as, for example, silicone rubber, polyurethane or some such material. According to one embodiment of this invention, the external portion first extension 1830 may be thicker than the external portion second extension 1831. This could provide the most effective combination of stiffness and flexibility for dispensing specific ingredients. Alternatively, one could have just one thickness for the whole external portion. It will be clear to one skilled in the art that several different thicknesses for the non-flexible plastic may be possible at different external portions of the paddle, to provide various mechanical properties needed for dispensing ingredients. According to an embodiment of this invention, the external portions first extension 1830 and second extension 1831 may be overmolded atop the core 1834. Holes 1832 may be inserted into the core 1834 to allow more convenient overmolding.

Figure 19:
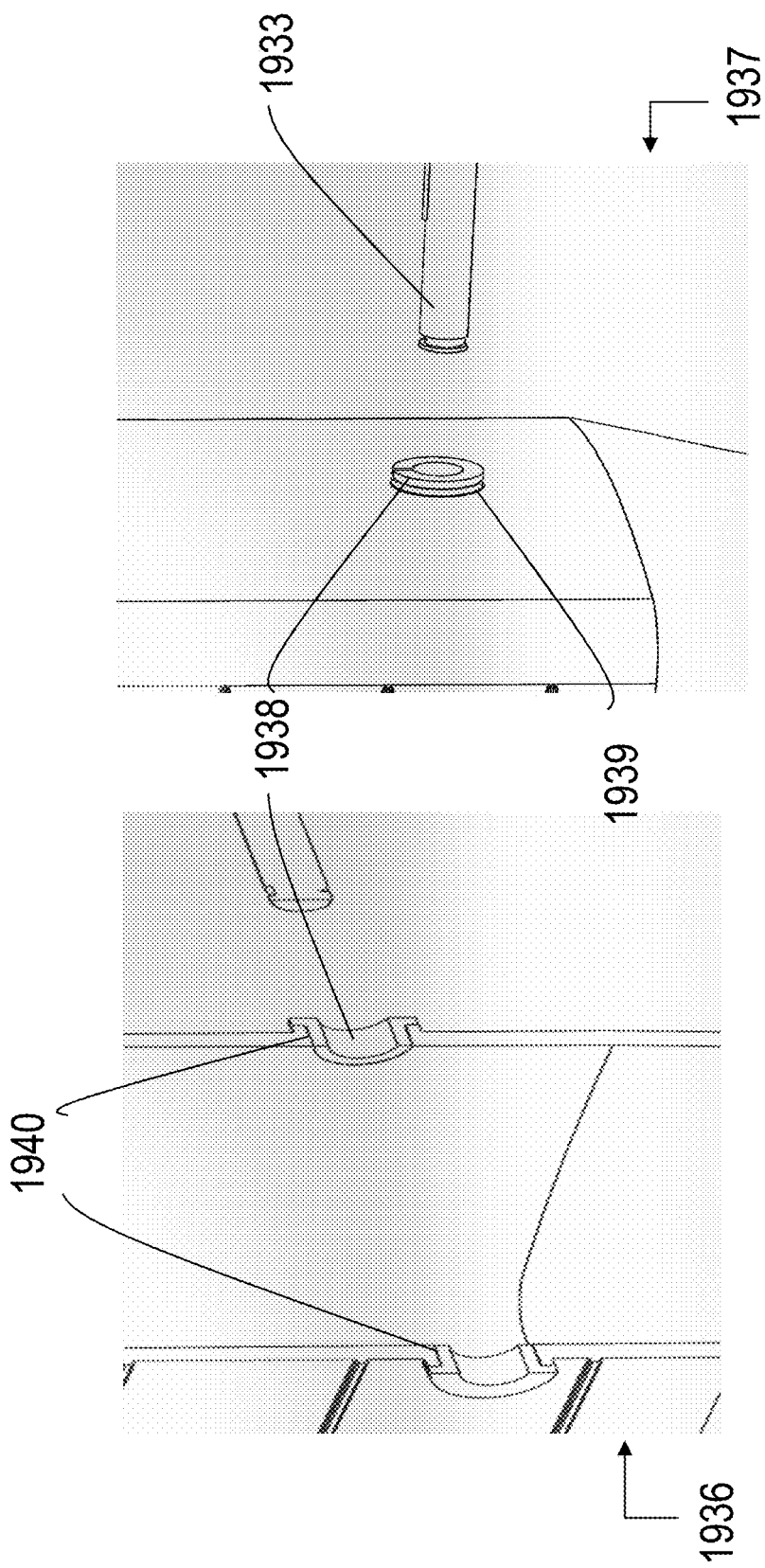
FIG. 19 illustrates an embodiment of this invention, a bearing for ingredient containers.

FIG. 19 is an illustration of an embodiment of this invention how bearings may be used to provide long-term reliability to containers. When shafts 1933 are inserted into containers 1936 and rotated over long-periods of time to dispense ingredients, plastic used in containers 1936 may degrade and/or wear away. By inserting bearings outer bearing 1940 and inner bearing 1938 into the ingredient container 1936, the reliability challenges may be reduced. Various types of bearings and materials for bearings may be possible, and could reduce friction, degradation or wear.

FIGS. 20A-20C illustrate an embodiment of this invention, wherein multiple hall sensors and magnets may be placed within a dispenser motor assembly to more accurately dispense ingredients. FIG. 20A indicates a dispensing actuator arm 2004, a motor shaft 2006 that rotates actuator arm 2004, a plate 2008 and a motor cover 2002. Two Hall Sensors sensor one 2010 and sensor two 2012 may be used to detect the location of the actuator arm 2014 based on position of magnets top magnet 2016 and bottom magnet 2018. When a magnet is directly above a sensor during rotational motion of actuator arm 2014, the sensor may indicate it and give feedback to the control PCB on location of the actuator arm. Various types of sensors may be possible, not just Hall sensors. Magnets may be of various shapes, sizes and types. More than two Hall sensors may be used. A single Hall sensor architecture may be used as well. Alternatively, an encoder may be used in the motor to indicate its position.

Figure 21:
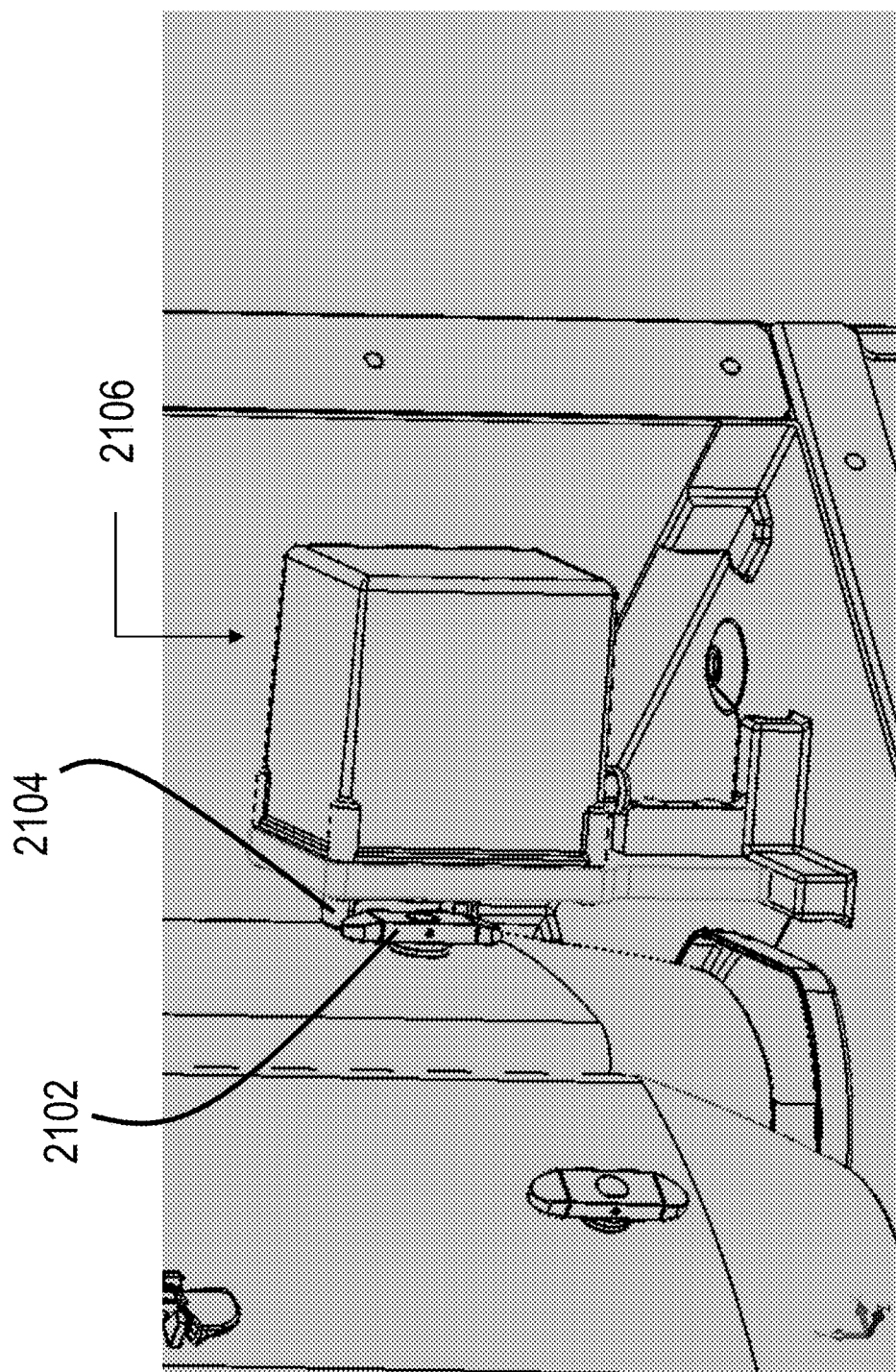
FIG. 21 illustrates an issue with a proposed dispensing system, wherein vertical knobs can collide with an actuator used for dispensing.
Figure 22:
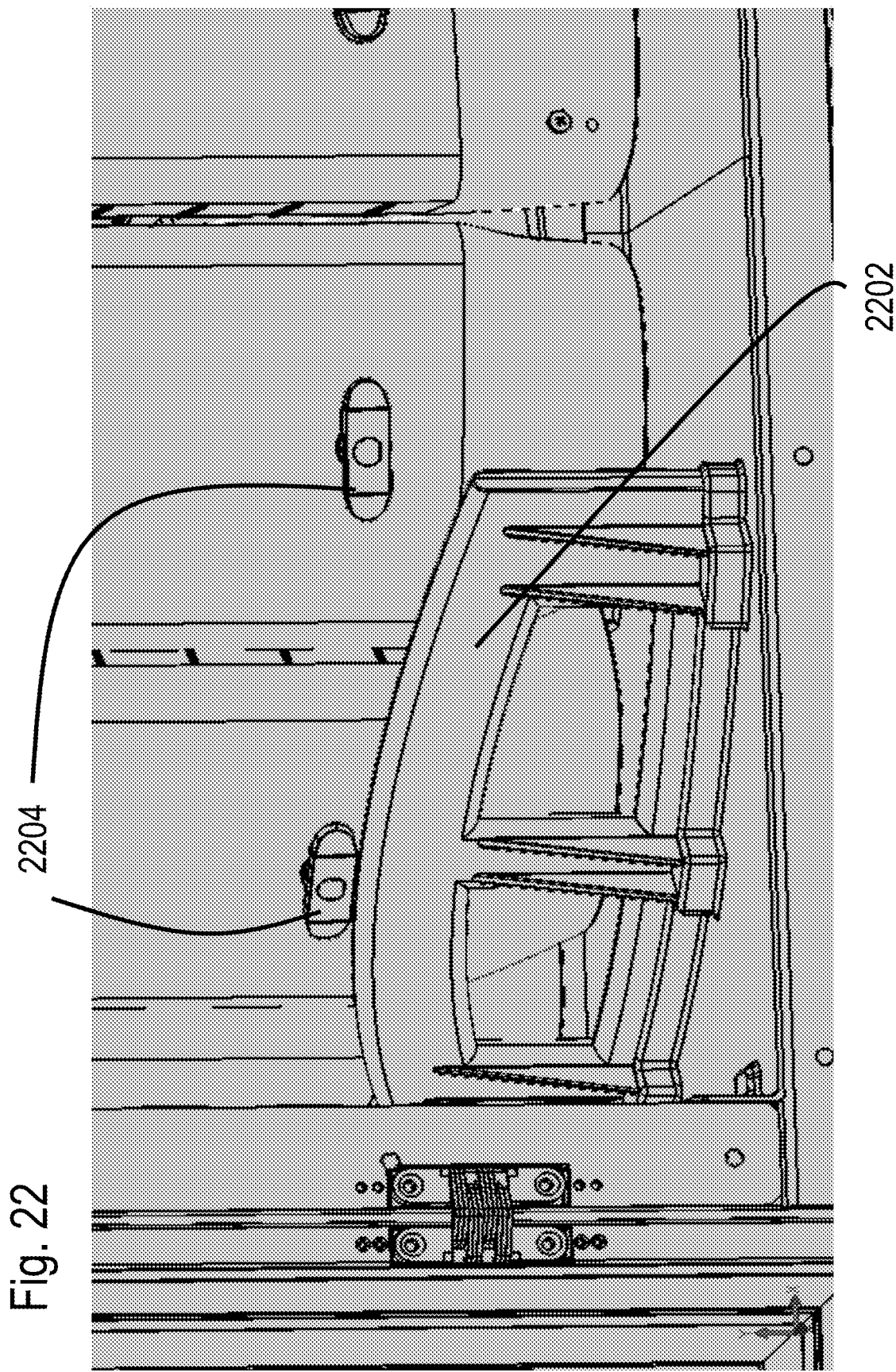
FIG. 22 illustrates an embodiment of this invention, that shows how a knob may be straightened with a "knob straightener mechanism"

FIG. 21 illustrates an issue that arises when using a pin-dispenser rod actuator system 2106. The pin 2102 and actuator arm 2104 may be aligned in the same direction and could crash during motion of a carousel. This needs to be avoided for proper system operation. FIG. 22 illustrates an embodiment of this invention, a system for aligning pin 2204 so that it does not collide with the actuator arm shown in FIG. 21. A pin straightener 2202 may be placed in the apparatus. When the carousel rotates, pins 2204 may be automatically aligned into a horizontal direction due to engagement with the pin straightener 2202.

Figure 23B:
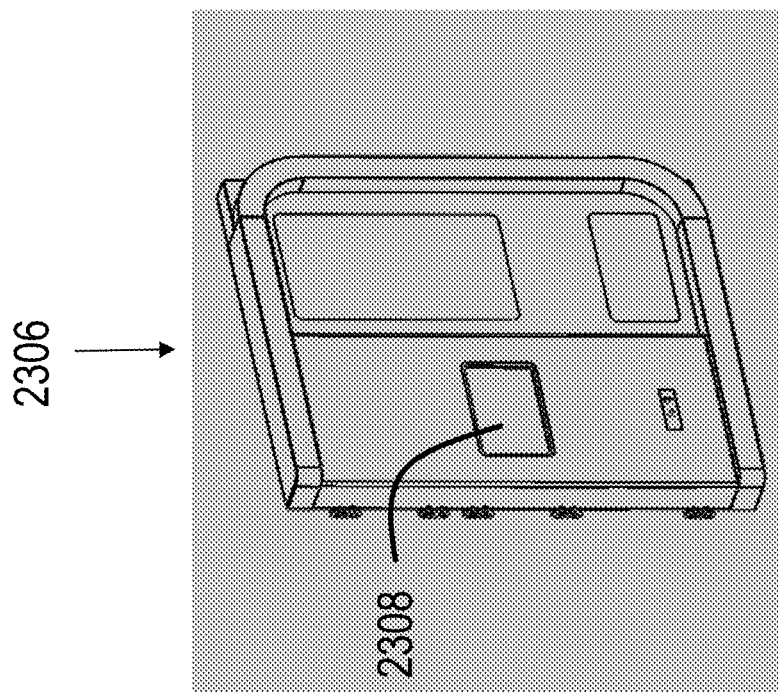
FIGS. 23A-23B illustrate an embodiment of this invention, that shows how a robot may be controlled using a touchscreen user interface.
Figure 23A:
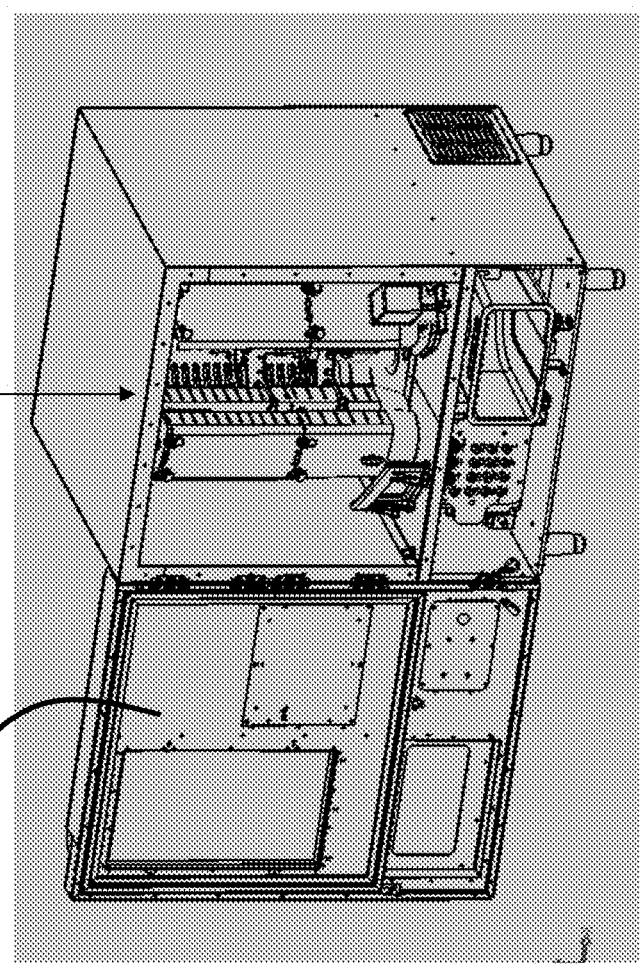

FIGS. 23A-23B illustrate an embodiment of this invention, wherein a touchscreen may be used to control the operation of a food preparation/robotic cooking apparatus having one of more of the features indicated in FIGS. 1-22 and FIGS. 24-28. The touchscreen 2308 may be placed within door 2306, as indicated in FIG. 23B. FIG. 23A indicates the back side of the door 2304 and view 2302 indicates an exemplary carousel system with exemplary canisters loaded on it. Customers may use the touchscreen 2308 to indicate their food choices and the apparatus indicated in FIG. 23A-B may prepare the food.

Food preparation apparatuses as shown in this patent application frequently need to be refrigerated to store food over prolonged periods of time without spoilage. FIG. 24A-B illustrates an embodiment of this invention, which is a system for thermally insulating the food storage chamber of the apparatus. The system may consist of an insulation canister 2404 meant for insulation purposes. One position of the insulation canister 2404 may be indicated in FIG. 24A, where the insulation layer 2406 does not contact the food opening 2402 i.e. the food opening is unsealed. Another position of the insulation canister 2404 may be indicated in FIG. 24B wherein the insulation layer 2406 may contact the food opening 2402, seal it and prevent significant heat from entering the chamber. The insulation layer 2406 may include a good insulator, such as, for example, silicone or some other insulation material. The insulation layer 2406 may also include a material which has some flexibility so that it gives a tight fit to the food opening 2402. When the apparatus is not being used for making food, a carousel may move the canister meant for insulation (insulation canister 2404) directly above the food opening 2402 and keep the food storage chamber insulated. It will be clear to one skilled in the art that several variations of this embodiment may be possible. For example, shape of canisters, insulation layers and food openings may be different than illustrated. Insulation canister may also contain some insulative material in addition to insulation layer 2406.

Figure 25:
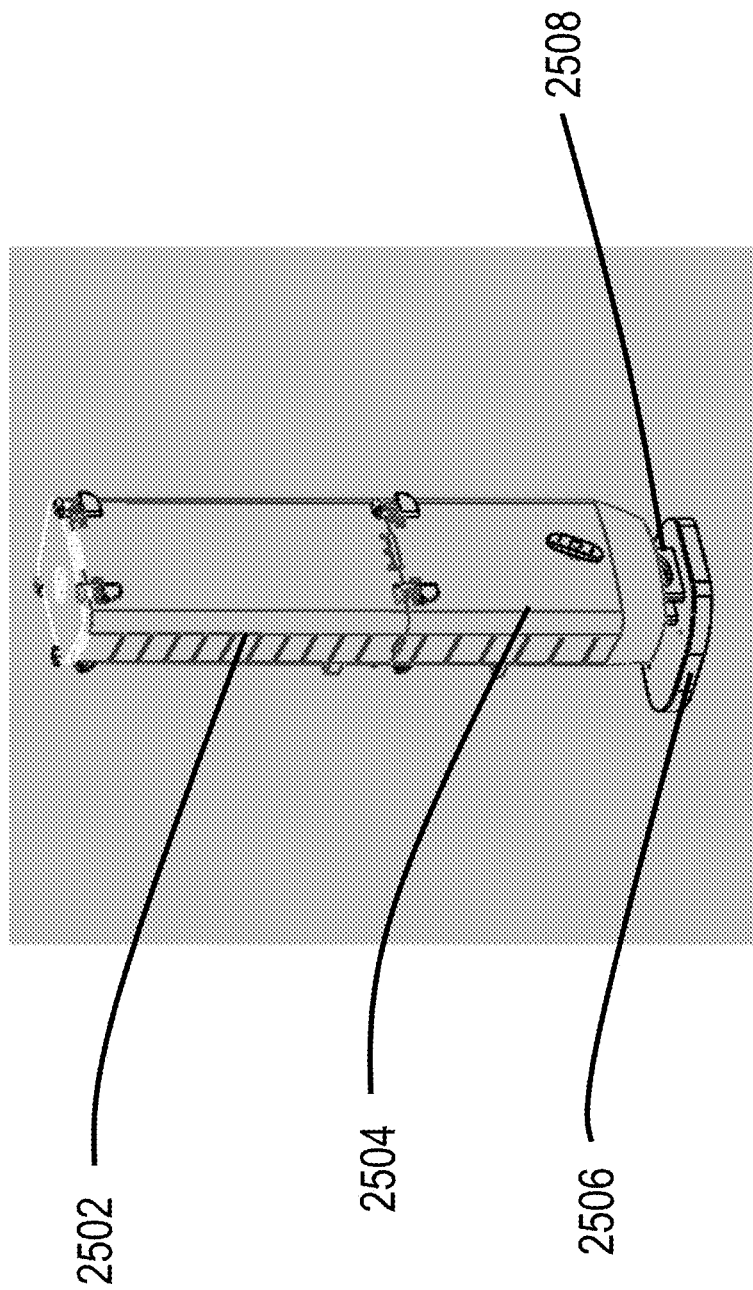
FIG. 25 illustrates an embodiment of this invention, which shows how a container may be used for providing thermal insulation by closing the hole where ingredients drop.
Figure 26C:
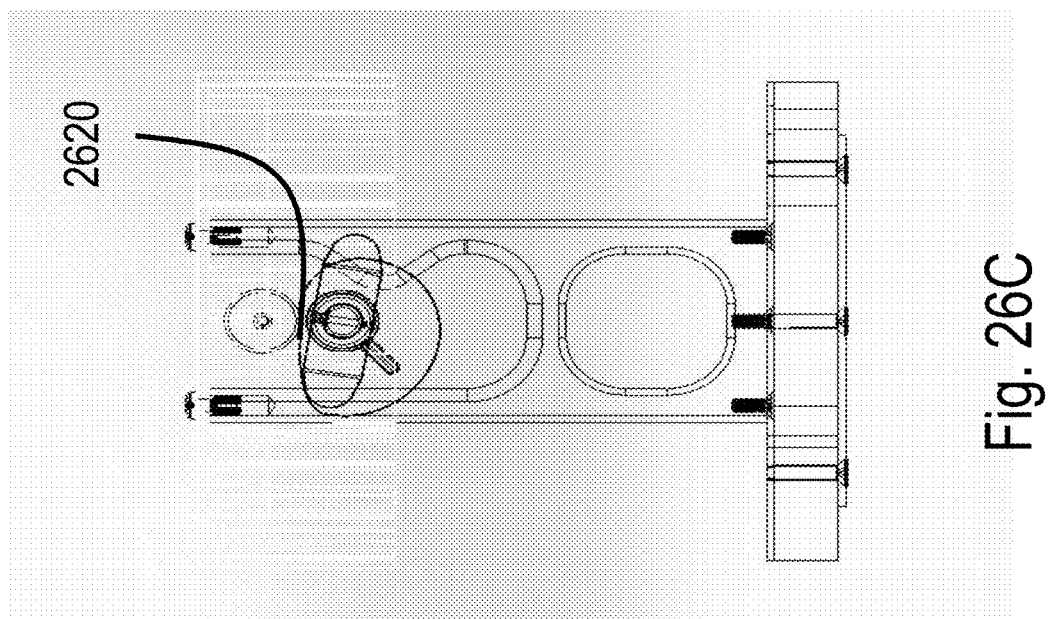
FIGS. 26A-26C illustrate an embodiment of this invention, which show a mechanism for opening and closing a hole where ingredients drop.
Figure 26B:
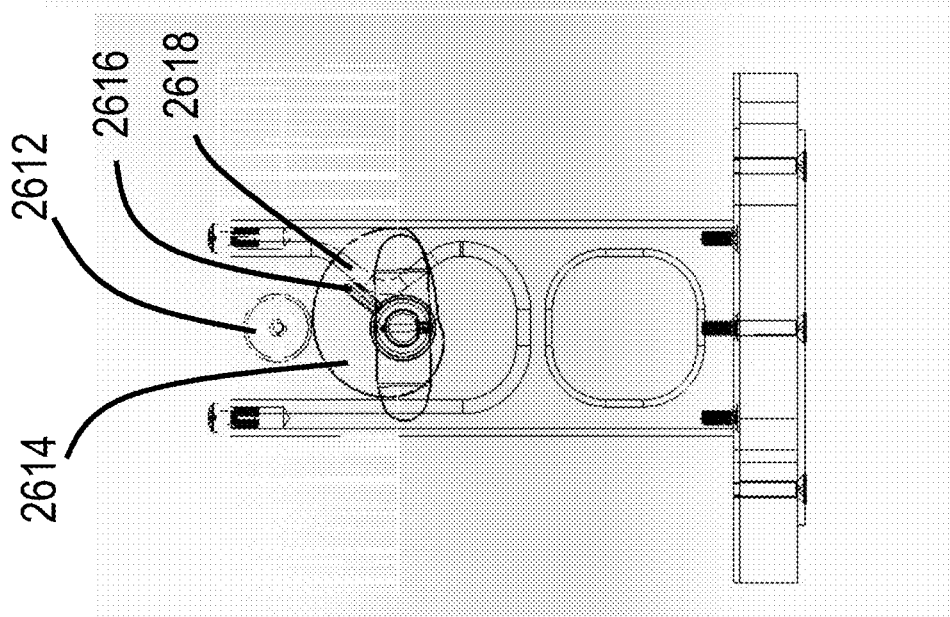
Figure 26A:
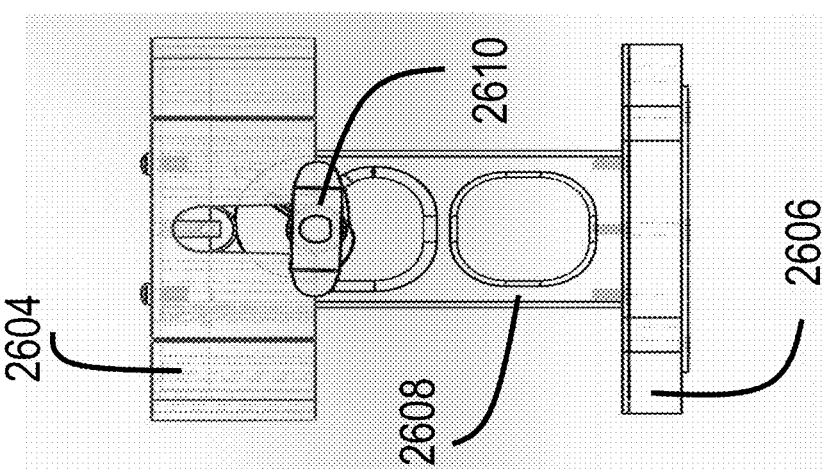

FIG. 25 illustrates different portions of the insulation canister described in FIGS. 24A-24B. The canister may be composed of two portions, upper portion 2502 and lower portion 2504, for example. The insulation layer 2506 may be connected to a mechanism within the insulation canister using pieces 2508. FIGS. 26A-26C illustrates a simplified view of the internal mechanism within an insulation canister. It will be clear to one skilled in the art that the mechanism shown in FIG. 26A-26C is exemplary, and several variations may exist. An insulation layer 2606 may be connected to a platform 2604 that moves within a canister. A pin 2610 may be rotated with a dispensing actuator similar to those described earlier in this patent application. The pin may actuate a mechanism consisting of a cam 2614 using a shaft. FIG. 26B may illustrate one position of the mechanism, where the portion 2616 of cam 2614 may come in contact with the wall 2618. A wheel 2612 may allow smooth motion of the cam 2614. The platform 2604 is not shown in FIG. 26B-26C to better illustrate the working of the mechanism. FIG. 26C may illustrate another position of the mechanism, where the cam 2620 may be in another stable position. One of the key factors of the invention shown in FIG. 26A-26C is the fact that the cam 2614 may be in two stable positions. This provides a stable open and closed position of insulation layer 2606, 'closed' with respect to food opening 2402 when actuated 'down', and 'open' with respect to food opening 2402 when the cam position pulls insulation layer 2606 'up' so that the insulation canister 2404 can rotate freely on the carousel. Thus the insulation canister may be operated by the same motor/cam system as the normal food dispensing operation.

Figure 27:
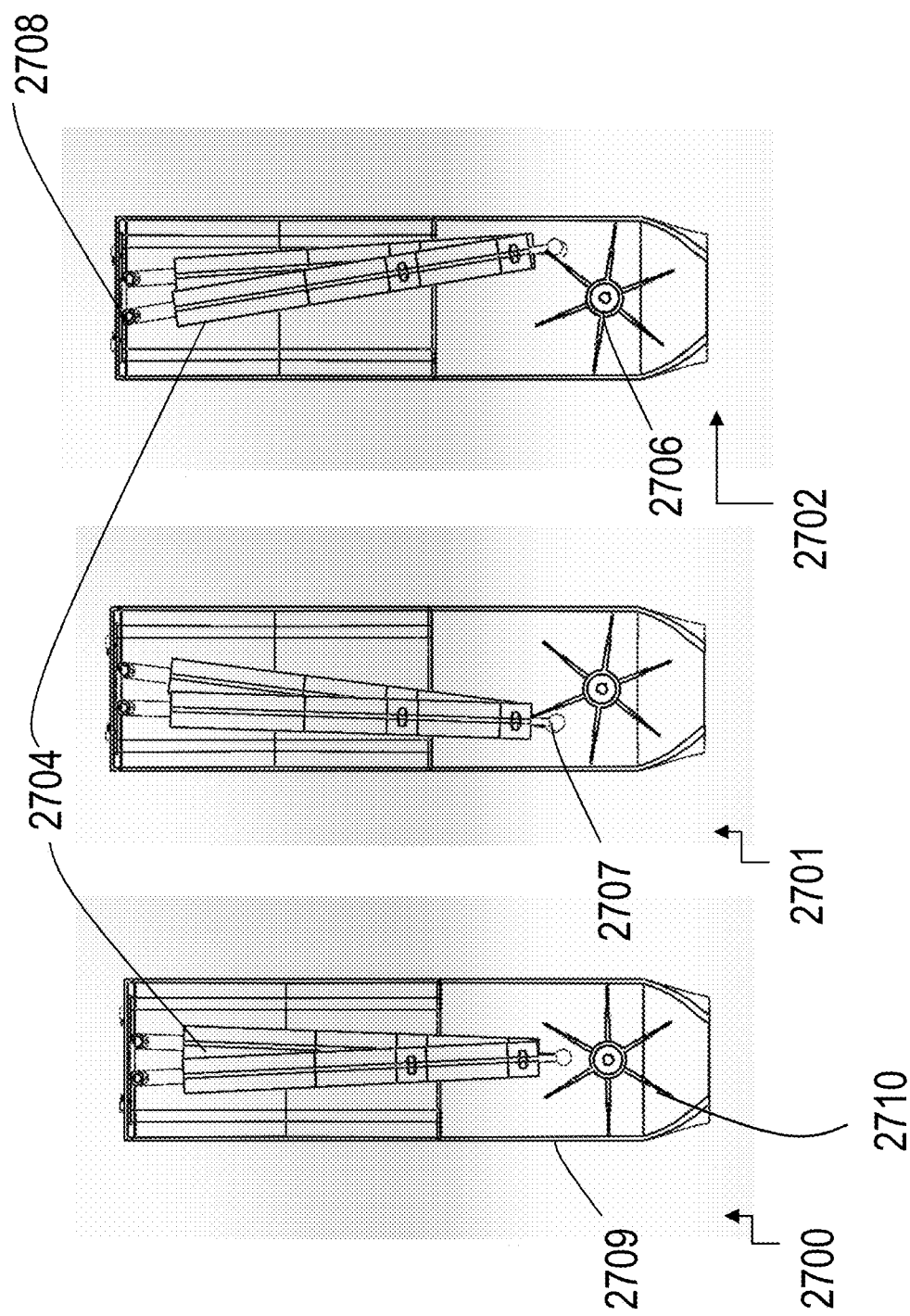
FIG. 27 illustrates an embodiment of this invention, which shows a method to dispense ingredients.

FIG. 27 illustrates an embodiment of this invention, wherein ingredients sticking to the walls of the ingredient container/canister may be reduced by using fittings 2704 within the canister. These fittings may be actuated by motion of the paddles 2710. The fittings 2704 may be attached to the top of canisters 2708 or the sides of canisters 2709. They may have multiple pieces, for example, with one portion fitting bottom 2707 contacting the paddle and another portion fitting top 2704 contacting top of canisters 2708. When the paddle rotates, it may move the fittings back and forth by contacting fitting bottom 2707 and causing motion within the canister which may allow ingredients stuck to the sides of canisters to come unstuck. Snapshot one 2700 illustrates fitting 2704 with no paddles 2710 contact, snapshot two 2701 illustrates fitting 2704 contacting paddles 2710 to one side, snapshot three 2702 illustrates fitting 2704 contacting paddles 2710 to the other side. Several variations of this embodiment may be possible. For example, the shape of the fittings may be different—it could be the shape of a curtain. The fittings may be attached to the sides of the canister instead of the center as shown in FIG. 27. The fittings may include a hinge. Several other variations may be possible.

Figure 28:
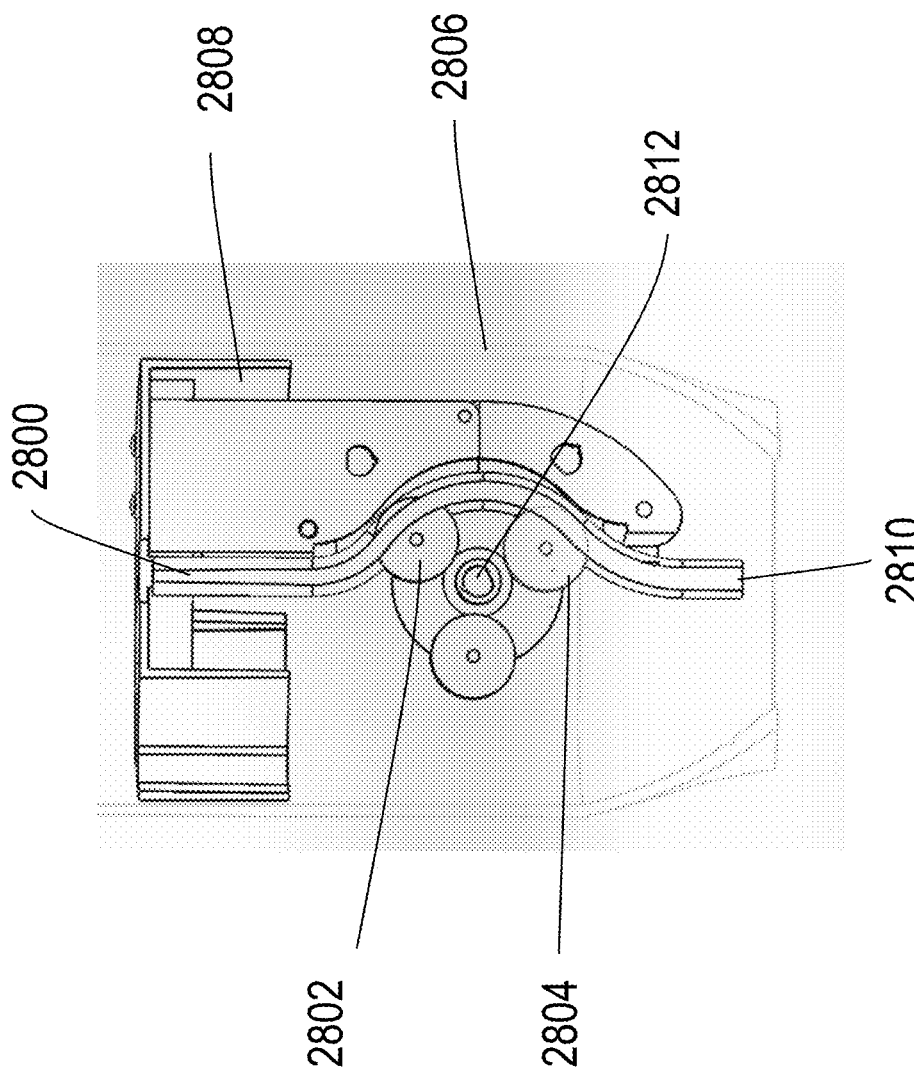
FIG. 28 illustrates an embodiment of this invention, which shows a method to dispense liquid ingredients.

FIG. 28 illustrates an embodiment of this invention, which shows an apparatus for dispensing liquids. The liquid to be dispensed may be stored in a bottle located within a canister 2806 and a flexible tube 2800 may lead from it. The flexible tube may be compressed by rollers such as 2802 and 2804 to control the dispensing of the liquid. A one way valve may be added to the end of the tube 2810 to reduce dripping of liquid in unwanted locations. The rollers 2802 and 2804 may move using rotation of shaft 2812, which in turn may be rotated using a shared dispensing that may be connected to a pin 2812 located on the canister 2806.

Additional Methods, Algorithms and Software.

The apparatus of the automated food making machine, for example FIG. 14 herein, and sub-apparatuses, for example pin straightener 2202 of FIG. 22 herein, may be controlled by a computer system wherein various algorithms and software instantiated in the computer/microprocessor system may form methods of operation and control of the machine or sub-apparatuses. Following are inventive embodiments of the methods, algorithms and software. Of course, some of these functions may be controlled from a computer/microprocessor that is not within the food making machine, for example, a centralized control system at a corporation, home, or operated from/by the manufacturer.

The algorithms and software programs may include at least the following commands and values:

| Name | Command | Description | Min value | Max value | Units |
|---|---|---|---|---|---|
| Container | C | container that needs to be selected | 1 | 24 | |
| Speed | S | rotational speed of dispenser | 0 | 600 | rpm |
| Target Weight | W | un-adjusted weight to be targeted by machine | 0 | 200 | grams |
| Angle | A | angle to move before taking weight measurement | 0 | 2160 | |
| No. of weight Samples | Q | number of measurements taken and averaged to reduce noise | 1 | 50 | samples |
| Timeout Loops | T | number of times the loop runs before flagging an error | 1 | 30 | loops |
| Undershoot % | U | percentage to change target weight by to account for bias | 0 | 50 | % |
| Undershoot Quantity | V | quantity to change target weight by to account for bias | 0 | 20 | grams |
| Motion Algorithm | G | which motion algorithm to use | 1 | n | algorithm number |

The min and max values may be adjusted based on engineering and design considerations. For example, the No. of weight Samples, Q, may have a max value greater than 50 if a faster reading scale is used for a particular overall machine model.

For example, an algorithm and software program may have the following steps:

| Step | Description | Command & Value |
|---|---|---|
| Step 1 | Set Container to #6 | M6 C6; |
| Step 2 | Set Target Weight to 50 g | W50 |
| Step 3 | Set Motion Algorithm (angle, speed) | G1 A180 S500 |
| Step 4 | Set Undershoot % to 50% | U50 |
| Step 5 | Set Motion Algorithm (angle, speed) | G2 A90 S100 |
| Step 6 | Set Undershoot % to 90% | U90 |

The above example may be written as three lines of code as follows:

| 1 | M6 C6; |
|---|---|
| 2 | W50 G1 A180 S500 U50; |
| 3 | G2 A90 S100 U90; |

Figure 29:
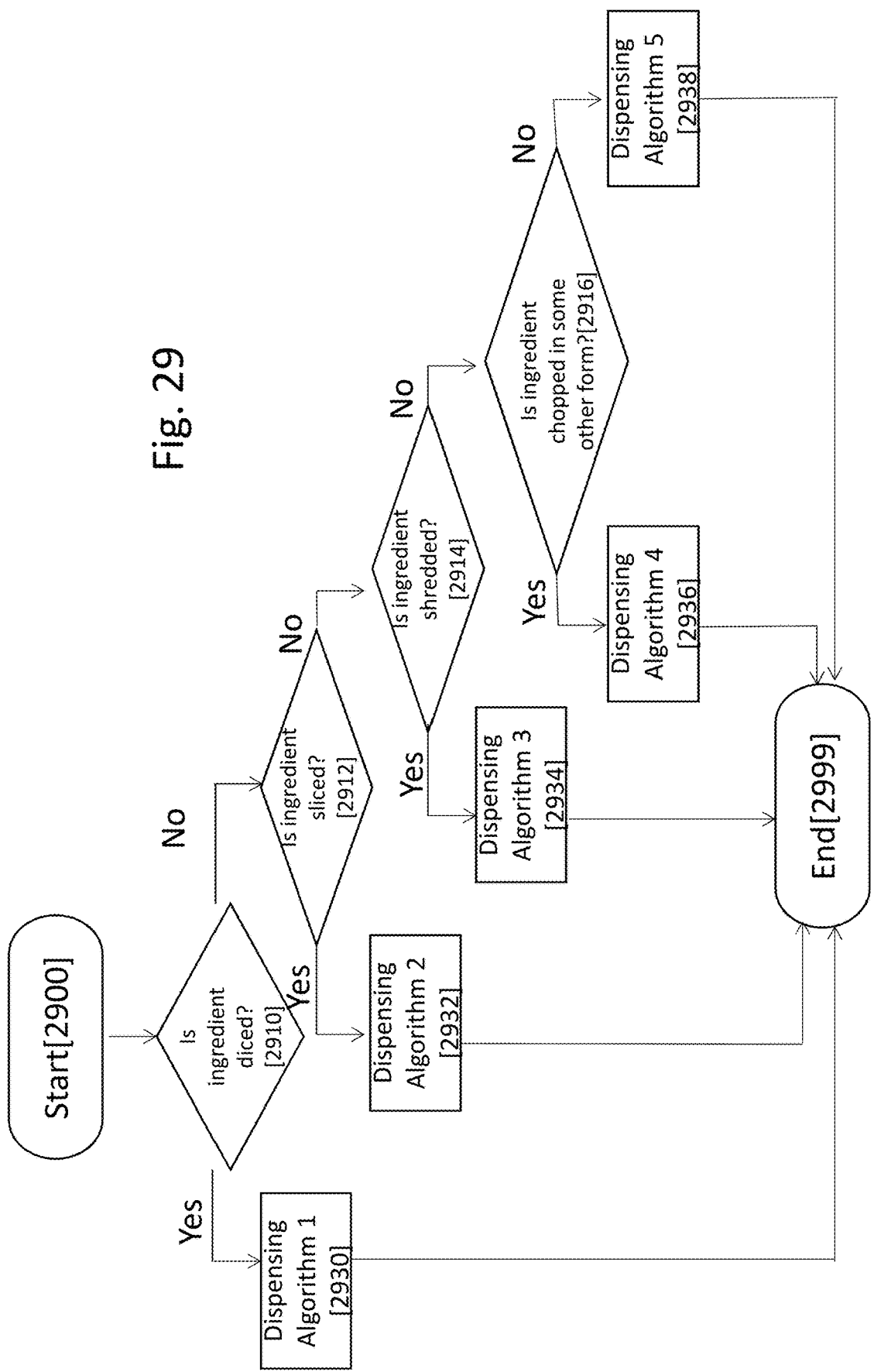
FIG. 29 illustrates an embodiment of this invention, which shows an Ingredient Cut Based Dispensing algorithm.

An Ingredient Cut Based Dispensing algorithm and software program may be disposed in the food making machine apparatus, and may select and control different cuts (for example; julienne, dice, chopped, etc.) for various ingredients (for example; iceberg lettuce, romaine lettuce, carrots, beets, cheese, etc.) which may require different sub-algorithms to control the appropriate machine sub-units and/or components. As illustrated in FIG. 29, an illustrative example of an Ingredient Cut Based Dispensing algorithm and software program is shown in an overview flowchart. For example, the Start 2900 may begin the algorithm and the first question asked may be is the ingredient to be diced [2910]. For example, the customer may order diced cucumber for the salad, so the machine may be directed to the cucumber container and use a dicing sub-algorithm 1 [2930] to actuate the dicing apparatus under the cucumber container. If the ingredient is to be sliced [2912], then dispensing algorithm 2 [2932] may be utilized to move and operate the slicing and dispensing mechanism for that ingredient (for example, to slice the cucumbers from the cucumber container). If the ingredient is to be shredded [2914], then dispensing algorithm 3 [2934] may be utilized to move and operate the shredding and dispensing mechanism for that ingredient. If the ingredient is to be chopped in some other form [2916], then dispensing algorithm 4 [2936] may be utilized to move and operate the shredding and dispensing mechanism for that ingredient. If the ingredient is to be treated in some other way (a No to [2916]), then dispensing algorithm 5 [2938] may be utilized to move and operate the appropriate mechanism for that ingredient. All of the dispensing algorithms, when the appropriate amount of the ingredient is dispensed, may conclude with End [2999].

Figure 30:
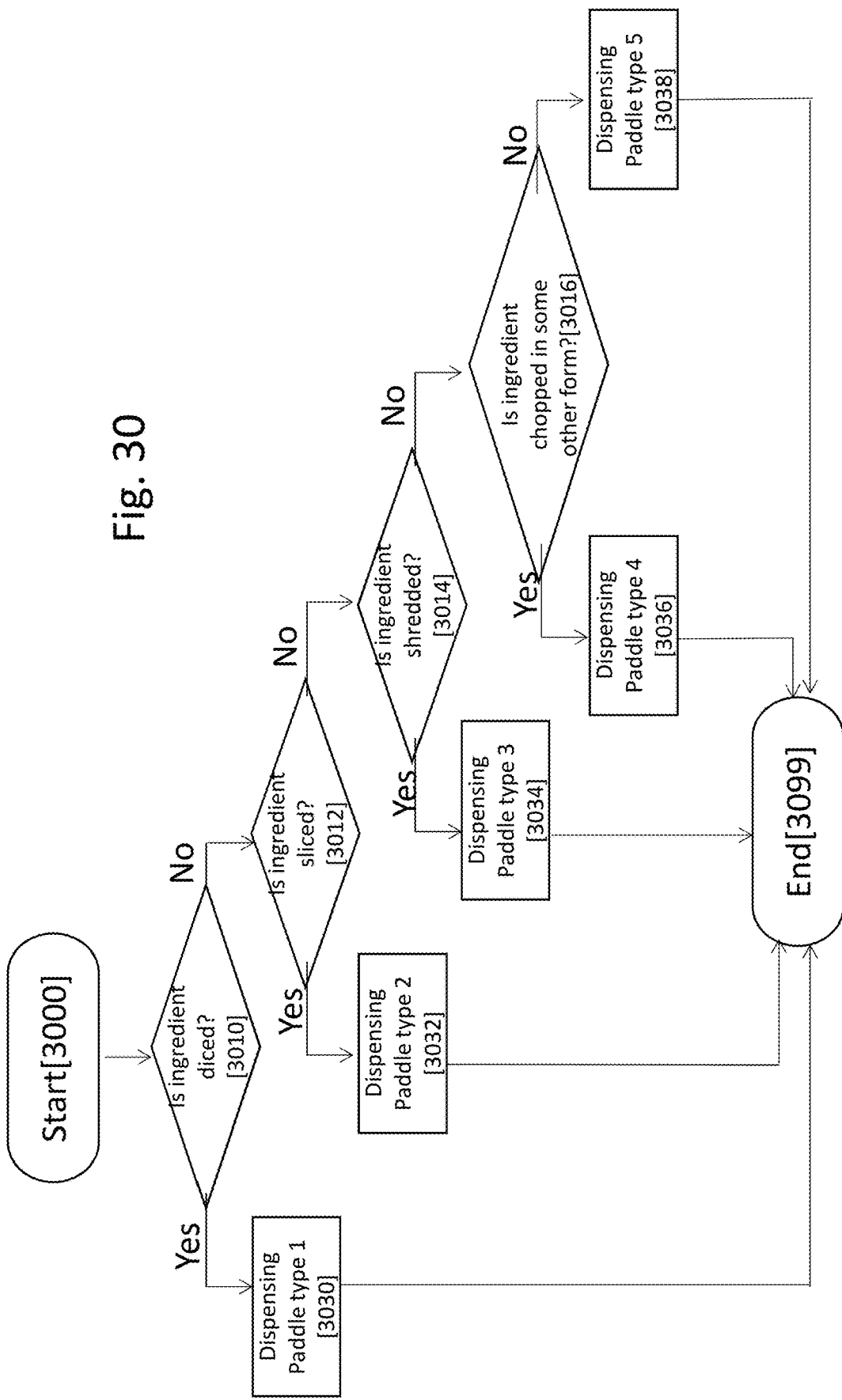
FIG. 30 illustrates an embodiment of this invention, which shows a Paddle Based Dispensing algorithm.

A Paddle Based Dispensing algorithm and software program may be disposed in the food making machine apparatus, and may select and control different paddles (for example; 2 fin, 4 fin, 6 fin, flexible, rigid, rig/flex, etc.) for various ingredients (for example; iceberg lettuce, spinach, carrots, nuts, raisins, seeds, croutons, etc.) which may require different algorithms to control the appropriate machine sub-units and/or components. As illustrated in FIG. 30, an illustrative example of a Paddle Based Dispensing algorithm and software program is shown in an overview flowchart. For example, the Start [3000] may begin the algorithm and the first question asked may be is the ingredient diced [3010]. For example, the customer may order diced cucumber for the salad, so the machine may be directed to the cucumber container and use a dicing sub-algorithm (see FIG. 29). Then dispensing Paddle type 1 [3030] may be actuated to precisely dispense the diced food. If the ingredient is sliced [3012], then dispensing Paddle type 2 [3032] may be precisely dispense the sliced food. If the ingredient is shredded [3014], then dispensing Paddle type 3 [3034] may be utilized to precisely dispense the shredded food for that ingredient. If the ingredient is to be chopped in some other form [3016], then dispensing Paddle type 4 [3036] may be utilized to precisely dispense the chopped food for that ingredient. If the ingredient is to be treated in some other way (a No to [3016]), then dispensing Paddle type 5 [3038] may be utilized to precisely dispense the food for that ingredient. All of the dispensing paddle type algorithms, when the appropriate amount of the processed ingredient is dispensed, may conclude with End [3099].

Figure 31:
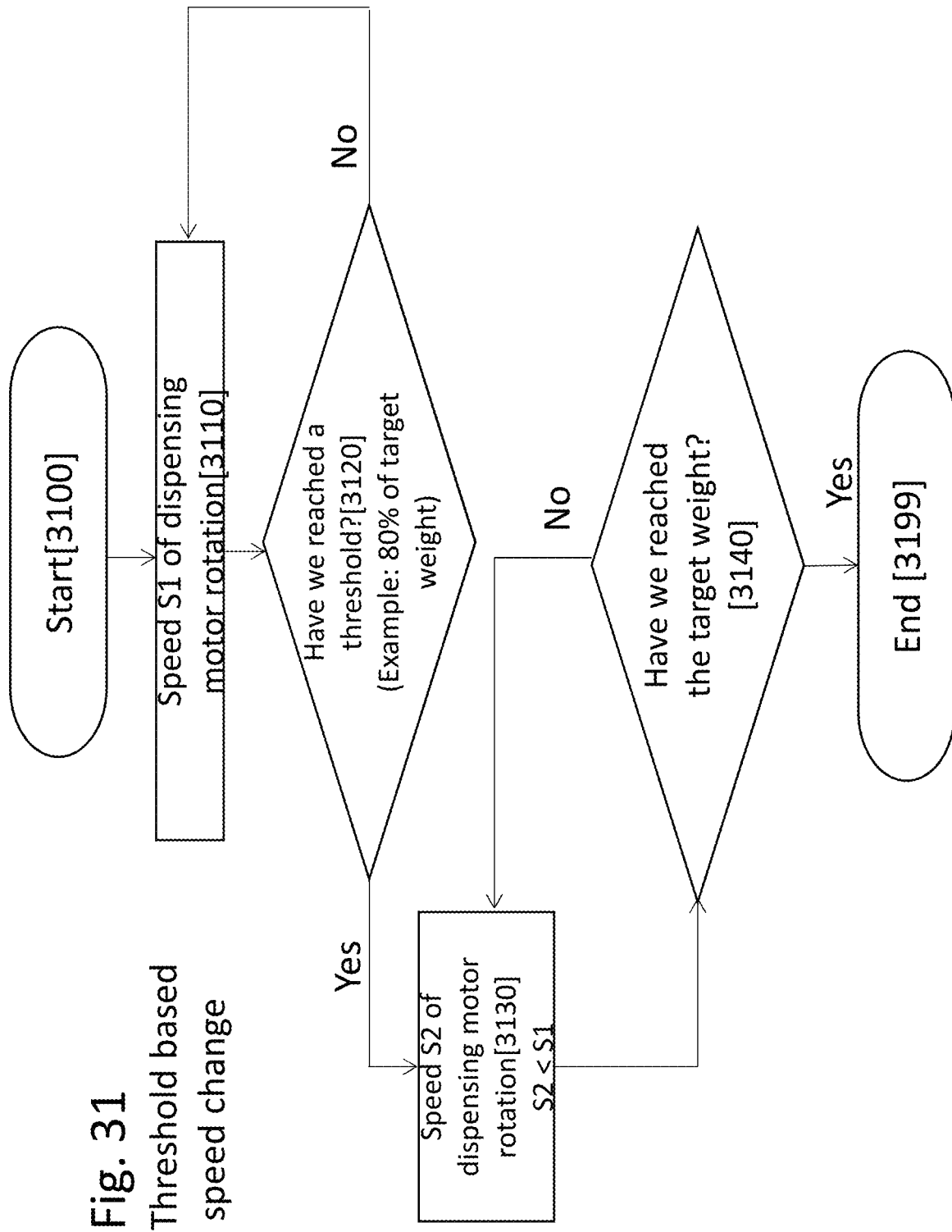
FIG. 31 illustrates an embodiment of this invention, which shows a Threshold Based Speed algorithm.

A Threshold Based Speed algorithm and software program may be disposed in the food making machine apparatus, and may select and control different dispense rates/speed as a function of another input (for example; a faster food dispense speed until 80% of target weight, then a slower speed to finish, etc.). The input, for example, may be the weight of food dispensed, and the sample rate of that weight may be adjusted in a certain manner, for example, inversely proportional to the percentage of the target weight, and so on), and may be different (speed control and weight sampling rate) for various ingredients (for example; iceberg lettuce, spinach, carrots, nuts, raisins, seeds, croutons, etc.) which may require different algorithms to control the appropriate machine sub-units and/or components. As illustrated in FIG. 31, an illustrative example of a Threshold Based Speed algorithm and software program is shown in program form and an overview flowchart. For example, the Start [3100] may begin the algorithm and a default speed 51 of the dispending motor rotation [3110] may be set to dispense the food, whilst monitoring of the target weight may be performed. This may be by the differential weight of the bowl or other means. If the first threshold (which may be dependent on ingredient type) is reached [3120], then the speed may be reduced to S2 [3130] and the weight continues to be monitored. If the target weight is reached, the Threshold based speed routine may conclude with End [3199]. More than two dispensing motor rotation speeds may be utilized depending on engineering choices and ingredient type and processing (sliced, chopped, etc.). It will be clear to one skilled in the part that speed S2 may be set to higher than S1 in some cases where higher speed may give slower, more controlled dispensing.

Figure 32:
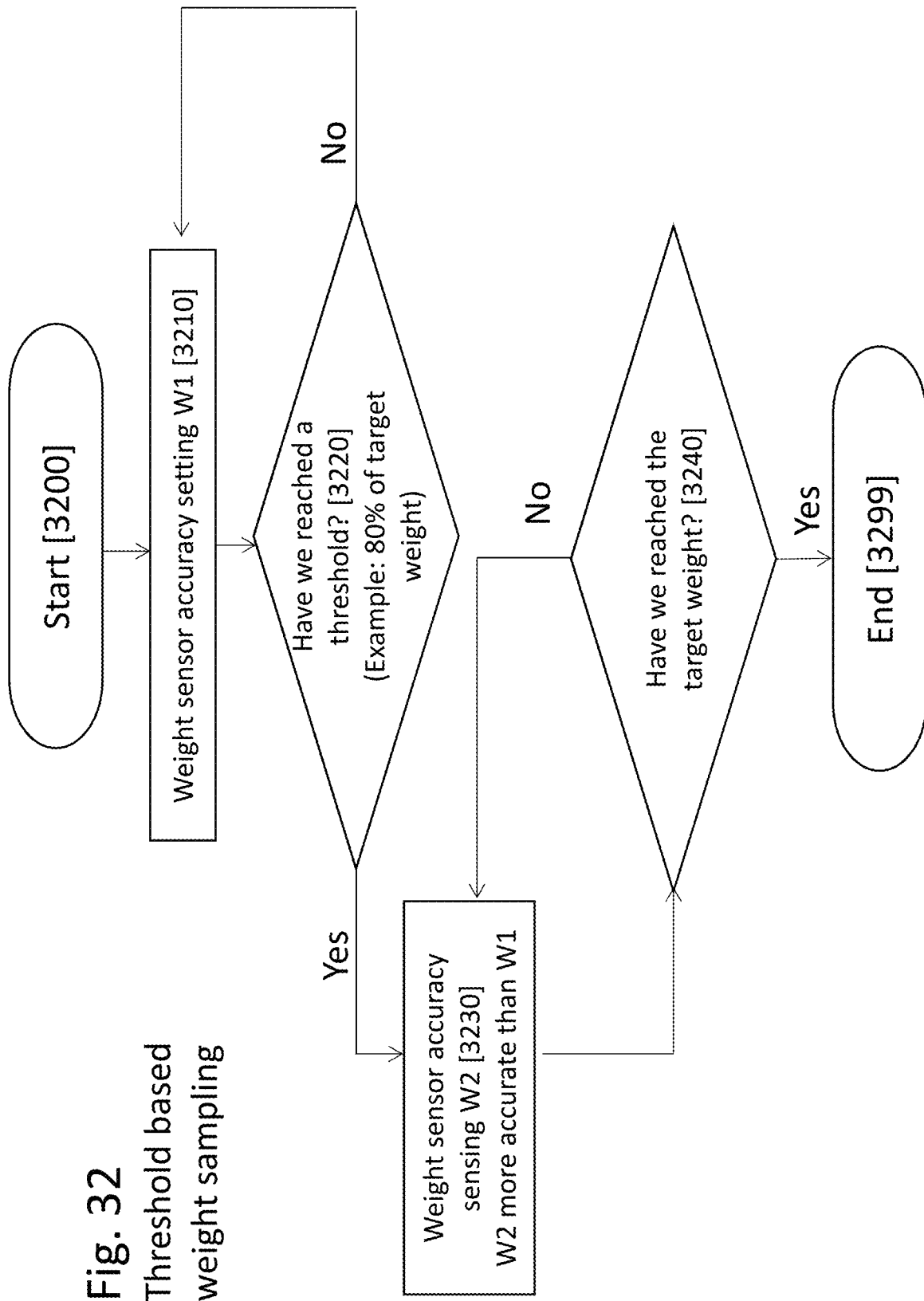
FIG. 32 illustrates an embodiment of this invention, which shows a Threshold Based Weight Measurement Frequency algorithm.

A Threshold Based Weight Measurement Frequency algorithm and software program may be disposed in the food making machine apparatus, and may select and control dispense rates/speed as a function of dispensed food weight sampling (for example, increase weight sample rate more frequently near target weight, etc.). The sample rate of that weight may be adjusted in a certain manner, for example, inversely proportional to the percentage of the target weight, and so on), and may be different (speed control and weight sampling rate) for various ingredients (for example; iceberg lettuce, spinach, carrots, nuts, raisins, seeds, croutons, etc.) which may require different algorithms to control the appropriate machine sub-units and/or components. The algorithm may stop the dispense if the target weight is achieved. As illustrated in FIG. 32, an illustrative example of a Threshold Based Weight Measurement Frequency algorithm and software program is shown in an overview flowchart. For example, the Start [3200] may begin the algorithm and a default weight sampling setting W1 of the food product dispensed [3210] may be set to dispense the food, whilst monitoring of the target weight may be performed. This may be by the differential weight of the bowl or other means. If the first threshold (which may be dependent on ingredient type) is reached [3220], then the weight sampling may be increased or otherwise made in a more accurate manner to W2 [3230] and the weight continues to be monitored. If the target weight is reached, the Threshold based weight measurement routine may conclude with End [3199]. and may conclude with End [3299]. Otherwise the dispensing continues with the more accurate W2 weight sensing scheme.

Figure 33:
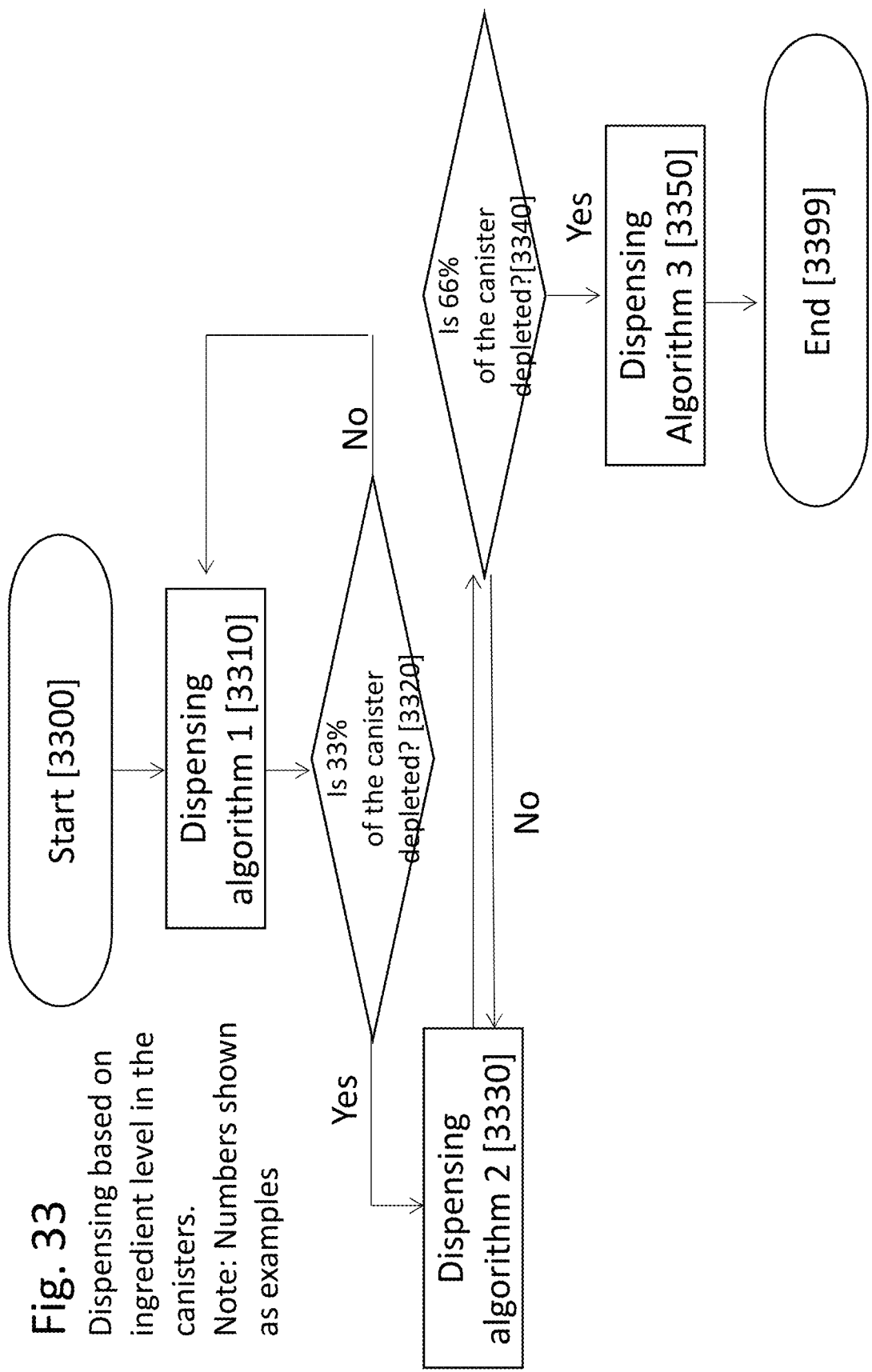
FIG. 33 illustrates an embodiment of this invention, which shows an Ingredient Level Based Dispensing algorithm.

An Ingredient Level Based Dispensing algorithm and software program may be disposed in the food making machine apparatus, and may select and control dispense rates/speed as a function of dispensed food levels in the food ingredient containers (for example, may need to increase the flipper rotation speed to dispense same amount of the food ingredient in same time when the level in the ingredient container is 25%, etc.). The rate or adjustment may be for various ingredients (for example; iceberg lettuce, spinach, carrots, nuts, raisins, seeds, croutons, etc.) at various container levels (for example, such as 100%, 75%, 50%, 33% 25%, 10%, 5%) which may require different algorithms to control the appropriate machine sub-units and/or components. As illustrated in FIG. 33, an illustrative example of an Ingredient Level Based Dispensing algorithm and software program is shown in an overview flowchart. For example, the Start [3300] may begin the algorithm and a default dispensing algorithm 1 [3310] may be activated and the level of food in the specific canister/container is monitored (usually by weight dispensed and kept track of in the software; however, also could be monitored by sensors, such as optical or proximity). If a first threshold of the canister is depleted, for example 33% [3320] then a second dispensing algorithm may be utilized to maintain accurate and precise food product dispense, for example, Dispensing algorithm 2 [3330] If the canister is now depleted to another threshold, for example, 66% [3340], then a third algorithm may be controlling the dispense such as dispensing algorithm 3 [3350]. The Ingredient Level Based Dispensing algorithm may conclude with End [3399].

Figure 34:
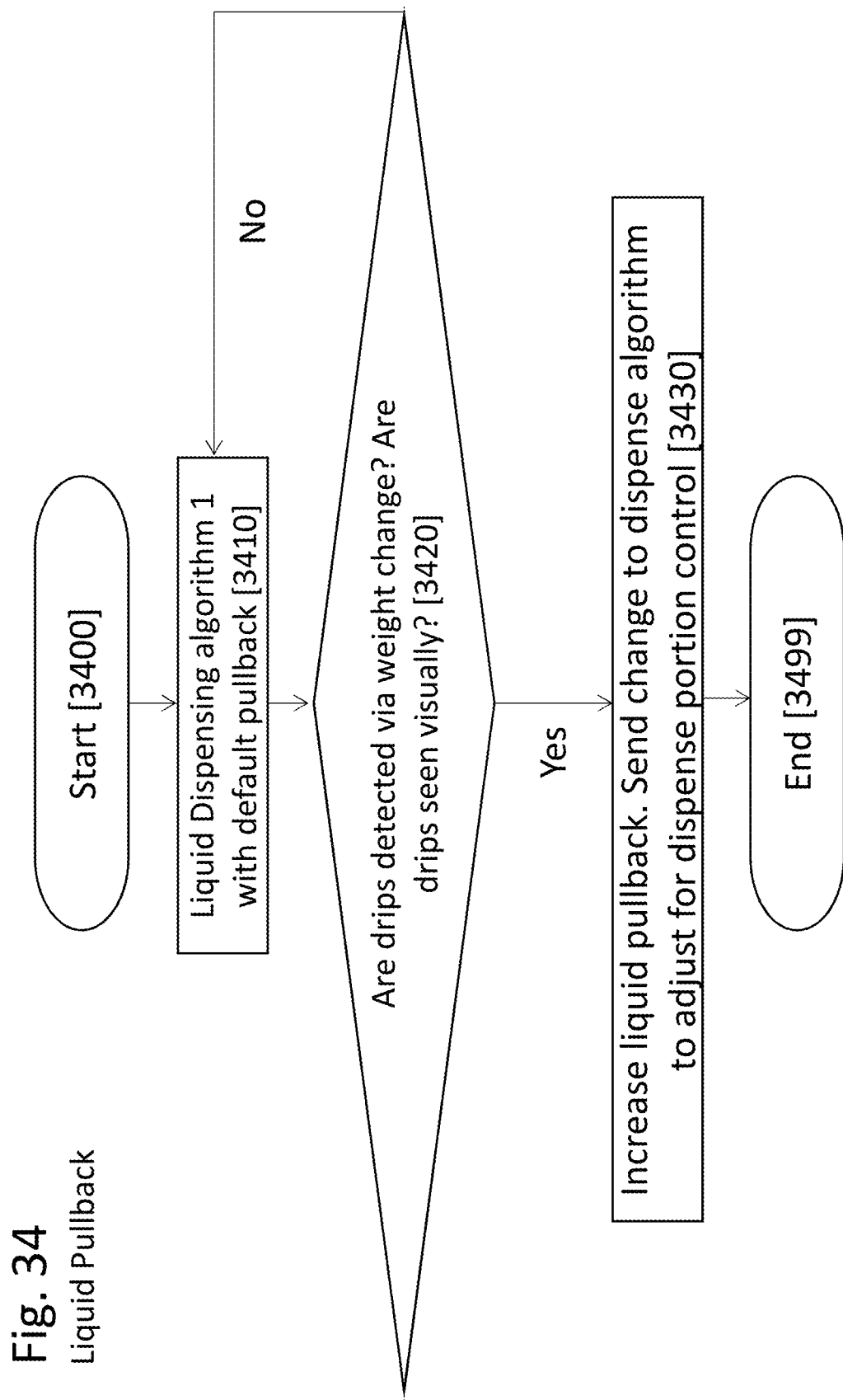
FIG. 34 illustrates an embodiment of this invention, which shows a Liquid Pullback algorithm.

A Liquid Pullback algorithm and software program may be disposed in the food making machine apparatus, and may select and control the dispense of liquids (for example, salad dressings, etc.). Liquid can sometimes drip from dispenser after it has been stopped. Reversing the flow in the liquid dispenser may reduce unwanted drips. This algorithm may control the appropriate machine sub-units and/or components. As illustrated in FIG. 34, an illustrative example of a Liquid Pullback algorithm and software program is shown in an overview flowchart. For example, the Start [3400] may begin the algorithm and a default liquid dispensing algorithm 1 [3410] may be activated to dispense the desired liquid and execute a default pullback, which may include, for example, a time increment or number of reverse rotations, etc., depending on the type of dispense machinery. If drips are detected [3420], for example by a weight increase in-between salads made or other means, such as visually reported by a customer, the liquid pullback may be increased [3430] for that specific liquid and dispense machinery combination. For example, the viscosity of salad dressing may change with batch, or as the dispense container is near the end of it's dispense volume (liquid ageing/evaporation), or temperature excursions, etc. The pullback change may be sent to the dispense algorithm so that adjustments may be made to maintain a consistent product delivery volume. The Liquid Pullback algorithm may conclude with End [3499].

Figure 35:
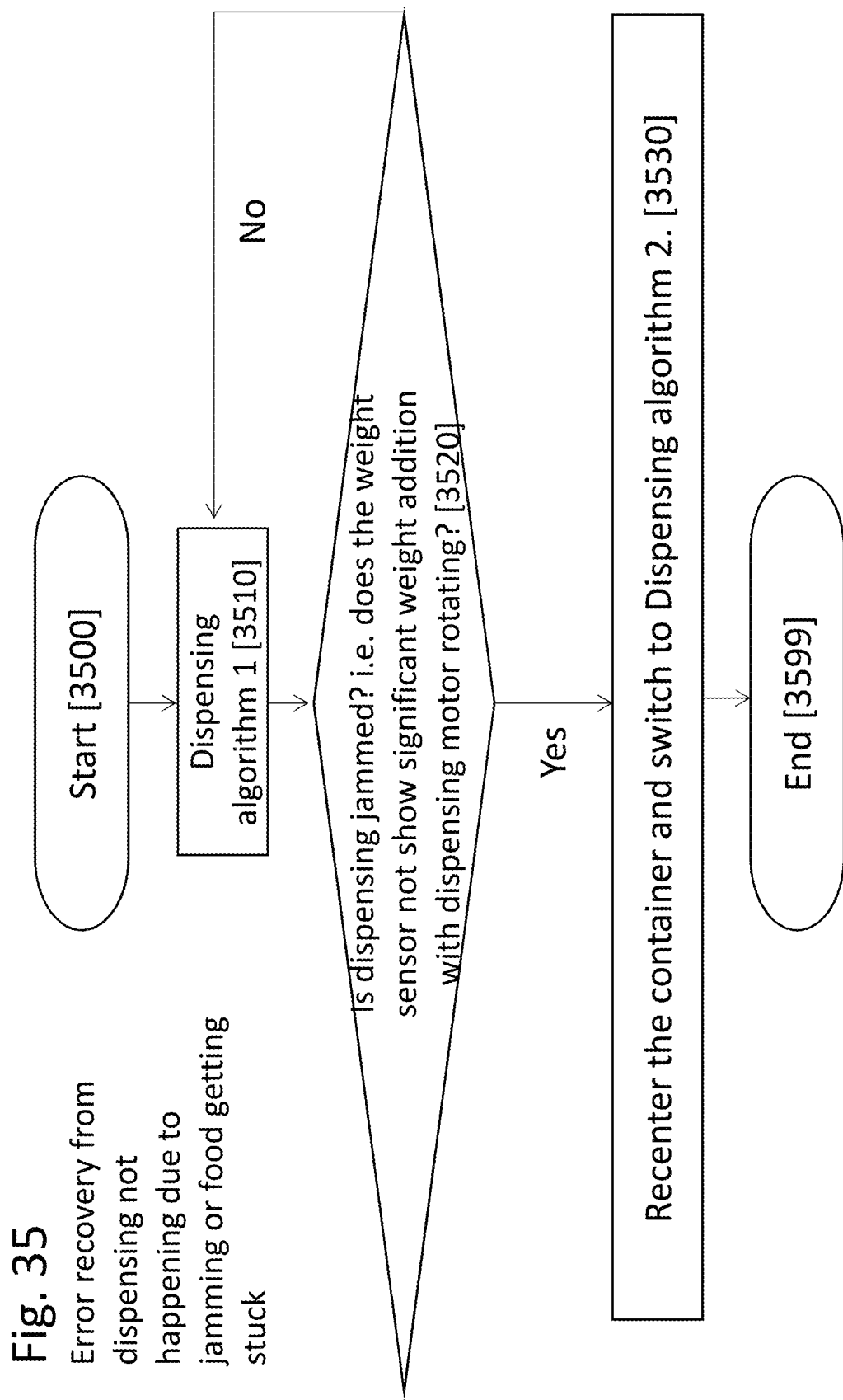
FIG. 35 illustrates an embodiment of this invention, which shows a Dispenser Collision Recovery algorithm.

A Dispenser Collision Recovery algorithm and software program may be disposed in the food making machine apparatus, and may select and control the dispenser which may jam due to misalignments or out of spec food (for example, larger diameter nuts than expected, clumps of spinach, etc.). When a jam is detected, the algorithm may re-center the dispenser and switch movement algorithms. This algorithm may control the appropriate machine sub-units and/or components. As illustrated in FIG. 35, an illustrative example of a Dispenser Collision Recovery algorithm and software program is shown in an overview flowchart. For example, the Start [3500] may begin the algorithm and a default dispensing algorithm 1 [3510] may be activated to dispense the food ingredient. If a jamming is detected in the food dispense [3520], then a unjamming dispensing algorithm 2 [3530] may be activated to attempt to unjam the container and dispenser. For example, the dispensing algorithm 2 may re-center the canister/container and switch dispenser movement algorithms. It will be clear that many other types of unjamming algorithms may be possible. The Dispenser Collison Recovery algorithm may conclude with End [3599].

Figure 36:
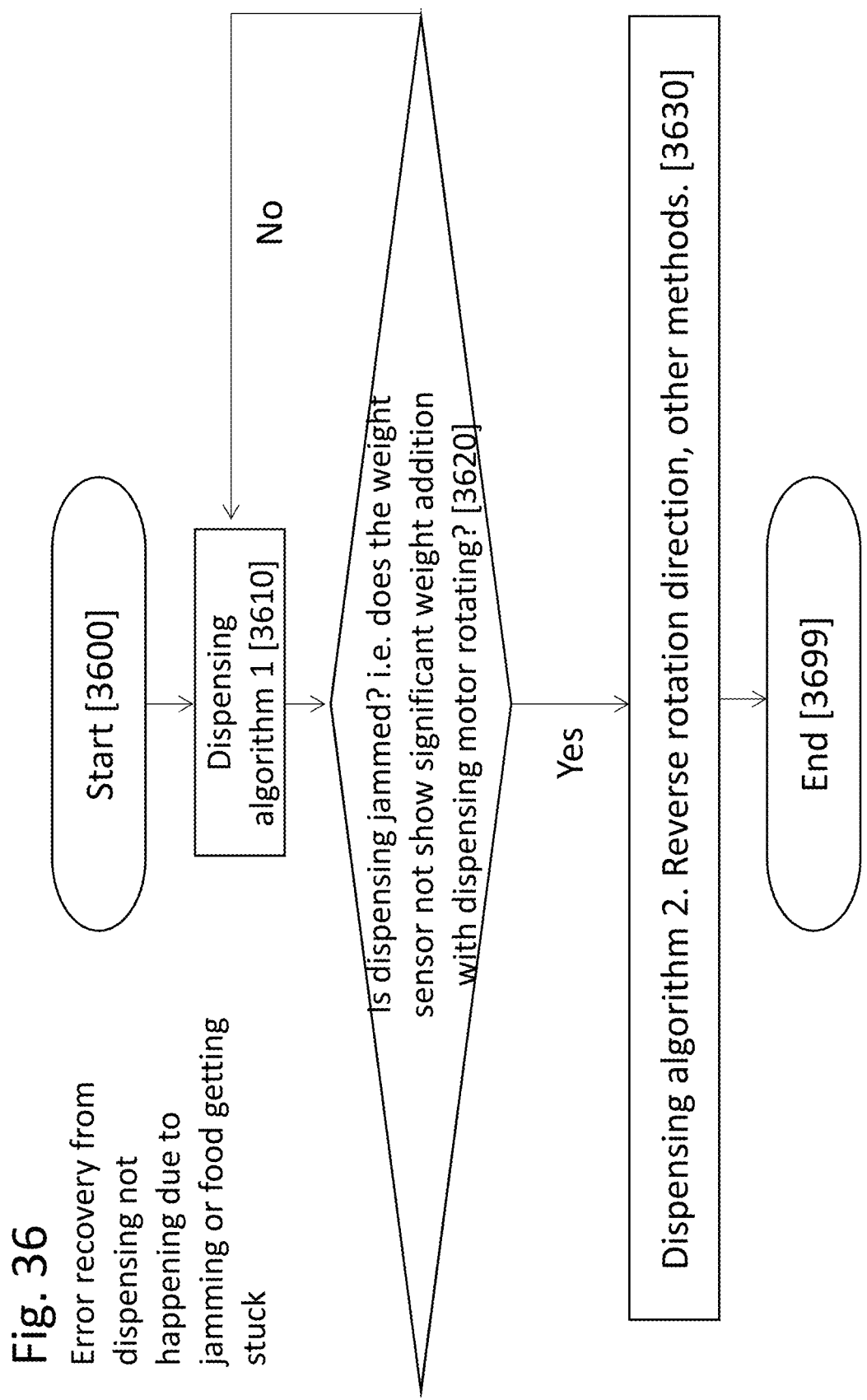
FIG. 36 illustrates an embodiment of this invention, which shows an Ingredient Jamming Recovery Reverse Direction algorithm.

An Ingredient Jamming Recovery Reverse Direction algorithm and software program may be disposed in the food making machine apparatus, and may when the amount of an ingredient being dispensed is less than expected (or otherwise an improper dispense is detected), reverse direction of the paddle(s) to break up a blockage (for example, larger diameter nuts than expected, clumps of spinach, etc. Food can get stuck in a container, leaving a void where paddles cannot reach). Reversing direction may also comprise rapid forward and reverse motions, rapid reverse and slow forward, and other combinations including time, rotational acceleration and velocity. This recovery algorithm may also be combined with the Ingredient Jamming Recovery Carousel Shake algorithm herein to clear an ingredient jam. This algorithm may control the appropriate machine sub-units and/or components. As illustrated in FIG. 36, an illustrative example of an Ingredient Jamming Recovery Reverse Direction algorithm and software program is shown in an overview flowchart. For example, the Start [3600] may begin the algorithm and a default dispensing algorithm 1 [3610] may be activated to dispense the food ingredient. If a jamming is detected in the food dispense [3620], then a unjamming dispensing algorithm 2 [3630] may be activated to attempt to unjam the container and dispenser. For example, the dispensing algorithm 2 may reverse the rotation direction, which may include various velocity and acceleration changes. The Ingredient Jamming Recovery Reverse Direction algorithm may conclude with End [3699].

Figure 37:
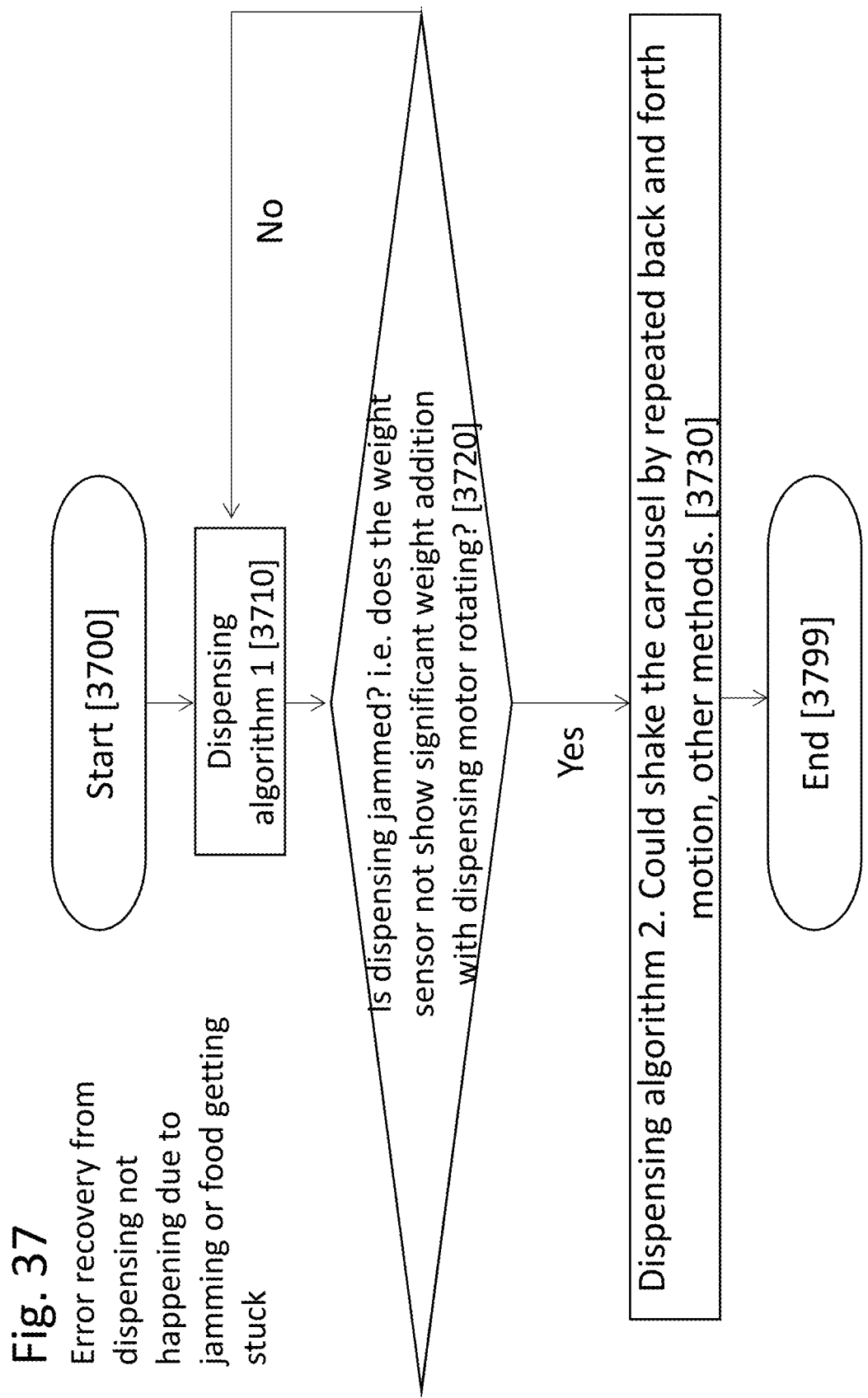
FIG. 37 illustrates an embodiment of this invention, which shows an Ingredient Jamming Recovery Carousel Shake algorithm.

An Ingredient Jamming Recovery Carousel Shake algorithm and software program may be disposed in the food making machine apparatus, and may when the amount of an ingredient being dispensed is less than expected (or otherwise an improper dispense is detected), shake the carousel back and forth to break up a blockage (for example, larger diameter nuts than expected, clumps of spinach, etc. Food can get stuck in a container, leaving a void where paddles cannot reach). Shaking may also comprise rapid forward and reverse motions, rapid reverse and slow forward, and other combinations including time, linear/rotational acceleration and velocity. This recovery algorithm may also be combined with the Ingredient Jamming Recovery Carousel Shake algorithm herein to clear an ingredient jam. A zeroing of the container position would be performed to avoid a future error. This algorithm may control the appropriate machine sub-units and/or components. As illustrated in FIG. 37, an illustrative example of an Ingredient Jamming Recovery Carousel Shake algorithm and software program is shown in an overview flowchart. For example, the Start [3700] may begin the algorithm and a default dispensing algorithm 1 [3710] may be activated to dispense the food ingredient. If a jamming is detected in the food dispense [3720], then a unjamming dispensing algorithm 2 [3730] may be activated to attempt to unjam the container and dispenser. For example, the dispensing algorithm 2 may shake the carousel, which may include various velocity and acceleration changes, for example, back and forth movements. The Ingredient Jamming Recovery Carousel Shake algorithm may conclude with End [3799].

Figure 38:
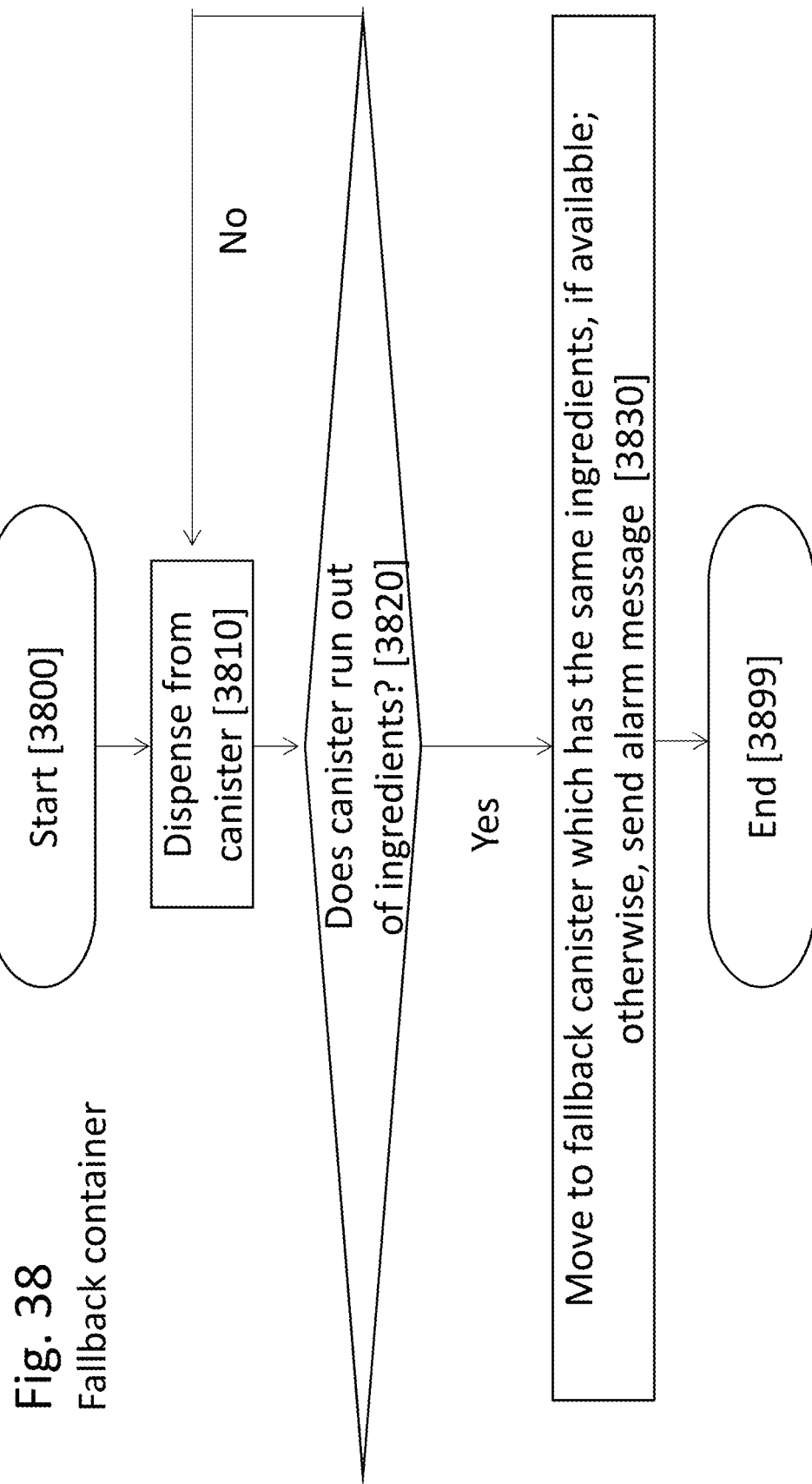
FIG. 38 illustrates an embodiment of this invention, which shows a Fallback Container algorithm.

A Fallback Container algorithm and software program may be disposed in the food making machine apparatus, and may when an ingredient runs out a second container can be utilized by switching the container that is used for that ingredient to the fallback dispenser for that ingredient. A message may be sent to the appropriate person or device to notify them of an empty container. This algorithm may control the appropriate machine sub-units and/or components. As illustrated in FIG. 38, an illustrative example of a Fallback Container algorithm and software program is shown in an overview flowchart. For example, the Start [3800] may begin the algorithm and as a dispense is occurring from a canister [3810], the canister is detected to have run out of an ingredient [3820]. This detection may be by various means, for example, such as by calculation, weight measurement, sensors, etc. Then the algorithm may direct the apparatus to move to a fallback canister with the same ingredients, if available [3830]. If not available, then a signal is sent to the appropriate machine caretaker to promptly refill the specific containers. The Fallback Container algorithm may conclude with End [3899].

Figure 39:
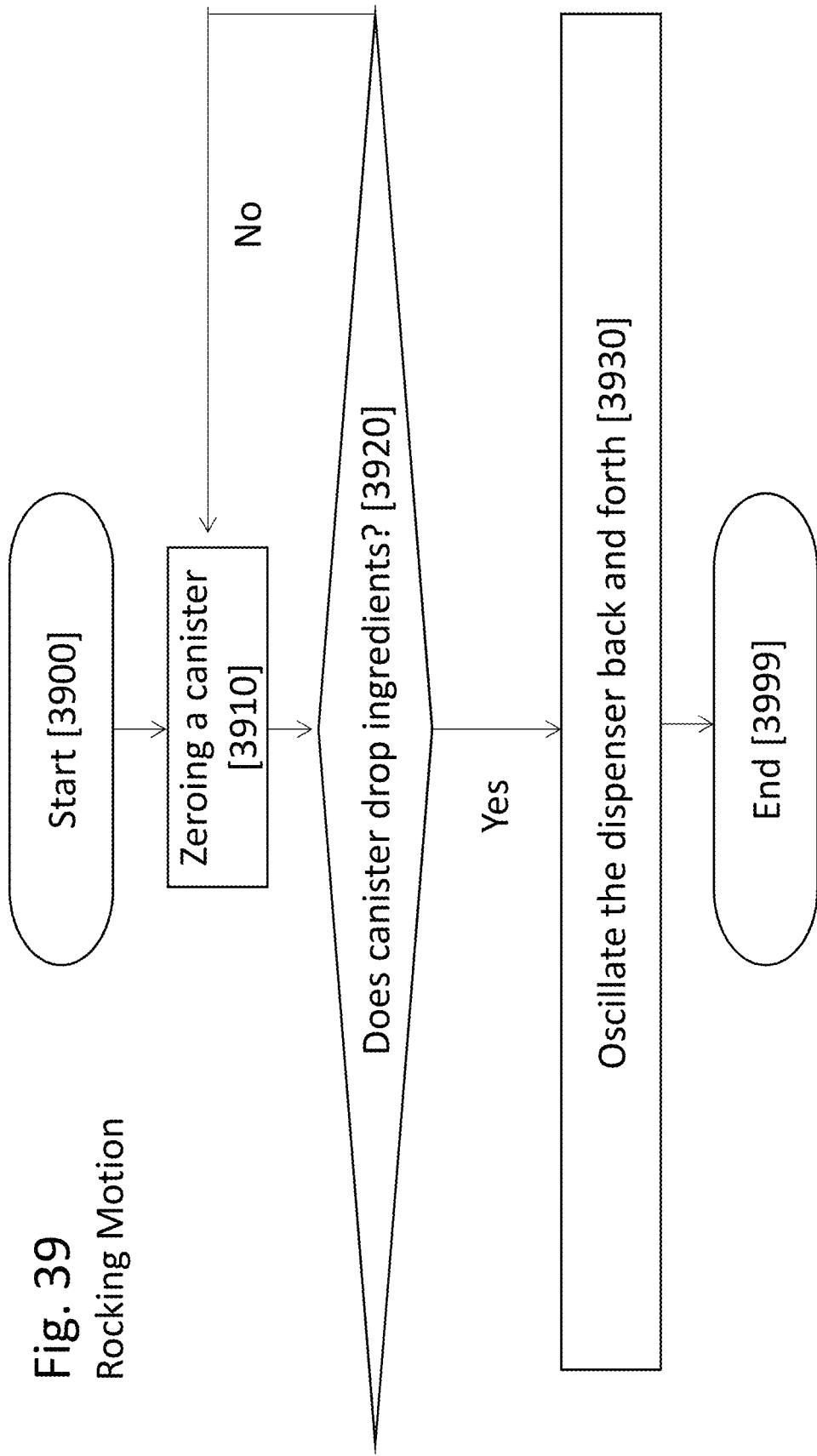
FIG. 39 illustrates an embodiment of this invention, which shows a Rocking Motion Dispense algorithm.

A Rocking Motion Dispense algorithm and software program may be disposed in the food making machine apparatus, and may when the machine zeros it can inadvertently drop ingredients and may be directed to oscillate the dispenser back and forth to keep the back side clear as much as possible. This algorithm may control the appropriate machine sub-units and/or components. As illustrated in FIG. 39, an illustrative example of a Rocking Motion Dispense algorithm and software program is shown in an overview flowchart. For example, the Start [3900] may activate the algorithm during a zeroing of a canister/container [3910]. If a drop of ingredients is detected during the zeroing [3920], then the dispenser for that container may be oscillated back and forth [3930] to clear the backside of the dispenser. The Rocking Motion Dispense algorithm may conclude with End [3999].

A Bidirectional Motion algorithm and software program may be disposed in the food making machine apparatus, and as some ingredients may tend to jam in the container/cylinder if only dispensed in one direction, the machine may be directed to rotate the dispenser in one direction for a number of cycles, then go back the other direction for a number of cycles. More than two directional changes may be employed to mitigate the jams. This algorithm may control the appropriate machine sub-units and/or components. As illustrated in FIG. 40, an illustrative example of the Bidirectional Motion algorithm in action is shown wherein the motion of the dispenser paddles may be rotated clockwise [4010] for a few dispenses and then counterclockwise [4020] for another few dispenses. The precise numbers of dispenses will depend upon engineering judgements and decision making as well as the specific type of food ingredient.

Figure 41:
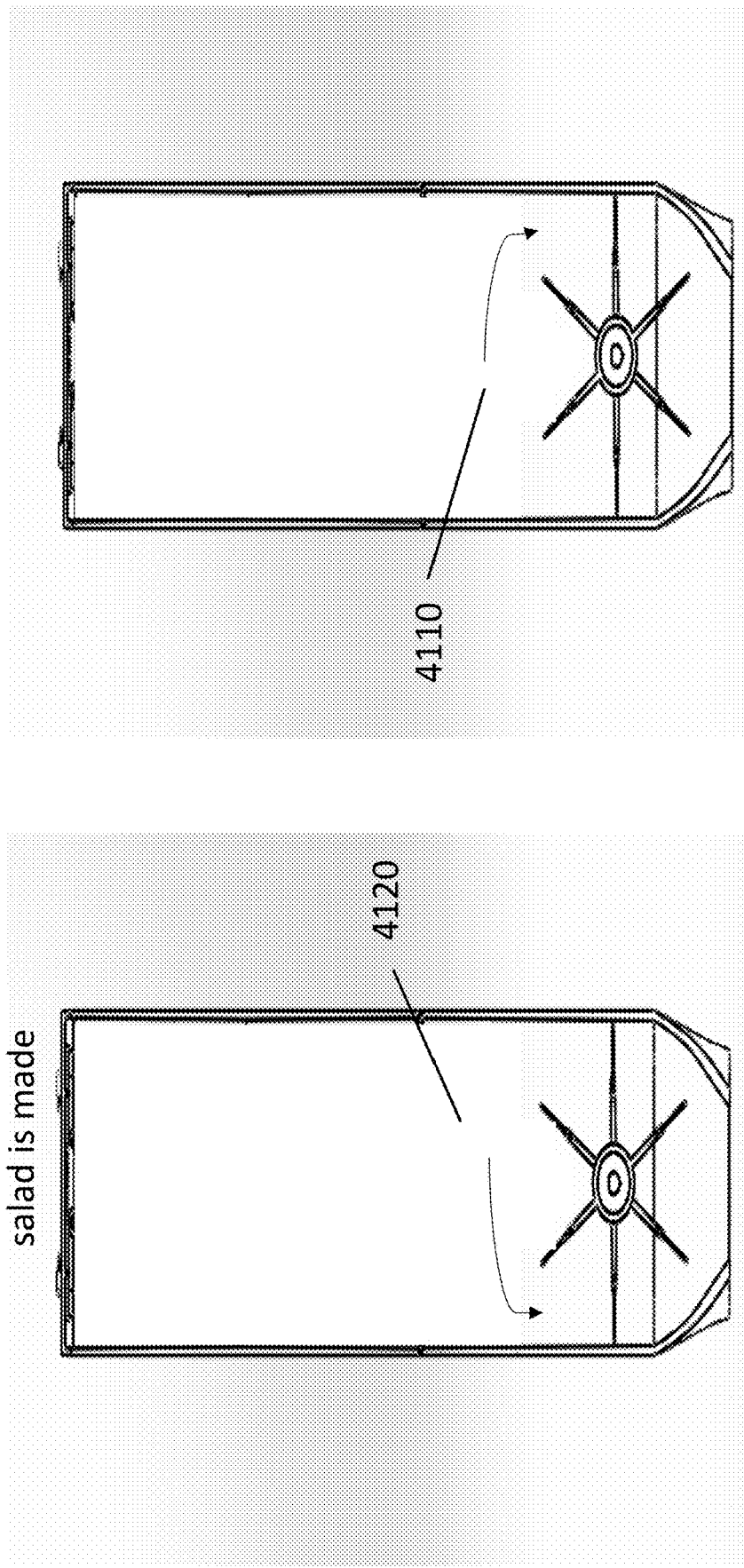
FIG. 41 illustrates an embodiment of this invention, which shows a Switch Directions Between Salads algorithm.

A Switch Directions Between Salads algorithm and software program may be disposed in the food making machine apparatus, and as some ingredients may tend to jam in the container/cylinder if only dispensed in one direction, the machine may be directed to rotate the dispenser in the opposite direction each time the ingredient is chosen to be deposited. This algorithm may control the appropriate machine sub-units and/or components. As illustrated in FIG. 41, an illustrative example of a Switch Directions Between Salads algorithm and software program is shown wherein the motion of the dispenser paddles may be rotated clockwise [4110] for a making one or more salads and then counterclockwise [4120] for making the next salad, or more than one. The precise number of salads made between each rotation direction change will depend upon engineering judgements and decision making.

A Unidirectional algorithm and software program may be disposed in the food making machine apparatus, and as the default dispenser motion, the machine may be directed to rotate the dispenser in a single direction until target weight is reached. This algorithm may control the appropriate machine sub-units and/or components. This algorithm may be the default dispense algorithm wherein the dispenser is rotated in one direction (clockwise or counterclockwise) until the target weight is achieved.

Figure 42:
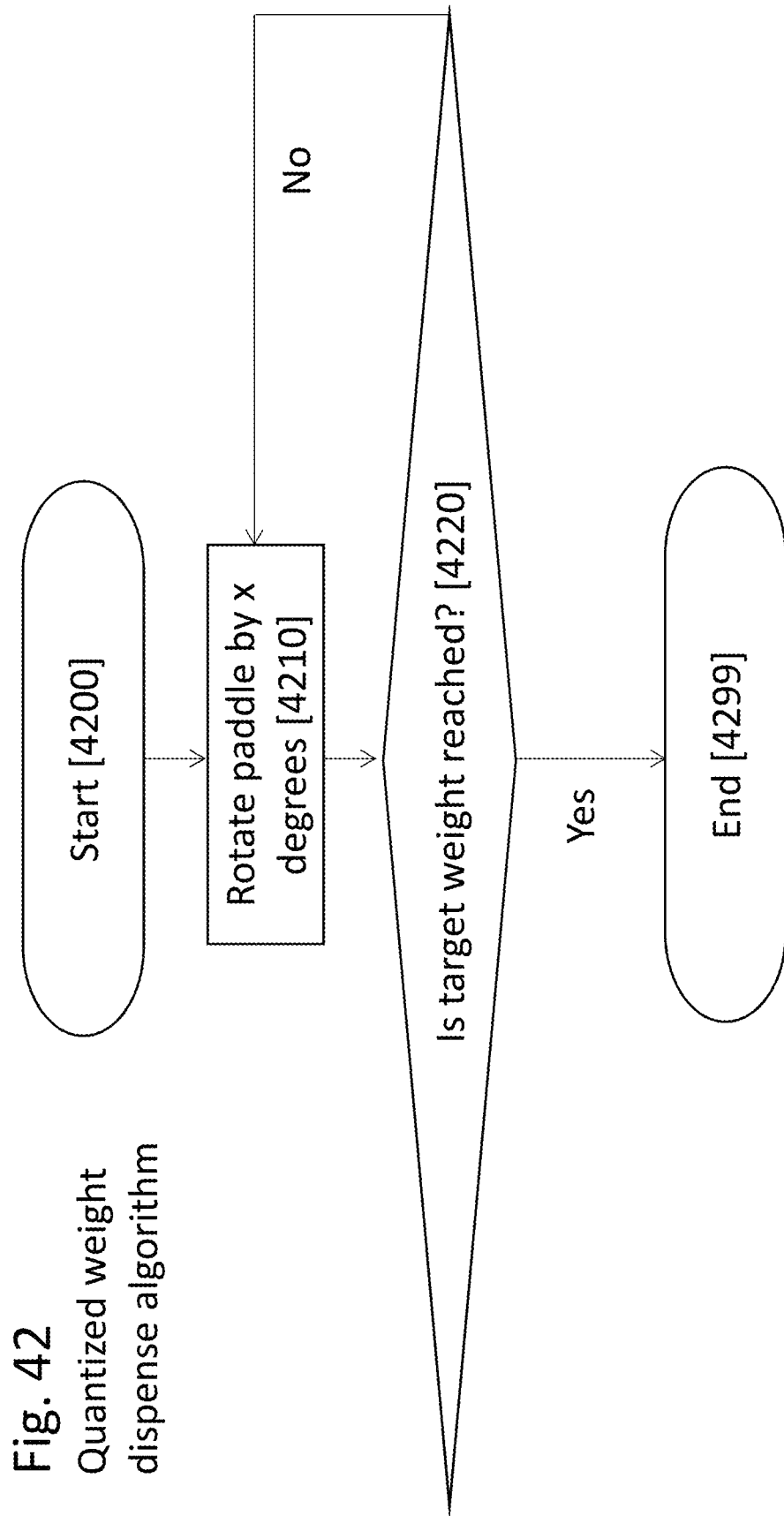
FIG. 42 illustrates an embodiment of this invention, which shows a Quantized weight dispense algorithm.

A Quantized weight dispense algorithm and software program may be disposed in the food making machine apparatus, and when dispensing medium to large amounts of ingredients the total time to dispense can be made shorter by moving the dispenser by a large angle before checking the dispensed weight. The dispenser may be rotated by a specific distance (learned or pre-determined to each specific food ingredient) before checking for weight. This algorithm may control the appropriate machine sub-units and/or components. As illustrated in FIG. 42, an illustrative example of a Quantized weight dispense algorithm and software program is shown in an overview flowchart. For example, the Start [4200] may activate the algorithm and rotate the paddle by x degrees [4210]. If the target weight is achieved [4220] then the algorithm may conclude with End [4299]. If the target weight is not achieved [4220], then the paddle may be rotated by a new amount of rotation.

Figure 43:
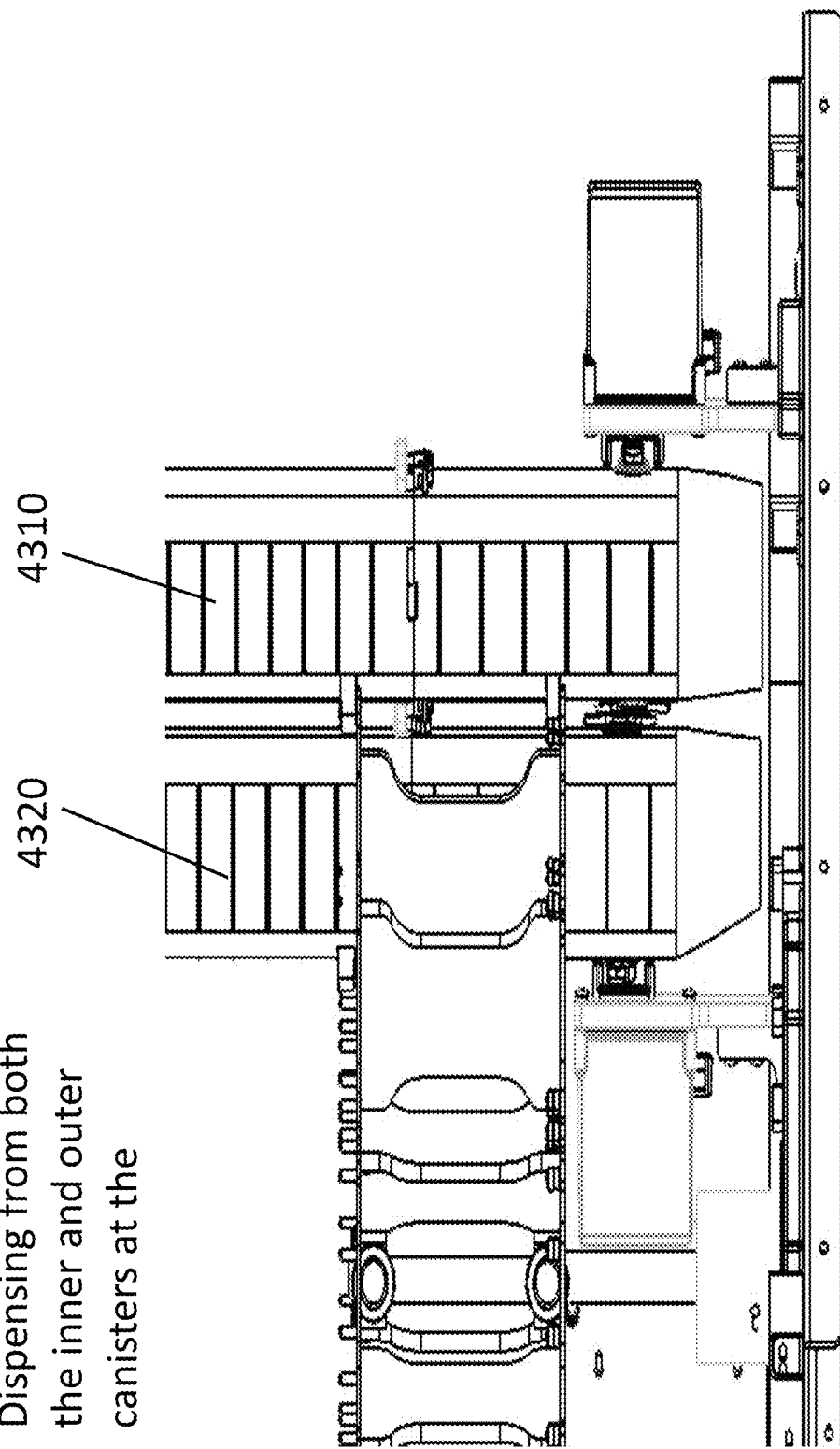
FIG. 43 illustrates an embodiment of this invention, which shows a Multiple Ingredient Dispensing algorithm.

A Multiple Ingredient Dispensing algorithm and software program may be disposed in the food making machine apparatus. The time to make a salad can be reduced by depositing 2 ingredients nearly simultaneously. The apparatus/machine has two concentric rings of ingredients, so the machine may dispense 2 ingredients simultaneously. This may be accomplished by sending multiple ingredient commands at a time, stored in a buffer, and if ingredients exist on the inner and outer rings of the same segment, dispense them both at the same time. This algorithm may control the appropriate machine sub-units and/or components. As illustrated in FIG. 43, an illustrative example of a Multiple Ingredient Dispensing is shown. Outer canister 4310 and inner canister 4320 may be positioned wherein both may dispense into the product bowl underneath (not shown), thus allowing two food ingredients to be dispensed nearly simultaneously, thus saving product (salad) manufacturing time.

A Mapping Ingredient Locations to minimize time algorithm and software program may be disposed in the food making machine apparatus. The time that it takes to switch ingredients increases the amount of time it takes to make a salad. The apparatus/machine may tell the loader to arrange the ingredients in an order that minimizes the time it takes to make an average salad by using historical data regarding ingredients used in some chosen time period. For example, the time period may be a day, a week, 3 weeks, 6 weeks, two months; and may also track by day of the week (such as optimum Monday and Friday canister/container arrangements may be different) or by a local calendar. This algorithm may control the appropriate machine sub-units and/or components.

Figure 44:
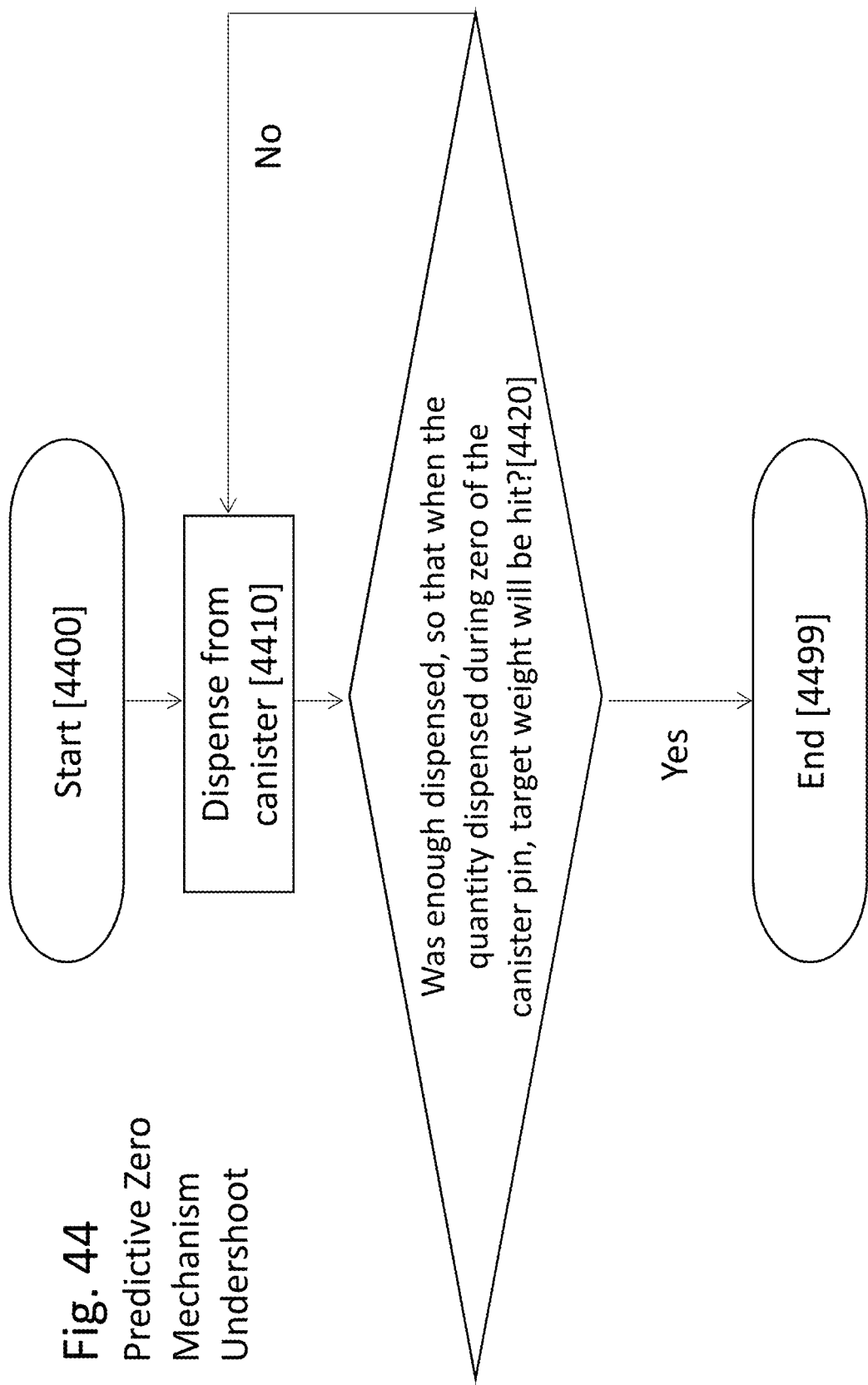
FIG. 44 illustrates an embodiment of this invention, which shows a Predictive Zero Mechanism Undershoot algorithm.

A Predictive Zero Mechanism Undershoot algorithm and software program may be disposed in the food making machine apparatus. When the machine zeros it can inadvertently drop ingredients. The apparatus/machine may determine the average amount of weight that is being deposited during zeroing step and reduce target weight accordingly. This algorithm may control the appropriate machine sub-units and/or components. As illustrated in FIG. 44, an illustrative example of a Predictive Zero Mechanism Undershoot algorithm and software program is shown in an overview flowchart. For example, the Start [4400] may activate the algorithm and a dispense from a canister [4410] may be performed. The algorithm may determine if enough weight of the food ingredient was dispensed such that when the canister is zeroed, then the target weight will be achieved [4420] (due to zeroing the dispenser may drop additional food material from the canister). If so, then the Predictive Zero Mechanism Undershoot algorithm may conclude with End [4499].

Figure 45:
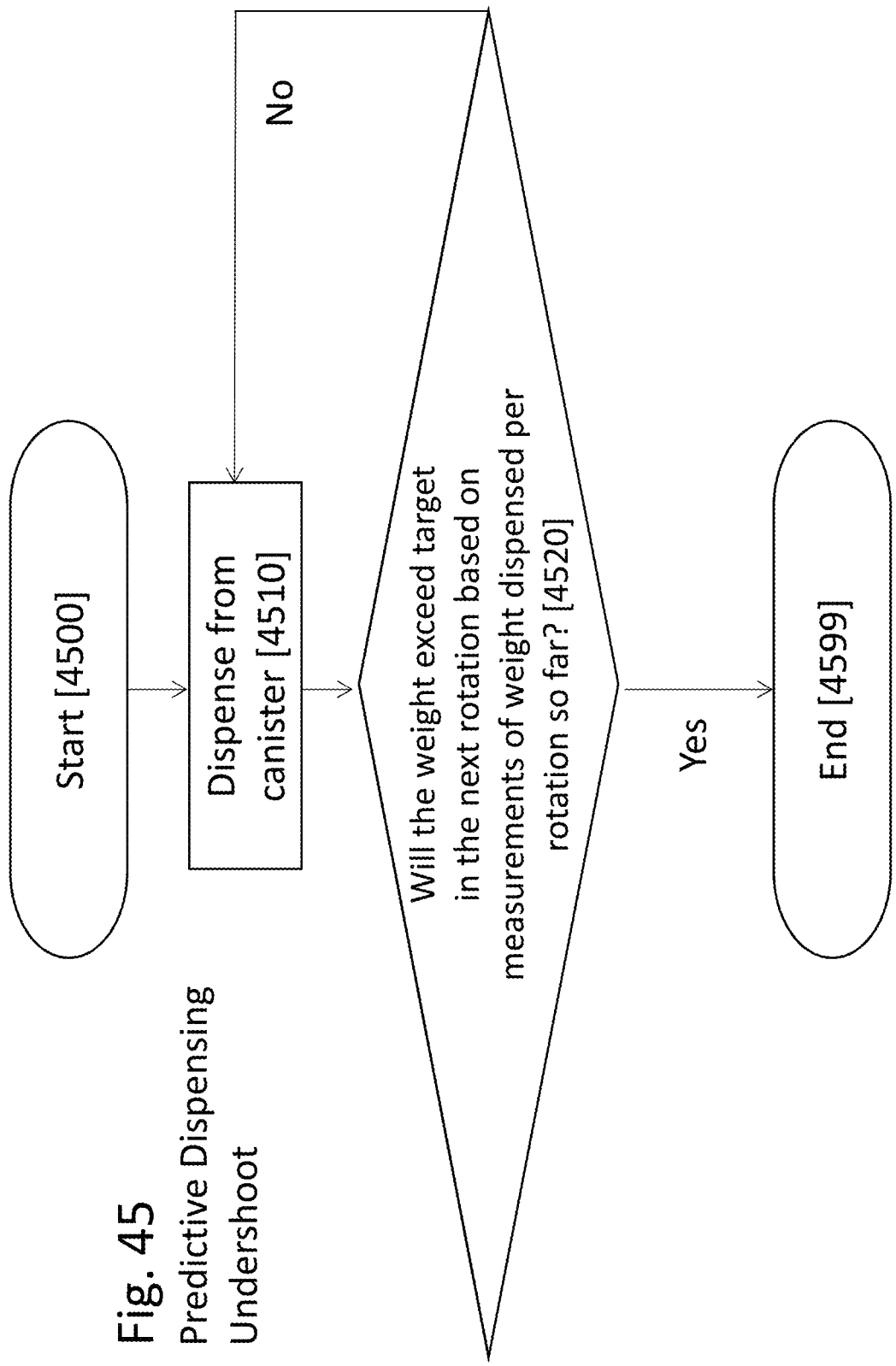
FIG. 45 illustrates an embodiment of this invention, which shows a Predictive Dispensing Undershoot algorithm.

A Predictive Dispensing Undershoot algorithm and software program may be disposed in the food making machine apparatus. The current method of feedback uses a scale to measure weight, once a weight measurement exceeds the target weight, the algorithms are stopped. This means that substantially all of the final weights will skew high. The apparatus/machine may determine the average amount of weight that is being deposited per rotation and stop if the weight will exceed target on the next rotation. This algorithm may control the appropriate machine sub-units and/or components. As illustrated in FIG. 45, an illustrative example of a Predictive Dispensing Undershoot algorithm and software program is shown in an overview flowchart. For example, the Start [4500] may activate the algorithm and a dispense from a canister [4510] may be performed. The algorithm may determine if enough weight of the food ingredient was dispensed such that when the dispense is stopped, then the target weight will be achieved [4520] (due to next rotation of the dispenser may drop additional food material from the canister). If so, then the Predictive Dispensing Undershoot algorithm may conclude with End [4599].

An Ingredient Specific Undershoot algorithm and software program may be disposed in the food making machine apparatus. The current method of feedback uses a scale to measure weight, once a weight measurement exceeds the target weight, the algorithms are stopped. This means that substantially all of the final weights will skew high. Each ingredient seems to have a different amount of overshoot error to it. The machine/apparatus and program will quantify it and undershoot by that amount. The amount of typical undershoot for every ingredient will be measured there would be an Undershoot value in the gcode. Thus code G1 W50 U10 would stop at 40 g, since it would be expected that the overshoot would make up the difference. This algorithm may control the appropriate machine sub-units and/or components. This algorithm would work in a similar fashion as FIG. 45 Predictive Dispensing Undershoot but be ingredient specific.

A Predictive Dispensing Undershoot Using Aggregate Historical Data algorithm and software program may be disposed in the food making machine apparatus. Weight sensor measurements can take time and slow down dispensing. The machine/apparatus and program may use historical data to get near completion before dialing in the final target. This algorithm may control the appropriate machine sub-units and/or components.

A Delayed Weight Measurement algorithm and software program may be disposed in the food making machine apparatus. The ingredients can be in the air when bowl is weighed. The machine/apparatus and program may wait an increment of time before measurements are taken. This will slow down the overall process. This algorithm may control the appropriate machine sub-units and/or components.

An Automated Scale Calibration algorithm and software program may be disposed in the food making machine apparatus. Weight sensor measurements are important to delivery of an accurate to ordered salad. The scale may not be calibrated correctly and may not be giving accurate readings. The machine/apparatus and program may calibrate the weight sensor with known weights—for example, using the known bowl weight to calibrate. This algorithm may control the appropriate machine sub-units and/or components.

FIG. 46A-D describe an embodiment of this invention, wherein a canister 4601 may be used to dispense a liquid, such as dressing, water, milk, smoothies or any other ingredient compatible with this mechanism. The liquid may be placed within bottle 4605 which in turn may be placed in a certain position using supports 4606, as indicated in FIG. 46C. Tubing 4607 may be used to transport the liquid into a peristaltic pump apparatus 4602. The peristaltic pump mechanism 4602 may be actuated with a motor using apparatus and methods described earlier in this patent application. This actuation may happen using pin 4604 (shown in FIG. 46B) and a shaft that enters the peristaltic pump mechanism. Tubing may enter the peristaltic pump mechanism and liquid may be pinched off using rollers 4608, as indicated in FIG. 46D. Weight sensor readings may be taken after different dispensing motions and feedback may be provided to the dispensing motor. The dispensing motor may be shared among multiple liquid dispenser canisters, which may produce benefits to the food making apparatus' weight, size and/or cost. It will be clear to one skilled in the art that several variations of the proposed embodiments may be possible. Several peristaltic pump designs may be possible. Several liquid dispenser design variations may be possible.

FIG. 47A-C describe an embodiment of this invention, wherein a canister 4701 may contain a tabbed paddle 4702. FIG. 47B indicates a potential structure of the tabbed paddle 4702 that was shown in FIG. 47A. The paddle may contain a hard or rigid core or center 4703. It may also contain flexible fins. The fins may contain a thicker portion 4705 as well as a thinner portion 4704 for optimized dispensing. The fins may also contain tabs such as 4706 which may add friction between the paddle and the canister 4701. This may have the helpful benefit of preventing the paddle from moving due to gravity or other forces and could therefore keep the pin 4708 from getting misaligned. Multiple tabs 4707 may be placed on the same paddle to produce different amounts of friction between the paddle and the canister walls. Depending on the tab materials, canister materials and size of the tab, a certain maximum speed may be recommended for paddle rotation of any dispensing algorithm. It will be clear to one skilled in the art that several variations of the proposed embodiments may be possible. Weight readings may be taken during dispensing and the motor motion may be automatically controlled to control the dispensing. The same motor may be used to rotate paddles in different canisters. Position sensors may be used to locate position of the actuator arm, as indicated in the embodiment described in FIG. 20A-C.

Figure 48C:
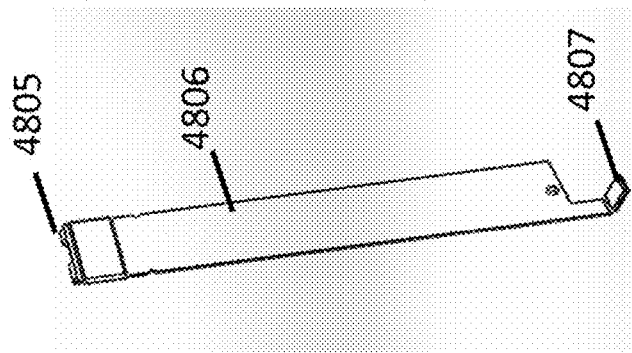
FIG. 48A-C illustrate an embodiment of this invention, which show shufflers for dispensing ingredients that don't operate perfectly under gravity fed mechanisms
Figure 48B:
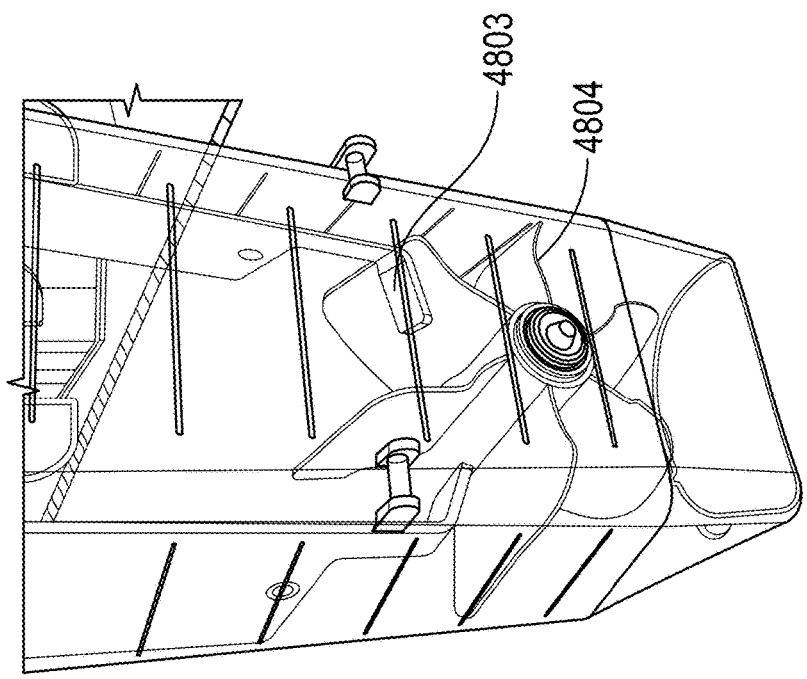
Figure 48A:
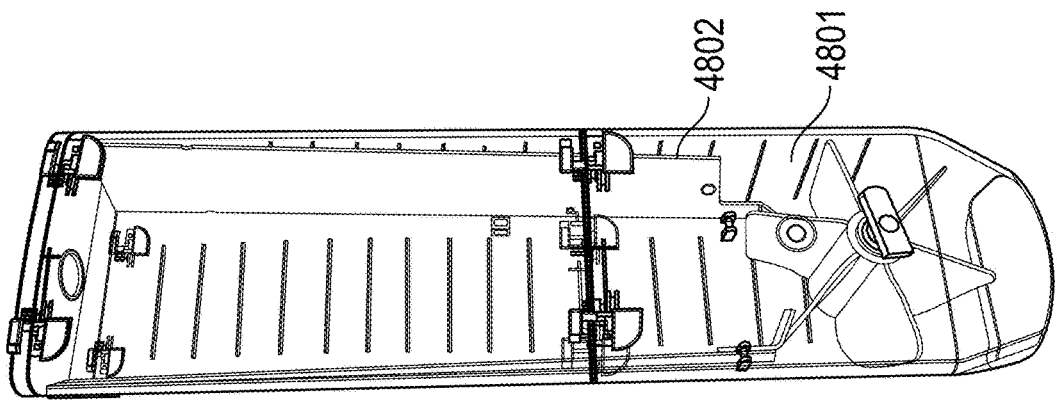

FIG. 48A-C describe an embodiment of this invention, wherein a canister 4801 may use shufflers 4802 for dispensing ingredients that may not work perfectly with a gravity fed mechanism. FIG. 48B indicates that shuffler end 4803 may come in contact with the paddle 4804 as the paddle 4804 rotates. This, in turn, may move the shuffler and push the ingredient in the canister so it falls downwards. It will be clear to one skilled in the art that several embodiments may be possible for design of the shuffler. FIG. 48C indicates one embodiment for the shuffler, wherein structures 4805 allow the shuffler to be placed on the sides of the canister and shuffler end 4807 may have a coating material so that the paddle 4804 is not damaged by the shuffler hitting it. It will be clear to one skilled in the art that several apparatus and methods may exist to use the paddle rotation to create movement at higher positions in the canister and dispense ingredients that may not work perfectly with a gravity fed mechanism.

FIG. 49A-D describe an embodiment of this invention, wherein a pin-shaft mechanism snaps into the paddle 4902 of a canister 4901. FIG. 49C may indicate the pin-shaft mechanism, which may consist of a pin 4903/4905 as well as a shaft 4904 which may have an end 4906. The end 4906 may snap into the structure 4907 in FIG. 49D which may be referred to as a retainer ring. By application of a push-in force, end 4906 may snap into the retainer ring 4907. By application of a pull-out force, end 4906 may be pulled out of the retainer ring 4907. FIG. 49B shows a view of the pin end inside the retainer ring (view 4908). It will be clear to one skilled in the art that several variations of these embodiments are possible. Different materials may be used for the shaft and retainer rings. Different shapes may be used for the shaft and retainer rings too.

FIG. 50 illustrates an embodiment of this invention, wherein a rocking motion dispense algorithm may be used with weight feedback. After the start of the algorithm 5000, the paddle may be rotated by a certain angle "x" in one direction, then rotated back to the center, then rotated by the angle "x" in another direction, then rotated back to the center. A weight measurement may be made after that step. If the target weight is reached, the algorithms ends 5099. Else, the rocking motion may continue with the same angle "x" repeatedly till the target weight is reached. Alternatively, the rocking motion may have increasing values of angle "x" till the target weight is reached. It will be clear to one skilled in the art that the embodiment described in FIG. 50 may be combined with embodiments described earlier in this patent application.

References to "one embodiment," "an embodiment," "example embodiment," "various embodiments," etc., may indicate that the embodiment(s) of the invention so described may include a particular feature, structure, or characteristic, but not every embodiment necessarily the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be used for making several types of food—salads, bowls, breakfast bowls, acai bowls, fruit bowls, smoothies, cocktails, frozen yogurt and many other types of food.

It will also be appreciated by persons of ordinary skill in the art that the present invention is not limited to what has been particularly shown and described hereinabove. Rather, the scope of the present invention includes both combinations and sub-combinations of the various features described hereinabove as well as modifications and variations which would occur to such skilled persons upon reading the foregoing description. Thus the invention is to only be limited by the claims.

What is claimed is:

1. A method of operating an automated food making apparatus comprising:
    rotating an actuator arm with a motor;
    rotating, with the actuator arm, a pin coupled to a shaft;
    rotating, with the pin and the shaft, a plurality of rollers distributed circumferentially around the shaft to dispense a liquid placed in a bottle of a canister; and
    controlling the motor automatically based on weight sensor readings,
    wherein the motor is configured to dispense ingredients from a plurality of canisters, and
    wherein the pin is located on the canister and is coupled to the shaft, which extends into an interior of the canister.

2. The method of claim 1, wherein the plurality of rollers form a peristaltic pumping apparatus for dispensing the liquid.

3. The method of claim 1, further comprising:
    maintaining the bottle in a predetermined position with supports.

4. The method of claim 1, further comprising transporting the liquid to with tubing.

5. The method of claim 1, further comprising:
    monitoring the weight sensor readings after different dispensing motions and providing feedback to the motor.

6. The method of claim 1, further comprising:
    dispensing the liquid from the bottle through a flexible tube; and
    compressing the flexible tube with the plurality of rollers to control the dispensing of the liquid.

7. The method of claim 6, further comprising:
    reducing dripping of the liquid with a one way valve added to an end of the flexible tube.

8. The method of claim 1, wherein the plurality of rollers compress a tube through which the liquid is dispensed from the bottle.

9. The method of claim 1, further comprising reversing the flow in the canister to reduce drips.

10. The method of claim 1, further comprising:
    dispensing a desired amount of liquid;
    detecting a drip from the canister; and
    activating a liquid pullback step.

11. The method of claim 10, wherein detecting the drip from the canister comprises detecting a weight increase between dispensing.

12. The method of claim 1, wherein the actuator arm comprises a first arm and a second arm, and wherein rotating the pin comprises engaging the first arm with a first end of the pin and the second arm with a second end of the pin.

13. The method of claim 1, wherein the pin extends perpendicularly to the shaft.

14. A method of operating an automated food making apparatus comprising:
    rotating an actuator arm with a motor;
    rotating, with the actuator arm, a pin coupled to a shaft;
    rotating, with the pin and the shaft, a plurality of rollers distributed circumferentially around the shaft to dispense a liquid placed in a bottle of a canister; and
    controlling the motor automatically based on weight sensor readings,
    wherein the motor is configured to dispense ingredients from a plurality of canister, and
    wherein the actuator arm comprises a first arm and a second arm, and wherein rotating the pin comprises engaging the first arm with a first end of the pin and the second arm with a second end of the pin.

15. A method of operating an automated food making apparatus comprising:
    rotating an actuator arm with a motor;
    rotating, with the actuator arm, a pin coupled to a shaft;
    rotating, with the pin and the shaft, a plurality of rollers distributed circumferentially around the shaft to dispense a liquid placed in a bottle of a canister; and
    controlling the motor automatically based on weight sensor readings,
    wherein the motor is configured to dispense ingredients from a plurality of canisters, and
    wherein the pin extends perpendicularly to the shaft.

* * * * *